US008600862B2

(12) United States Patent
Adcock et al.

(10) Patent No.: US 8,600,862 B2
(45) Date of Patent: Dec. 3, 2013

(54) DISCRETIONARY ORDER IN AN ELECTRONIC GUARANTEED ENTITLEMENT ENVIRONMENT

(75) Inventors: Paul Adcock, Burr Ridge, IL (US);
Michael Cormack, Vancouver (CA);
Amy Farnstrom, Oakland, CA (US);
Thomas Haller, Longwood, FL (US);
Robert Hill, LaGrange, IL (US)

(73) Assignee: NYSE Group, Inc., New York, NY (US)

( * ) Notice: Subject to any disclaimer, the term of this patent is extended or adjusted under 35 U.S.C. 154(b) by 560 days.

(21) Appl. No.: 12/807,338

(22) Filed: Sep. 2, 2010

(65) Prior Publication Data
US 2010/0332374 A1 Dec. 30, 2010

Related U.S. Application Data

(62) Division of application No. 11/881,789, filed on Jul. 27, 2007.

(60) Provisional application No. 60/834,327, filed on Jul. 28, 2006.

(51) Int. Cl.
*G06Q 40/00* (2012.01)
(52) U.S. Cl.
USPC .............................................. 705/37; 705/35
(58) Field of Classification Search
USPC .................................................. 705/35, 37
See application file for complete search history.

(56) References Cited

U.S. PATENT DOCUMENTS

| 5,101,353 | A | 3/1992 | Lupien et al. |
| 5,845,266 | A | 12/1998 | Lupien et al. |
| 5,905,974 | A | 5/1999 | Fraser et al. |
| 5,950,176 | A | 9/1999 | Keiser et al. |
| 6,012,046 | A | 1/2000 | Lupien et al. |

(Continued)

FOREIGN PATENT DOCUMENTS

| AU | 2006/244483 | 11/2006 |
| AU | 2006/244499 | 11/2006 |

(Continued)

OTHER PUBLICATIONS

For U.S. Appl. No. 11/122,689, Office Action dated Feb. 26, 2008.

(Continued)

*Primary Examiner* — Richard C Weisberger
(74) *Attorney, Agent, or Firm* — Milbank, Tweed, Hadley & McCloy LLP

(57) ABSTRACT

An enhanced system and method for handling, matching and executing discretionary orders in an electronic options environment is disclosed. Market maker entitlements are integrated with the discretionary order processing, so that the market maker is guaranteed an allocation of the trade if the market maker is at the NBBO when an incoming discretionary order priced at or better than the NBBO is received. If the incoming discretionary order cannot execute at the NBBO using its display price, then it will use as much discretion as is required to participate in a market maker entitlement if the market maker is quoting at the NBBO, and to execute against the order book and route to away markets quotations at the NBBO. Once posted to the order book, only the display price of a discretionary order is eligible for preferential execution in a market maker entitlement process.

20 Claims, 23 Drawing Sheets

(56) References Cited

U.S. PATENT DOCUMENTS

| | | | |
|---|---|---|---|
| 6,098,051 A | 8/2000 | Lupien et al. | |
| 6,278,982 B1 | 8/2001 | Korhammer et al. | |
| 6,343,278 B1 | 1/2002 | Jain et al. | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,505,174 B1 | 1/2003 | Keiser et al. | |
| 6,505,175 B1 | 1/2003 | Silverman et al. | |
| 6,615,188 B1 | 9/2003 | Breen et al. | |
| 6,618,707 B1 | 9/2003 | Gary | |
| 6,714,948 B1 | 3/2004 | Richards | |
| 6,829,589 B1 | 12/2004 | Saliba | |
| 6,832,210 B1 | 12/2004 | Li | |
| 6,850,907 B2 | 2/2005 | Lutnick et al. | |
| 6,963,856 B2 | 11/2005 | Lutnick et al. | |
| 6,983,260 B2 | 1/2006 | Hummelgren | |
| 7,162,448 B2 | 1/2007 | Madoff et al. | |
| 7,184,982 B1 | 2/2007 | Howorka et al. | |
| 7,197,483 B2 | 3/2007 | Brady et al. | |
| 7,209,896 B1 | 4/2007 | Serkin et al. | |
| 7,225,153 B2 | 5/2007 | Lange | |
| 7,242,669 B2 | 7/2007 | Bundy et al. | |
| 7,246,090 B1 | 7/2007 | Thomas | |
| 7,246,093 B1 | 7/2007 | Katz | |
| 7,249,086 B2 | 7/2007 | Bloom et al. | |
| 7,356,498 B2 | 4/2008 | Kaminsky et al. | |
| 7,383,220 B1 | 6/2008 | Keith | |
| 7,467,110 B2 | 12/2008 | Muller et al. | |
| 7,685,057 B2 | 3/2010 | Chiulli et al. | |
| 7,765,137 B1 | 7/2010 | Adcock et al. | |
| 7,873,561 B1 | 1/2011 | Adcock et al. | |
| 7,912,775 B1 | 3/2011 | Brill et al. | |
| 2001/0037284 A1 | 11/2001 | Finkelstein et al. | |
| 2002/0010672 A1 | 1/2002 | Waelbroeck et al. | |
| 2002/0010673 A1 | 1/2002 | Muller et al. | |
| 2002/0019795 A1 | 2/2002 | Madoff et al. | |
| 2002/0019799 A1 | 2/2002 | Ginsberg et al. | |
| 2002/0042765 A1 | 4/2002 | Dawson | |
| 2002/0062273 A1 | 5/2002 | Perkel et al. | |
| 2002/0082979 A1 | 6/2002 | Sands et al. | |
| 2002/0091617 A1 | 7/2002 | Keith | |
| 2002/0091621 A1 | 7/2002 | Conklin et al. | |
| 2002/0120511 A1 | 8/2002 | Hanes | |
| 2002/0128951 A1 | 9/2002 | Kiron et al. | |
| 2002/0128955 A1 | 9/2002 | Brady et al. | |
| 2002/0128958 A1 | 9/2002 | Slone | |
| 2002/0143676 A1 | 10/2002 | Kiron et al. | |
| 2002/0147670 A1 | 10/2002 | Lange | |
| 2002/0161687 A1 | 10/2002 | Serkin et al. | |
| 2002/0169703 A1 | 11/2002 | Lutnick et al. | |
| 2002/0184135 A1 | 12/2002 | Zakaria | |
| 2002/0184136 A1 | 12/2002 | Cleary et al. | |
| 2002/0198815 A1 | 12/2002 | Greifeld et al. | |
| 2002/0198816 A1 | 12/2002 | Gilbert et al. | |
| 2003/0004851 A2 | 1/2003 | Kiron et al. | |
| 2003/0004858 A1 | 1/2003 | Schmitz et al. | |
| 2003/0009400 A2 | 1/2003 | Kiron et al. | |
| 2003/0009412 A1 | 1/2003 | Furbush et al. | |
| 2003/0009413 A1 | 1/2003 | Furbush et al. | |
| 2003/0009414 A1 | 1/2003 | Furbush et al. | |
| 2003/0014351 A1 | 1/2003 | Neff et al. | |
| 2003/0023536 A1 | 1/2003 | Hollerman et al. | |
| 2003/0040955 A1 | 2/2003 | Anaya et al. | |
| 2003/0041006 A1 | 2/2003 | Bunda | |
| 2003/0083974 A1 | 5/2003 | Bunda | |
| 2003/0093343 A1 | 5/2003 | Huttenlocher et al. | |
| 2003/0097328 A1 | 5/2003 | Lundberg et al. | |
| 2003/0115131 A1 | 6/2003 | Heaton et al. | |
| 2003/0130920 A1 | 7/2003 | Freund | |
| 2003/0130925 A1 | 7/2003 | Malitzis | |
| 2003/0130926 A1 | 7/2003 | Moore et al. | |
| 2003/0135443 A1 | 7/2003 | Moore et al. | |
| 2003/0139998 A1 | 7/2003 | Gilbert et al. | |
| 2003/0172024 A1 | 9/2003 | Kokis et al. | |
| 2003/0177082 A1 | 9/2003 | Buckwalter | |
| 2003/0191703 A1 | 10/2003 | Chen et al. | |
| 2003/0216932 A1 | 11/2003 | Foley | |
| 2003/0229557 A1 | 12/2003 | Richmann et al. | |
| 2003/0233307 A1 | 12/2003 | Salvadori et al. | |
| 2004/0030630 A1 | 2/2004 | Tilfors et al. | |
| 2004/0044610 A1 | 3/2004 | Fraser et al. | |
| 2004/0059666 A1 | 3/2004 | Waelbroeck et al. | |
| 2004/0088242 A1 | 5/2004 | Ascher et al. | |
| 2004/0143538 A1 | 7/2004 | Korhammer et al. | |
| 2004/0143542 A1 | 7/2004 | Magill et al. | |
| 2004/0177024 A1 | 9/2004 | Bok et al. | |
| 2004/0177026 A1 | 9/2004 | Balabon | |
| 2004/0210508 A1 | 10/2004 | Bohnenberger | |
| 2004/0210511 A1 | 10/2004 | Waelbroeck et al. | |
| 2004/0215538 A1 | 10/2004 | Smith et al. | |
| 2004/0225592 A1 | 11/2004 | Churquina | |
| 2004/0236662 A1 | 11/2004 | Korhammer et al. | |
| 2004/0236669 A1 | 11/2004 | Horst et al. | |
| 2004/0243502 A1 | 12/2004 | Slowik et al. | |
| 2004/0254804 A1 | 12/2004 | Peterffy et al. | |
| 2004/0254877 A1 | 12/2004 | Buckwalter et al. | |
| 2004/0267655 A1 | 12/2004 | Davidowitz et al. | |
| 2005/0010481 A1 | 1/2005 | Lutnick et al. | |
| 2005/0075963 A1 | 4/2005 | Balabon | |
| 2005/0096999 A1 | 5/2005 | Newell et al. | |
| 2005/0119964 A1 | 6/2005 | Brady et al. | |
| 2005/0125316 A1 | 6/2005 | Levering et al. | |
| 2005/0137962 A1 | 6/2005 | Penney et al. | |
| 2005/0160024 A1 | 7/2005 | Soderborg et al. | |
| 2005/0171887 A1 | 8/2005 | Daley et al. | |
| 2005/0171888 A1 | 8/2005 | Daley et al. | |
| 2005/0171889 A1 | 8/2005 | Daley et al. | |
| 2005/0171890 A1 | 8/2005 | Daley et al. | |
| 2005/0171891 A1 | 8/2005 | Daley et al. | |
| 2005/0171895 A1 | 8/2005 | Howorka et al. | |
| 2005/0197916 A1 | 9/2005 | Newell et al. | |
| 2005/0222936 A1 | 10/2005 | Panariti et al. | |
| 2005/0228739 A1 | 10/2005 | Leibowitz | |
| 2005/0240510 A1 | 10/2005 | Schweickert et al. | |
| 2005/0273407 A1 | 12/2005 | Black et al. | |
| 2005/0273408 A1 | 12/2005 | Bandman et al. | |
| 2005/0273419 A1 | 12/2005 | Ogg et al. | |
| 2005/0283415 A1 | 12/2005 | Studnitzer et al. | |
| 2005/0283421 A1 | 12/2005 | Hatheway et al. | |
| 2005/0283426 A1 | 12/2005 | Krishnasami et al. | |
| 2005/0283427 A1 | 12/2005 | Owens et al. | |
| 2006/0020536 A1 | 1/2006 | Renton et al. | |
| 2006/0031157 A1* | 2/2006 | Gianakouros et al. | 705/37 |
| 2006/0089898 A1 | 4/2006 | Durkin et al. | |
| 2006/0089899 A1 | 4/2006 | Durkin et al. | |
| 2006/0136318 A1 | 6/2006 | Rafieyan et al. | |
| 2006/0136326 A1 | 6/2006 | Heckman et al. | |
| 2006/0149659 A1* | 7/2006 | Carone et al. | 705/37 |
| 2006/0161494 A1 | 7/2006 | Littlewood | |
| 2006/0184444 A1 | 8/2006 | McConaughy et al. | |
| 2006/0206404 A1 | 9/2006 | Hatheway et al. | |
| 2006/0206407 A1 | 9/2006 | Troxel et al. | |
| 2006/0235786 A1 | 10/2006 | DiSalvo | |
| 2006/0253374 A1 | 11/2006 | Addock et al. | |
| 2006/0253375 A1 | 11/2006 | Adcock et al. | |
| 2006/0253378 A1 | 11/2006 | Adcock et al. | |
| 2006/0253379 A1 | 11/2006 | Adcock et al. | |
| 2006/0253380 A1 | 11/2006 | Adcock et al. | |
| 2006/0253381 A1 | 11/2006 | Adcock et al. | |
| 2006/0253382 A1 | 11/2006 | Adcock et al. | |
| 2006/0259391 A1 | 11/2006 | Schoen et al. | |
| 2006/0277137 A1 | 12/2006 | Claus et al. | |
| 2006/0277138 A1 | 12/2006 | Ross et al. | |
| 2007/0022041 A1 | 1/2007 | Durkin et al. | |
| 2007/0043647 A1 | 2/2007 | Bickford | |
| 2007/0055607 A1 | 3/2007 | Wunsch et al. | |
| 2007/0073611 A1 | 3/2007 | Drake et al. | |
| 2007/0078753 A1 | 4/2007 | Cormack et al. | |
| 2007/0112693 A1 | 5/2007 | Cushing | |
| 2007/0198391 A1 | 8/2007 | Dreyer et al. | |
| 2007/0244792 A1 | 10/2007 | Couperier et al. | |
| 2008/0228622 A1 | 9/2008 | Adcock et al. | |
| 2008/0228623 A1 | 9/2008 | Adcock et al. | |
| 2009/0070250 A1 | 3/2009 | Adcock et al. | |

(56) References Cited

U.S. PATENT DOCUMENTS

| | | | |
|---|---|---|---|
| 2009/0125431 | A1 | 5/2009 | Armstrong et al. |
| 2009/0157539 | A1 | 6/2009 | Adcock et al. |
| 2010/0030704 | A1 | 2/2010 | Griffin et al. |
| 2010/0121759 | A1 | 5/2010 | Waelbroeck et al. |
| 2010/0332374 | A1 | 12/2010 | Adcock et al. |
| 2011/0082784 | A1 | 4/2011 | Adcock et al. |
| 2011/0231298 | A1 | 9/2011 | Adcock et al. |

FOREIGN PATENT DOCUMENTS

| | | |
|---|---|---|
| AU | 2006/244562 | 11/2006 |
| AU | 2006/244563 | 11/2006 |
| AU | 2006/244564 | 11/2006 |
| EP | 1321870 | 6/2003 |
| WO | 01/22322 | 3/2001 |
| WO | 01/22339 | 3/2001 |
| WO | 01/52166 | 7/2001 |
| WO | 01/75733 | 10/2001 |
| WO | 01/90925 | 11/2001 |
| WO | 02/07039 | 1/2002 |
| WO | 02/09008 | 1/2002 |
| WO | 2004/008296 | 1/2004 |
| WO | 2005/010790 | 2/2005 |
| WO | 2005/036354 | 4/2005 |
| WO | 2006/121687 | 11/2006 |
| WO | 2006/121688 | 11/2006 |
| WO | 2006/121689 | 11/2006 |
| WO | 2006/121691 | 11/2006 |
| WO | 2006/121792 | 11/2006 |
| WO | 2006/121796 | 11/2006 |
| WO | 2006/121812 | 11/2006 |
| WO | 2007/038084 | 4/2007 |
| WO | 2007/038218 | 4/2007 |
| WO | 2008/013776 | 1/2008 |
| WO | 2008/013828 | 1/2008 |
| WO | 2008/013916 | 1/2008 |
| WO | 2008/013917 | 1/2008 |
| WO | 2008/024172 | 2/2008 |
| WO | 2008/027124 | 3/2008 |
| WO | 2008/073252 | 6/2008 |

OTHER PUBLICATIONS

For U.S. Appl. No. 11/122,689, Response dated Aug. 29, 2008.
For U.S. Appl. No. 11/122,689, Office Action dated Nov. 18, 2008.
For U.S. Appl. No. 11/122,689, Response dated Mar. 17, 2009.
For U.S. Appl. No. 11/122,689, Interview dated Apr. 13, 2009.
For U.S. Appl. No. 11/122,689, Office Action dated Apr. 27, 2009.
For U.S. Appl. No. 11/122,689, Interview dated Aug. 18, 2009.
For U.S. Appl. No. 11/122,689, Response dated Aug. 27, 2009.
For U.S. Appl. No. 11/122,689, Allowance dated Dec. 14, 2009.
For U.S. Appl. No. 11/122,689, Allowance dated Jan. 26, 2010.
For U.S. Appl. No. 11/122,689, Allowance dated Mar. 1, 2010.
For U.S. Appl. No. 11/122,679, Office Action dated Apr. 1, 2008.
For U.S. Appl. No. 11/122,679, Response dated Oct. 6, 2008.
For U.S. Appl. No. 11/122,679, Office Action dated Jan. 5, 2009.
For U.S. Appl. No. 11/122,679, Response dated Apr. 6, 2009.
For U.S. Appl. No. 11/122,679, Interview dated May 4, 2009.
For U.S. Appl. No. 11/122,679, Interview dated May 12, 2009.
For U.S. Appl. No. 11/122,679, Response dated Jun. 17, 2009.
For U.S. Appl. No. 11/122,679, Allowance dated Aug. 21, 2009.
For U.S. Appl. No. 11/122,679, Interview dated Sep. 9, 2009.
For U.S. Appl. No. 11/122,679, Allowance dated Jan. 15, 2010.
For U.S. Appl. No. 11/122,679, Allowance dated Aug. 16, 2010.
For U.S. Appl. No. 11/122,679, Allowance dated Oct. 14, 2010.
For U.S. Appl. No. 11/122,679, Allowance dated Dec. 15, 2010.
For U.S. Appl. No. 11/345,420, Office Action dated Dec. 9, 2008.
For U.S. Appl. No. 11/345,420, Response dated Mar. 16, 2009.
For U.S. Appl. No. 11/345,420, Allowance dated Jul. 23, 2009.
For U.S. Appl. No. 11/345,420, Allowance dated Nov. 16, 2009.
For U.S. Appl. No. 11/345,420, Allowance dated Sep. 7, 2010.
For U.S. Appl. No. 11/122,498, Office Action dated Feb. 12, 2008.
For U.S. Appl. No. 11/122,498, Response dated Aug. 14, 2008.
For U.S. Appl. No. 11/122,498, Office Action dated Sep. 19, 2008.
For U.S. Appl. No. 11/122,498, Response dated Jan. 9, 2009.
For U.S. Appl. No. 11/122,498, Office Action dated Apr. 15, 2009.
For U.S. Appl. No. 11/122,498, Interview dated Aug. 18, 2009.
For U.S. Appl. No. 11/122,498, Response dated Sep. 15, 2009.
For U.S. Appl. No. 11/122,498, Interview dated Jan. 21, 2010.
For U.S. Appl. No. 11/122,498, Office Action dated Jan. 21, 2010.
For U.S. Appl. No. 11/122,498, Response dated Jun. 16, 2010.
For U.S. Appl. No. 11/122,498, Allowance dated Jul. 1, 2010.
For U.S. Appl. No. 11/122,498, Allowance dated Aug. 31, 2010.
For U.S. Appl. No. 11/122,498, Allowance dated Sep. 14, 2010.
For U.S. Appl. No. 11/122,498, Allowance dated Sep. 29, 2010.
For U.S. Appl. No. 11/122,498, Allowance dated Oct. 13, 2010.
For U.S. Appl. No. 11/345,421, Office Action dated Jun. 27, 2008.
For U.S. Appl. No. 11/345,421, Response dated Sep. 22, 2008.
For U.S. Appl. No. 11/345,421, Office Action dated Jan. 26, 2009.
For U.S. Appl. No. 11/345,421, Response dated May 22, 2009.
For U.S. Appl. No. 11/345,421, Office Action dated Oct. 7, 2009.
For U.S. Appl. No. 11/345,421, Response dated Nov. 23, 2009.
For U.S. Appl. No. 11/345,421, Allowance dated Apr. 2, 2010.
For U.S. Appl. No. 11/345,421, Allowance dated Aug. 4, 2010.
For U.S. Appl. No. 11/345,421, Allowance dated Dec. 9, 2010.
For U.S. Appl. No. 11/345,421, Allowance dated Feb. 17, 2011.
For U.S. Appl. No. 11/416,942, Office Action dated Jul. 22, 2008.
For U.S. Appl. No. 11/416,942, Response dated Aug. 29, 2008.
For U.S. Appl. No. 11/416,942, Office Action dated Sep. 30, 2008.
For U.S. Appl. No. 11/416,942, Response dated Jan. 12, 2009.
For U.S. Appl. No. 11/416,942, Office Action dated Apr. 23, 2009.
For U.S. Appl. No. 11/416,942, Response dated Sep. 30, 2009.
For U.S. Appl. No. 11/416,942, Response dated Oct. 7, 2009.
For U.S. Appl. No. 11/416,942, Interview dated Oct. 14, 2009.
For U.S. Appl. No. 11/416,942, Allowance dated Dec. 29, 2009.
For U.S. Appl. No. 11/416,942, Allowance dated Jan. 26, 2010.
For U.S. Appl. No. 11/416,942, Allowance dated Feb. 24, 2010.
For U.S. Appl. No. 11/416,942, Allowance dated Jun. 16, 2010.
For U.S. Appl. No. 11/416,942, Allowance dated Sep. 20, 2010.
For U.S. Appl. No. 11/416,942, Allowance dated Nov. 9, 2010.
For U.S. Appl. No. 11/416,942, Allowance dated Dec. 28, 2010.
For U.S. Appl. No. 11/416,710, Office Action dated Apr. 4, 2008.
For U.S. Appl. No. 11/416,710, Response dated Aug. 4, 2008.
For U.S. Appl. No. 11/416,710, Notice dated Sep. 11, 2008.
For U.S. Appl. No. 11/416,710, Response dated Sep. 19, 2008.
For U.S. Appl. No. 11/416,710, Office Action dated Dec. 30, 2008.
For U.S. Appl. No. 11/416,710, Response dated Mar. 27, 2009.
For U.S. Appl. No. 11/416,710, Office Action dated Aug. 17, 2009.
For U.S. Appl. No. 11/416,710, Response dated Nov. 2, 2009.
For U.S. Appl. No. 11/416,710, Allowance dated Mar. 22, 2010.
For U.S. Appl. No. 11/416,710, Allowance dated Jun. 15, 2010.
For U.S. Appl. No. 11/416,710, Allowance dated Sep. 27, 2010.
For U.S. Appl. No. 11/416,913, Office Action dated Dec. 29, 2008.
For U.S. Appl. No. 11/416,913, Response dated Mar. 25, 2009.
For U.S. Appl. No. 11/416,913, Office Action dated Aug. 3, 2009.
For U.S. Appl. No. 11/416,913, Response dated Oct. 13, 2009.
For U.S. Appl. No. 11/416,913, Office Action dated Jan. 22, 2010.
For U.S. Appl. No. 11/416,913, Response dated Jun. 22, 2010.
For U.S. Appl. No. 11/416,913, Office Action dated Sep. 15, 2010.
For U.S. Appl. No. 11/416,913, Response dated Jan. 18, 2011.
For U.S. Appl. No. 11/416,756, Office Action dated Mar. 27, 2009.
For U.S. Appl. No. 11/416,756, Response dated Apr. 27, 2009.
For U.S. Appl. No. 11/416,756, Office Action dated Aug. 4, 2009.
For U.S. Appl. No. 11/416,756, Response dated Nov. 4, 2009.
For U.S. Appl. No. 11/416,756, Office Action dated Apr. 27, 2010.
For U.S. Appl. No. 11/416,943, Office Action dated Sep. 3, 2008.
For U.S. Appl. No. 11/416,943, Response dated Dec. 5, 2008.
For U.S. Appl. No. 11/416,943, Office Action dated Mar. 17, 2009.
For U.S. Appl. No. 11/416,943, Interview dated Mar. 31, 2009.
For U.S. Appl. No. 11/416,943, Response dated Jun. 17, 2009.
For U.S. Appl. No. 11/416,943, Office Action dated Sep. 30, 2009.
For U.S. Appl. No. 11/416,943, Interview dated Nov. 30, 2009.
For U.S. Appl. No. 11/416,943, Response dated Dec. 15, 2009.
For U.S. Appl. No. 11/416,943, Office Action dated Mar. 23, 2010.
For U.S. Appl. No. 11/416,943, Response dated Jun. 23, 2010.

(56) References Cited

OTHER PUBLICATIONS

For U.S. Appl. No. 11/416,943, Office Action dated Aug. 26, 2010.
For U.S. Appl. No. 11/416,943, Office Action dated Jun. 7, 2011.
For U.S. Appl. No. 11/416,943, Response dated Sep. 6, 2011.
For U.S. Appl. No. 11/525,363, Office Action dated May 19, 2009.
For U.S. Appl. No. 11/525,363, Response dated Nov. 16, 2009.
For U.S. Appl. No. 11/525,363, Allowance dated Sep. 24, 2010.
For U.S. Appl. No. 11/527,797, Office Action dated Sep. 15, 2008.
For U.S. Appl. No. 11/527,797, Response dated Dec. 15, 2008.
For U.S. Appl. No. 11/527,797, Office Action dated Mar. 30, 2009.
For U.S. Appl. No. 11/527,797, Response dated May 19, 2009.
For U.S. Appl. No. 11/527,797, Office Action dated Aug. 12, 2009.
For U.S. Appl. No. 11/527,797, Response dated Nov. 17, 2009.
For U.S. Appl. No. 11/527,797, Office Action dated Jan. 25, 2010.
For U.S. Appl. No. 11/634,020, Office Action dated Nov. 12, 2008.
For U.S. Appl. No. 11/634,020, Response dated Feb. 17, 2009.
For U.S. Appl. No. 11/634,020, Office Action dated Jun. 24, 2009.
For U.S. Appl. No. 11/634,020, Response dated Sep. 29, 2009.
For U.S. Appl. No. 11/634,020, Office Action dated Dec. 28, 2009.
For U.S. Appl. No. 11/634,020, Response dated Mar. 16, 2010.
For U.S. Appl. No. 11/634,020, Office Action dated Apr. 28, 2010.
For U.S. Appl. No. 11/634,020, Response dated Jul. 28, 2010.
For U.S. Appl. No. 11/634,020, Allowance dated Oct. 27, 2010.
For U.S. Appl. No. 11/634,020, Allowance dated Dec. 29, 2010.
For U.S. Appl. No. 11/880,840, Office Action dated Mar. 17, 2010.
For U.S. Appl. No. 11/880,840, Response dated Mar. 26, 2010.
For U.S. Appl. No. 11/880,840, Office Action dated Jul. 6, 2010.
For U.S. Appl. No. 11/880,840, Response dated Nov. 4, 2010.
For U.S. Appl. No. 11/880,840, Allowance dated Dec. 7, 2010.
For U.S. Appl. No. 11/880,840, Allowance dated Mar. 29, 2012.
For U.S. Appl. No. 11/880,686, Office Action dated Nov. 6, 2009.
For U.S. Appl. No. 11/880,686, Response dated May 3, 2010.
For U.S. Appl. No. 11/880,686, Office Action dated Jul. 21, 2010.
For U.S. Appl. No. 11/880,686, Response dated Nov. 15, 2010.
For U.S. Appl. No. 11/880,852, Office Action dated Dec. 1, 2009.
For U.S. Appl. No. 11/880,852, Response dated Jun. 1, 2010.
For U.S. Appl. No. 11/880,852, Office Action dated Aug. 18, 2010.
For U.S. Appl. No. 11/880,852, Response dated Nov. 18, 2010.
For U.S. Appl. No. 11/881,064, Office Action dated Mar. 25, 2010.
For U.S. Appl. No. 11/881,064, Response dated Apr. 6, 2010.
For U.S. Appl. No. 11/881,064, Office Action dated Jun. 30, 2010.
For U.S. Appl. No. 11/881,064, Response dated Dec. 28, 2010.
For U.S. Appl. No. 11/881,064, Office Action dated Mar. 22, 2011.
For U.S. Appl. No. 11/881,789, Office Action dated Dec. 1, 2009.
For U.S. Appl. No. 11/881,789, Response dated Mar. 19, 2010.
For U.S. Appl. No. 11/881,789, Office Action dated Aug. 20, 2010.
For U.S. Appl. No. 11/881,789, Response dated Sep. 2, 2010.
For U.S. Appl. No. 11/881,789, Office Action dated Feb. 2, 2011.
For U.S. Appl. No. 11/881,789, Response dated May 2, 2011.
For U.S. Appl. No. 11/881,788, Office Action dated Mar. 17, 2010.
For U.S. Appl. No. 11/881,788, Response dated Mar. 26, 2010.
For U.S. Appl. No. 11/881,788, Office Action dated Jun. 29, 2010.
For U.S. Appl. No. 11/881,788, Response dated Sep. 29, 2010.
For U.S. Appl. No. 11/881,788, Allowance dated Nov. 15, 2010.
For U.S. Appl. No. 11/881,788, Allowance dated Jan. 6, 2011.
For U.S. Appl. No. 12/807,338, Office Action dated Apr. 4, 2011.
For U.S. Appl. No. 12/807,338, Response dated Jul. 5, 2011.
For U.S. Appl. No. 12/807,338, Allowance dated May 21, 2012.
For U.S. Appl. No. 13/068,881, Office Action dated Nov. 28, 2011.
For U.S. Appl. No. 13/068,881, Response dated Feb. 23, 2012.
For U.S. Appl. No. 13/068,881, Office Action dated Apr. 13, 2012.
For PCT/US06/16683, International Search Report dated Aug. 29, 2007.
For PCT/US06/16684, International Search Report dated Aug. 9, 2007.
For PCT/US06/16685, International Search Report dated Sep. 17, 2007.
For PCT/US06/16701, International Search Report dated Aug. 29, 2007.
For PCT/US06/17249, International Search Report dated Sep. 5, 2007.
For PCT/US06/17296, International Search Report dated Aug. 7, 2007.
For PCT/US06/17253, International Search Report dated Sep. 12, 2007.
For PCT/US06/36461, International Search Report dated Jun. 17, 2008.
For PCT/US06/36878, International Search Report dated May 18, 2007.
For PCT/US07/16571, International Search Report dated Jun. 17, 2008.
For PCT/US07/16572, International Search Report dated Jul. 2, 2008.
For PCT/US07/16682, International Search Report dated Jun. 17, 2008.
For PCT/US07/16718, International Search Report dated Mar. 20, 2008.
For PCT/US07/16856, International Search Report dated Sep. 18, 2008.
For PCT/US07/16857, International Search Report dated Sep. 5, 2008.
For PCT/US07/24921, International Search Report dated May 12, 2008.
A Taxonomy of Automated Trade Execution Systems, Ian Domowitz, Journal of International Money and Finance, (1993), 12, pp. 607-631.
Nasdaq launches Liquidity Tracker; Intelligent order routing system allows market participants to find and increase liquidity, Dec. 5, 2002.
Dana Corp could lose NYSE Listing in Takeover Battle, Aug. 3, 2003.
Headstrong buys assets of Elind software provider, Nov. 1, 2004.
Rising tide lifts all boats in institutional equities, Mar. 26, 1994.
Phlx allows floor broker corssing, Feb. 24, 2003.
Fragmented dealing under fire, May 1, 2000.
Directed order decision polarizes exchanges, Jun. 13, 2005.
Call and continuous trading mechanisms under asymmetric information; an experimental investigation, Jun. 1996.
Supermontage as a New Trading System of NASDAQ, Mar. 2005.
Price discovery in tick time, Dec. 2009.
Tick size, bid-ask spreads and market structure, Feb. 8, 2001.
For SG 200716681-2, Search Report, Written Opinion and Examination Report, Oct. 26, 2009.
For SG 200716675-4, Search Report, Written Opinion and Examination Report, Oct. 8, 2009.
For SG 200716677-0, Search Report and Written opinion, Mar. 6, 2009.
For SG 200716678-8, Search Report and Written opinion, Jan. 6, 2009.
For SG 200716679-6, Search Report and Written opinion, Feb. 13, 2009.
For SG 200716680-4, Search Report and Written opinion, Mar. 13, 2009.
For PCT/US07/24921, International Search Report and Written Opinion, May 12, 2008.
For PCT/US07/24921, International Preliminary Report on Patentability, Jun. 10, 2009.
For PCT/US07/16571, International Search Report and Written Opinion, Jun. 17, 2008.

* cited by examiner

Highest Priority → → → → → → → → → Lowest Priority

| Display Order Process | Reserve Process | Liquidity Process | Discretionary Process | Tracking Process | Routing Process |
|---|---|---|---|---|---|
| 1. Best Displayed Order or Quote at the NBBO | 4. Best Reserve Portion of an Order at the NBBO | 7. Best Passive Liquidity Order at the NBBO | 10. Best Discretionary Order that can Step Up to the NBBO | 13. Best Tracking Liquidity Order at the NBBO | 16. Best Away Market Quote at the NBBO |
| 2. 2nd-best Displayed Order or Quote at the NBBO | 5. 2nd-best Reserve Portion of an Order at the NBBO | 8. 2nd-best Passive Liquidity Order at the NBBO | 11. 2nd-best Discretionary Order that can Step Up to the NBBO | 14. 2nd-best Tracking Liquidity Order at the NBBO | 17. 2nd-best Away Market Quote at the NBBO |
| 3. 3rd-best Displayed Order or Quote at the NBBO | 6. 3rd-best Reserve Portion of an Order at the NBBO | 9. 3rd-best Passive Liquidity Order at the NBBO | 12. 3rd-best Discretionary Order that can Step Up to the NBBO | 15. 3rd-best Tracking Liquidity Order at the NBBO | 18. 3rd-best Away Market Quote at the NBBO |
| 19. Best Displayed Order or Quote at One Tick Inferior to the NBBO | 22. Best Reserve Portion of an Order at One Tick Inferior to the NBBO | 25. Best Passive Liquidity Order at One Tick Inferior to the NBBO | 28. Best Discretionary Order that can Step Up to One Tick Inferior to the NBBO | | 31. Best Away Market Quote at One Tick Inferior to the NBBO |
| 20. 2nd-best Displayed Order or Quote at One Tick Inferior to the NBBO | 23. 2nd-best Reserve Portion of an Order at One Tick Inferior to the NBBO | 26. 2nd-best Passive Liquidity Order at One Tick Inferior to the NBBO | 29. 2nd-best Discretionary Order that can Step Up to One Tick Inferior to the NBBO | | 32. 2nd-best Away Market Quote at One Tick Inferior to the NBBO |
| 21. 3rd-best Displayed Order or Quote at One Tick Inferior to the NBBO | 24. 3rd-best Reserve Portion of an Order at One Tick Inferior to the NBBO | 27. 3rd-best Passive Liquidity Order at One Tick Inferior to the NBBO | 30. 3rd-best Discretionary Order that can Step Up to One Tick Inferior to the NBBO | | 33. 3rd-best Away Market Quote at One Tick Inferior to the NBBO |

FIG. 3

Directed Order Permissions Table

Example of a DMM / OSF Permissions Table

| Issue | Designated Market Maker Firm (DMM) | Default MM? | Order Sending Firm (OSF) |
|---|---|---|---|
| XYZ | Firm A |   | Firm B |
| XYZ | Firm A | Y | Firm C |
| XYZ | Firm B | Y | Firm B |
| XYZ | Firm B |   | Firm A |

According to this Table:

* Firm B can Direct Orders to Firm A and Firm B
* Firm C can Direct Orders to Firm A Only
* Firm A can Direct Orders to Firm B Only
* If Firm B does not Specify a DMM, the Route Defaults to Firm B
* If Firm C does not Specify a DMM, the Route Defaults to Firm A
* If Firm A does not Specify a DMM, there is no Default Route

FIG. 7B

DISCRETIONARY ORDER IN AN ELECTRONIC GUARANTEED ENTITLEMENT ENVIRONMENT

CROSS-REFERENCE TO RELATED APPLICATIONS

This application is a divisional of co-pending U.S. patent application Ser. No. 11/881,789, filed Jul. 27, 2007, which claims priority from and claims the benefit of U.S. Provisional Application No. 60/834,327, filed Jul. 28, 2006, entitled "Electronic Equity Options Order Execution and Routing System," each of which is hereby incorporated by reference.

BACKGROUND

Historically, a discretionary order referred to a large order given to a market maker by an institutional customer to "work" over time at his discretion, which gave the market maker the right to determine when, and at what prices, to execute the trades. On the current options marketplace, users are generally not able to submit electronic orders that include superior, nondisplayed prices for automatic matching in the order books.

Discretionary orders have been in use on electronic equities marketplaces for years, i.e. in marketplaces that apply price/time priority rules. They have not been in use, however, in marketplaces that provide guaranteed entitlements to specified market participants, such as a lead market maker in an options series.

Accordingly, there is a need for a discretionary order that simultaneously respects both traditional specialist/market maker guaranteed entitlements, when they are applicable, and price/time priority matching principles. To encourage market makers to quote at their best prices to participate with an incoming discretionary order, there is a need for a market maker guaranteed entitlement model that requires the market makers to be quoting at the national best bid and offer ("NBBO") at the time the incoming discretionary order is received. To encourage customers who post discretionary orders to display prices at the NBBO to the marketplace, there is a need for a market maker guaranteed entitlement model that only gives preference to the displayed price of a posted discretionary order, and executes the superior, nondisplayed discretionary price according to price/time priority matching principles.

SUMMARY

According to one aspect of the present invention, a method for trading discretionary orders in an electronic options trading environment with market maker participation includes providing a market center which lists options series, wherein the market center has an order book for each option series and a quote book for each option series, wherein the order book has a displayed interest component and a nondisplayed interest component and wherein a plurality of the option series have an appointed lead market maker. The method further includes receiving an incoming discretionary order having a display price for display and a discretionary price that is not displayed, and determining if the discretionary order is marketable using either its display price, or if necessary, its superior discretionary price. If the discretionary order is marketable, the method further includes determining if the discretionary order is for an option series that has a lead market maker and, if so, determining if the lead market maker has a quote at the NBBO. Wherein if the discretionary order is marketable and the lead market maker has a quote at the NBBO, the method further includes computing an allocation percentage for the lead market maker and matching the incoming discretionary order up to the lesser of the total size of the discretionary order or the computed allocation percentage amount for the lead market maker.

According to another aspect of the present invention, the method may include, prior to computing the lead market maker allocation percentage, determining if the order book has a customer order at the NBBO and if the order book does have a customer order at the NBBO, determining if the customer order is displayed and was posted to the order book prior to the lead market maker quote at the NBBO. It should be noted that in the case of a customer discretionary order, the order is determined to be at the NBBO only if its display price is at the NBBO. Wherein if the customer order at the NBBO is displayed and was posted to the order book prior to the lead market maker quote at the NBBO, the method matches the incoming order with the at least one customer order. However, if the customer order at the NBBO was posted to the order book after the lead market maker quote at the NBBO or if the customer order at the NBBO is not displayed, the method proceeds to compute the lead market maker allocation percentage.

According to yet another aspect of the present invention, the method may include the lead market maker having a quote at the NBO or the NBB. The method may also determine if an incoming discretionary order is too executable. The method may also have a market maker appointed in the option series in addition to the lead market maker. Wherein if the incoming discretionary order is from a specified order sending firm and is directed to and designates the appointed market maker, the method may include determining if the order sending firm is permissioned to direct orders to the designated market maker. If the order sending firm does have permission to direct orders to the designated market maker, the method may determine if the designated market maker has a quote at the NBBO and if the designated market maker has a quote at the NBBO, the method computes an allocation percentage for the designated market maker. The method may then match the incoming discretionary order up to the lesser of the total size of the discretionary order or the computed allocation percentage amount for the designated market maker.

According to another aspect of the present invention, the market center may include a display order process, a working order process and a routing process, wherein, after an incoming discretionary order is matched with the lead market maker quote, the method may process the incoming discretionary order in the display order process, the working order process and the routing process.

According to another aspect of the present invention, a market center which lists a plurality of options series and handles discretionary order trading includes an order book for each option series and a quote book for each option series, wherein the order book has a displayed interest component and a nondisplayed interest component and wherein a plurality of the option series have an appointed lead market maker. The market center further includes an interface for receiving orders and an interface for receiving quotes, a market center memory for storing code for analyzing and processing orders and quotes and a processor for interacting with the interfaces and executing the code for analyzing and processing quotes and orders. The code, when executed, receives an incoming discretionary order having a display price for display and a discretionary price that is not displayed, retrieves the side of the NBBO opposite the incoming discretionary order, and determines if the incoming discretionary order is marketable using either its display price, or if necessary, using its superior discretionary price. If the discretionary order is marketable, the executed code further determines if the discretionary order is for an option series that has a lead market maker and, if so, determines if the lead market maker has a quote at the NBBO. Wherein if the discretionary order is marketable and the lead market maker has a quote at the NBBO, the executed code further computes an allocation percentage for the lead market maker and matches the incoming discretionary order up to the lesser of the total size of the discretionary order or the computed allocation percentage amount for the lead market maker.

DESCRIPTION OF THE DRAWINGS

These and other features, aspects and advantages of the present invention will become better understood with regard to the following description, appended claims and accompanying drawings where:

FIG. 3 illustrates an order execution hierarchy of the equity options electronic order book of the present invention;

FIG. 7B is an exemplary designated market maker/order sending firm permissions table;

DETAILED DESCRIPTION

Figure 1:
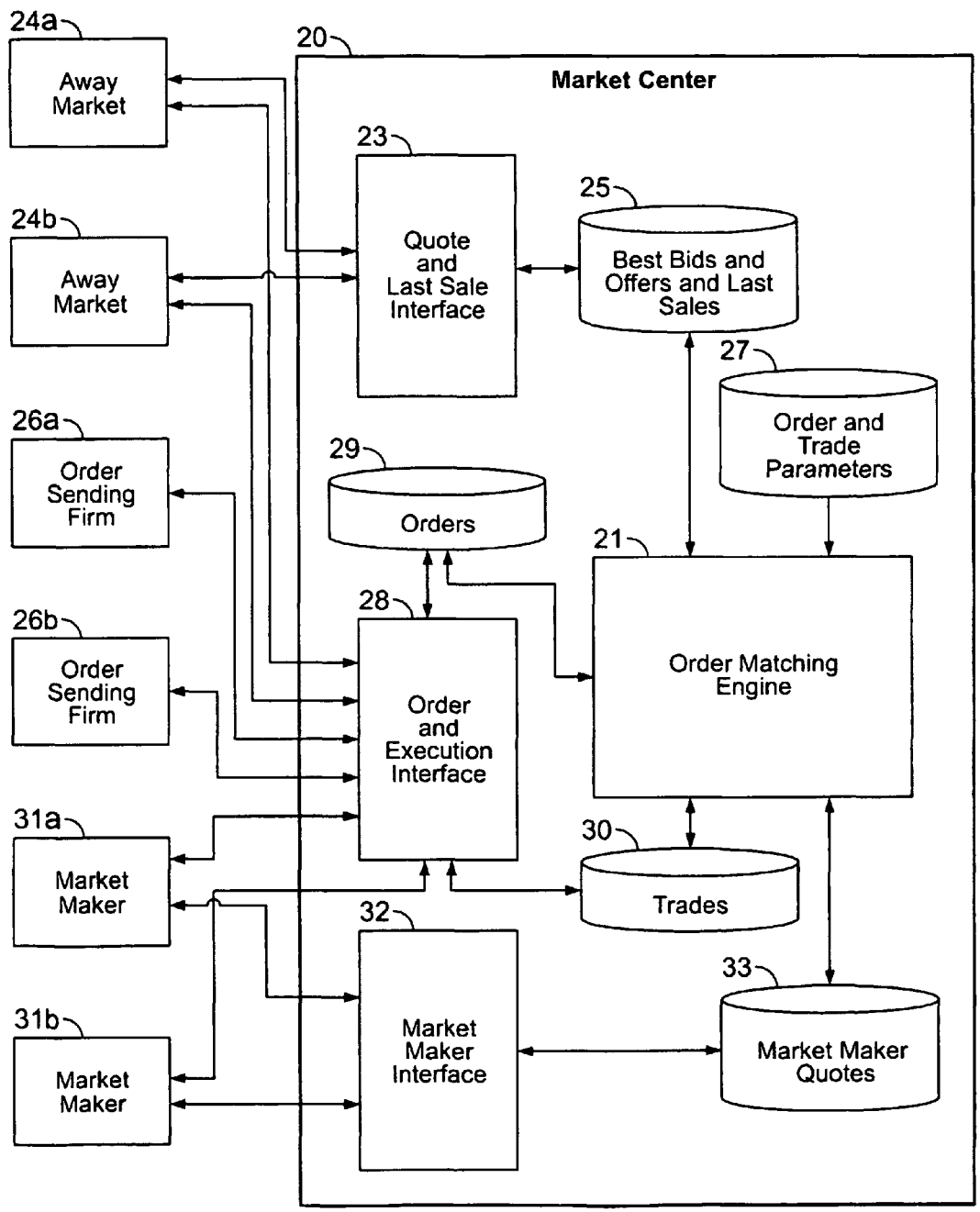
FIG. 1 is a block diagram illustrating the trading environment in which an embodiment of the present invention operates.

Referring to FIG. 1, a trading environment in which an embodiment of the system and method of the present invention operates is depicted. The examples discussed herein describe the use and application of the present invention in an equity options market center environment, but it should be understood that the present invention could be used in any type of financial instrument market center environment (e.g., equities, futures, bonds, etc.). This embodiment of the invention describes the use of multiply listed single-leg equity options, wherein contracts for a specified underlying security can be bought (if the option type is a call) or sold (if the option type is a put) at a specific strike price prior to a specific exercise date. The functionality described herein is generally applicable to all standard options products (including near-term options and LEAPs) in all underlying securities, including but not limited to exchange-listed stocks, Exchange-Traded Funds (ETFs), Holding Company Depositary Receipts (HOLDRs), American Depositary Receipts (ADRs), and commonly traded indices.

The trading environment of this embodiment includes a market center 20 which interacts with a number of other market centers 24 (i.e. away markets) and traders at order sending firms 26 and market makers 31. It should also be understood that the market center 20 referred to herein refers to a computing system having sufficient processing and memory capabilities and does not refer to a specific physical location. In fact, in certain embodiments, the computing system may be distributed over several physical locations. It should also be understood that any number of traders 26 or market makers 31 or away market centers 24 can interact with the market center 20. The market center 20 is the market center on which a specific-trader 26 posts a specific order, and on which a specific market maker 31 posts a specific quote. The market center 20 includes an order matching engine 21, which validates, maintains, ranks, executes and/or routes all orders on the market center 20, and which executes marketable quotes on the market center 20. In this embodiment, the code for the order matching engine 21 is stored in the market center's memory.

The market center 20 may also include a quote and last sale interface 23 that interacts with the away market centers 24 to capture quote and last sale information. This information is stored to a best bids and offers and last sales data structure 25. This data structure 25 is where the market best bid and offer information is stored. This data structure 25 is also where the market trade reports (prints) are stored. The market center 20 may also include an order and trade parameters data structure 27. The order and trade parameters data structure 27 stores pre-defined trading parameters and rules that are used by the order matching engine 21 in matching orders and executing trades. The market center 20 may also include an order and execution interface 28 which interacts with the traders 26, the market makers 31, the away market centers 24 and the order matching engine 21 in the order execution process.

The market center 20 may also include an order information data structure 29 where order information is stored and a trade information data structure 30 where completed trade information is stored. The market center 20 may also include a market maker interface 32 that interacts with market makers 31 to capture market maker bids and offers in assigned issues. These bids and offers are depicted in a market maker quote structure 33 in this illustration.

Throughout the discussion herein, it should be understood that the details regarding the operating environment, data structures, and other technological elements surrounding the market center 20 are by way of example and that the present invention may be implemented in various differing forms. For example, the data structures referred to herein may be implemented using any appropriate structure, data storage, or retrieval methodology (e.g., local or remote data storage in data bases, tables, internal arrays, etc.). Furthermore, a market center of the type described herein may support any type of suitable interface on any suitable computer system.

Figure 2:
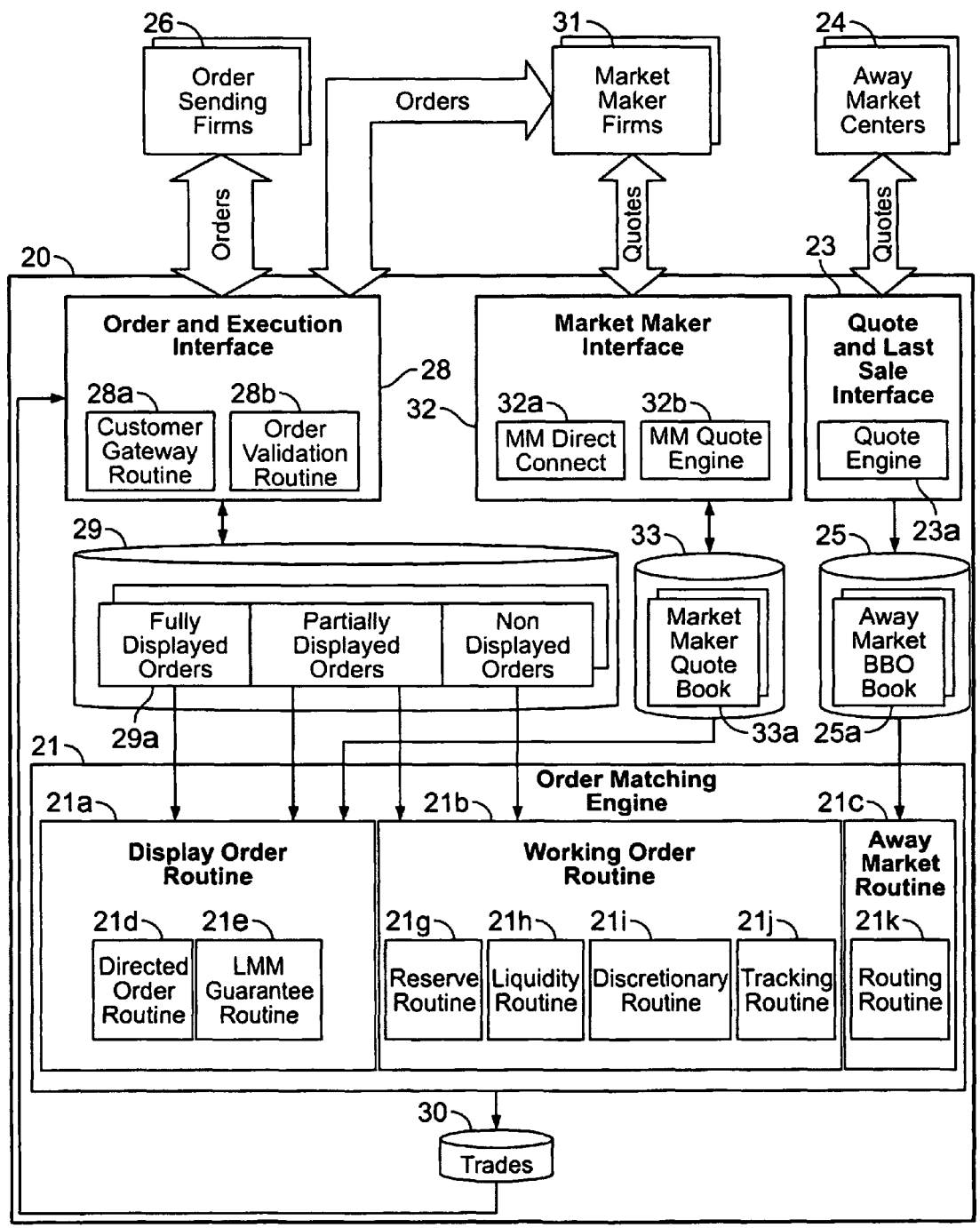
FIG. 2 is a block diagram illustrating an overview of the architecture involved in the equity options electronic order book of the present invention.

Referring now to FIG. 2, a trading environment in which orders and quotes are ranked and executed is depicted. Because the market center 20 disclosed in this embodiment is order-driven, which encourages orders and quotes to compete equally, the market center 20 is designed to allow users to send a very diverse and sophisticated body of order types. For example, with the disclosed market center 20, a user may, as described in detail below, use the sophisticated order types available to mask their trading intentions from the marketplace by using order types that do not display all or part of an order's size or price.

The market center 20 disclosed in this embodiment also ranks all resting orders in such a manner as to give preference to displayed trading interest over nondisplayed trading interest at the same price so that users are encouraged to send displayed limit orders at the best possible prices. The market center 20 disclosed in this embodiment can be used in a non-competing market maker environment, a competing market maker environment and in an environment that does not use market makers in some or all of the issues. In a preferred embodiment, described herein, the market center 20 has a non-competing market maker environment. The market center order books are largely flat and open based on price/time principles. As described below, lead market makers are guaranteed participation entitlements, but only when they are already on the NBBO in their assignments, which encourages tighter spreads and faster executions.

In the non-competing market maker embodiment, described herein, market maker quotes cannot be automatically or manually improved for the purpose of participating with a specific incoming order, nor can a market maker send a price-improving order for the purpose of intercepting a specific incoming order. In this embodiment, market makers do not see an incoming order at all. As a result, a user of this system that sends an order is able to trade anonymously without divulging his or her trading intentions. Another characteristic of this non-competing market maker embodiment, as described below, is that only the lead market maker (or alternatively, a specific, designated non-lead market maker who is temporarily granted lead market maker privileges in a directed order process) is entitled to guaranteed participation with an incoming order, and therefore complex market maker pro rata allocations, as used in prior systems, are not necessary in this embodiment.

Referring specifically to FIG. 2, in this embodiment, market makers 31 can send orders and quotes to the market center 20, and order sending firms 26 can send orders to the market center 20. Away market centers 24 also route orders to the market center 20 and receive routed orders from the market center 20. Such "linkage" processing, however, is known and is not described herein. The order and execution interface 28 includes a customer gateway routine 28*a*, which, when executed, initiates a process that determines whether and by what means a specific order sending firm 26 is eligible to send orders to the market center 20, and also includes an order validation routine 28*b* which, when executed, initiates a process that determines whether the specific order meets all the business requirements of the market center 20. If an order is determined to be valid, then the order and execution interface 28 releases the order to the order matching engine 21 for further processing. Marketable orders are executed immediately, whereas nonmarketable orders that can execute later are posted to an order book 29*a* on the order data structure 29. The order book 29*a* includes all active nonmarketable orders resident on the market center 20, including fully-displayed orders, partially-displayed order and nondisplayed orders.

As illustrated in FIG. 2, market makers 31 may send orders as well. If a market maker's order is determined to be valid, as with an order sending firm's order, then the order and execution interface 28 releases the order to the order matching engine 21 for further processing. As with order sending firm orders, marketable orders are executed immediately, whereas nonmarketable orders are posted to the same order book 29*a* as are orders from order sending firms 26.

The market maker interface 32 includes a market maker direct connect routine 32*a*, and also includes a market maker quote engine 32*b*, which, when executed, initiates a process that receives and analyzes market maker quotes. The quote and last sale interface 23 includes a quote engine 23*a*, which, when executed, initiates a process that receives and analyzes away market BBO quotes and receives and analyzes the consolidated NBBO quote.

In this embodiment, the order matching engine 21 includes a display order routine 21*a*, a working order routine 21*b* and an away market routine 21*c*. When executed, the display order routine 21*a* implements a process that maintains and ranks displayed orders. As indicated in FIG. 2, market maker quotes are integrated with the display order routine 21*a*. The working order routine 21*b*, when executed, implements a process that maintains and ranks working orders. Working orders are orders having a conditional or undisplayed price and/or size that is not disclosed to the marketplace, but is electronically accessible for matching. For example, a discretionary order is a working order because it has a displayed price and a nondisplayed price. The working order process is significant to the "order-driven" market center of this invention because it allows highly sophisticated order types to be submitted to the market center 20. By way of example, such sophisticated order types allow market participants to be active in the market without disclosing trading intentions, which increases the liquidity of the market center 20.

The display order routine 21*a* receives and processes fully-displayed orders and partially-displayed orders. When presented with a marketable incoming order, the display order routine 21*a* ranks disseminated market maker quotes and resting displayed orders or portions thereof according to strict price/time priority. The display order routine 21*a*, in this embodiment, includes the following sub-routines: a directed order routine 21*d* and a lead market maker guarantee routine 21*e*. The directed order routine 21*d* is a routine that, when initiated, guarantees a specified percentage of an incoming directed order to a designated market maker after customer orders ranked ahead of the designated market maker's quote execute first. The lead market maker routine 21*e* is a routine that, when initiated, guarantees a specified percentage of an incoming non-directed order to a lead market maker after customer orders ranked ahead of the lead market maker's quote execute first.

The working order routine 21b receives and processes partially-displayed orders and nondisplayed orders. The working order routine 21b, in this embodiment, includes the following sub-routines: a reserve routine 21g, a liquidity routine 21h, a discretionary routine 21i and a tracking routine 21j. The reserve routine 21g is a routine that, when initiated, ranks and maintains reserve orders, which display a portion of the size to the marketplace but keep another undisplayed portion in reserve. The process initiated when the reserve routine 21g is activated is the Reserve Process, which is described in detail herein. The liquidity routine 21h is a routine that, when initiated, ranks and maintains passive liquidity orders, which are completely nondisclosed limit orders that grant price improvement to incoming orders. The discretionary routine 21i is a routine that, when initiated, ranks discretionary orders, which display a price to the marketplace but include a superior undisplayed price. The tracking routine 21j is a routine that, when initiated, ranks and maintains tracking liquidity orders, which are completely nondisclosed orders whose prices automatically track the NBBO and execute only if they can prevent an incoming order from routing.

As illustrated in FIG. 2, although market maker quotes are maintained in a separate market maker quote book 33a, they are retrieved and integrated with displayed orders and partially-displayed orders in the processes initiated when the display order routine 21a is activated ("Display Order Process"), which includes the directed order routine 21d and the lead market maker guarantee routine 21e, when the order matching engine 21 evaluates matching opportunities. As also illustrated in FIG. 2, although away market quotes are maintained in a separate away market best bid and offer ("BBO") book 25a, they are retrieved and integrated with displayed orders, partially-displayed orders, nondisclosed orders and market maker quotes when the order matching engine 21 evaluates matching opportunities and routing opportunities.

FIG. 2 shows the relative rankings of various order execution routines initiated by the order matching engine 21. As described above, the order matching engine 21 has a display order routine 21a, a working order routine 21b, and an away market routine 21c. The sequence of the subroutines 21d, 21e and 21g through 21k generally correspond to the sequence in which the order matching engine 21, in this embodiment, attempts to process an incoming marketable order. The order matching engine 21 attempts to execute an incoming marketable order as fully as possible in a given routine before continuing to the next-highest ranking routine.

In this embodiment, upon receiving an incoming marketable order, the display order routine 21a is typically initiated first, which activates the Display Order Process. The Display Order Process initiates the directed order routine 21d if the incoming order is a directed order and initiates the lead market maker guarantee routine 21e if the incoming order is unable to execute in the directed order routine 21d. After the Display Order Process has completed, if the incoming order still has quantity available to trade, then the working order routine 21b is initiated next. It attempts to execute the remainder of the incoming order in the reserve routine 21g first; in the liquidity routine 21h second; in the discretionary routine 21i third; and in the tracking routine 21j fourth. If the incoming order still has quantity remaining and is eligible to route off the market center 20, then the away market routine 21c is initiated next.

Referring to FIG. 3, the sequence in which resting orders and quotes are ranked for execution in a preferred embodiment is shown in greater detail. In the example depicted in FIG. 3, there are three orders or quotes that have been ranked by each of the order execution routine processes, at two price levels: the NBBO, and one tick inferior to the NBBO. When the order matching engine 21 evaluates matching and pricing opportunities for a given issue (option series), it retrieves the order book 29a, the market maker quote book 33a, and the away market BBO book 25a and momentarily combines them into a single ranked list of bids and a single ranked list of offers in local memory. All the bids (buy orders and bid quotations) are ranked on one side of the list, and all the offers (sell orders and offer quotations) are ranked on the opposite side of the list. The ranked list of bids combined with the ranked list of offers is referred to as the "virtual consolidated order and quote list." FIG. 3 illustrates one side of an exemplary virtual consolidated order and quote list for a given issue.

The order matching engine 21 ranks each side of the virtual consolidated order and quote list according to price/time priority principles, but with a preference for displayed orders and quotes over working orders at the same price. This method of ranking is referred to as "price/display/time priority" in this document to indicate that an order's display characteristics (i.e., displayed versus not displayed) trumps the time that an order is received. Simply put, at a given price level, a nondisplayed order has a lower priority than a displayed order that was received later. As also shown in FIG. 3, resident orders and quotes always have priority over away market quotes at the same price, regardless of the time received.

Each order execution routine is responsible for ranking a subset of the resting orders and/or quotes in the virtual consolidated order and quote list. Resting orders and quotes are generally ranked in the sequence shown in the example of FIG. 3. Beginning with the first column of FIG. 3, all market maker quotes (e.g., lead market maker quotes and non-lead market maker quotes) and all displayed orders (e.g., exchange-restricted orders, inside limit orders, sweep limit orders, intermarket orders and pegged orders) are consolidated together and ranked in strict price/time priority in the Display Order Process, regardless of the order type or quote type. The displayed portions of partially-displayed orders (for example, the displayed portion of a reserve order, and the displayed portion of a discretionary order) are also combined with the other fully-displayed order types and market maker quotes and ranked in strict price/time priority in the Display Order Process.

The process initiated by the directed order routine 21d ("Directed Order Process") and the process initiated by the lead market maker guarantee routine 21e ("LMM Guarantee Process") match a marketable incoming order against a subset of the resting displayed orders and market maker quotes that are combined and ranked in the Display Order Process. In this embodiment, all displayed customer orders that are ranked ahead of a lead market maker's quote are eligible to execute in the LMM Guarantee Process. Similarly, all displayed customer orders that are ranked ahead of a designated market maker's quote are eligible to execute in the Directed Order Process. Accordingly, the displayed portion of a customer reserve order is eligible to execute in the Directed Order Process or in the LMM Guarantee Process, but its nondisclosed reserve portion is not eligible. Similarly, the displayed price of a customer discretionary order is eligible to execute in the Directed Order Process or the LMM Guarantee Process, but its nondisclosed discretionary price is not eligible. If a marketable incoming order still has quantity available to trade after it has completed executing in the Directed Order Process or in the LMM Guarantee Process (or alternatively, if it is unable to execute in either process), then the order matching engine 21 attempts to execute the order in the Display Order Process next, i.e., in strict price/time priority, with no preference granted to customers or market makers.

Continuing to the second column, the Reserve Process executes the reserve portions of resting orders only after all eligible orders and quotes at the same price have been executed in the Display Order Process. Reserve portions of orders are ranked in the Reserve Process according to the price/time priority assigned to their displayed portions in the Display Order Process.

Continuing to the third column, the process initiated by the liquidity routine 21h ("Liquidity Process") executes passive liquidity orders only after any eligible reserve portions at the same price have been executed in the Reserve Process. Passive liquidity orders are ranked in price/time priority in the Liquidity Process.

Continuing to the fourth column, the process initiated by the discretionary routine 21i ("Discretionary Process") executes discretionary orders only after any eligible passive liquidity orders at the same price have been executed in the Liquidity Process. Discretionary prices are ranked according to the price/time priority assigned to their displayed prices in the Display Order Process. It should be noted that an order executes using discretion in the Discretionary Process only if it cannot execute at its displayed price in the Display Order Process. This means the displayed prices for cells 10 through 12 are one or more ticks inferior to the NBBO. For example, assume an option series with a minimum price increment of 0.05 where the NBB is 2.00. If the order with the highest ranking at the price of 1.95 is a discretionary order whose display price is 1.95 and whose discretionary price is 2.00, then the display price of the order is ranked in cell 19 and the discretionary price of the order is ranked in cell 10. It should also be noted that discretionary orders are described as stepping "up" to a superior price, even in the case of discretionary sell orders (which step "up" to a lower price), because the best price is shown at the top of the virtual consolidated order and quote list, the next-best price is shown lower in the virtual consolidated order and quote list, and so forth, as illustrated in FIG. 3.

Continuing to the fifth column, the process initiated by the tracking routine 21j ("Tracking Process") executes tracking orders only after any eligible discretionary orders that can "step up" to the same price have been executed in the Discretionary Process, and the incoming order is about to route off the market center 20. Tracking liquidity orders are ranked in price/time priority in the Tracking Process.

Continuing to the last column, the process initiated by the routing routine 21k ("Routing Process") routes orders to eligible away markets if the order cannot execute at the best price on the market center 20. If the order type cannot be routed, then the order is generally canceled or repriced less aggressively.

After executing against all eligible orders and quotes at the NBBO in the sequence of their ranking (from 1 through 18 in this example), if an incoming order is allowed to execute at a price inferior to the NBBO, then it would continue to execute against all eligible orders (and quotes, if allowed) at the next-best price level, i.e., at one minimum price increment (tick) inferior to the NBBO, in the sequence of their ranking (from 19 through 30 in this example). Although it is not shown in the illustration, the displayed prices for cells 28, 29, and 30 are two or more ticks inferior to the NBBO, i.e., in cells 34 through 36 or lower. As tracking orders can only execute at the NBBO by definition, they are not shown in FIG. 3 at one tick inferior to the NBBO. If an order type (e.g., an intermarket sweep order) is also allowed to contemporaneously route to away markets inferior to the NBBO, then the incoming order would continue to execute against the eligible away market quotes at one tick inferior to the NBBO, in the sequence of their ranking (from 31 through 33 in this example).

It should also be noted that certain working order types (e.g., discretionary orders and passive liquidity orders) can execute at prices between the spread (i.e., higher than the national best bid and lower than the national best offer) under certain conditions. Prices between the spread are not illustrated in FIG. 3. A discretionary order is allowed to execute against an incoming order at a price between the spread only if the incoming order is not priced at or better than the NBBO, and would be canceled or posted otherwise. It should be understood that this list of working orders is exemplary and that other embodiments of the invention may not utilize the working orders described above or may use differing combinations of them.

For ease of explanation, the disclosure herein describes discretionary orders as a separate order type, but in actuality the market center 20 may also allow other order types (e.g., reserve orders and pegged orders) to include discretionary prices. A pegged order with discretion behaves like the discretionary order described in this embodiment, except that its prices are not fixed on the incoming order. Instead, the order's displayed price is automatically set by the order matching engine 21 in relation to the current NBBO, and the discretionary price is automatically set in relation to the displayed price, but must always be more aggressive than the displayed price by definition. A primary peg order with discretion is priced according to the same side of the NBBO, i.e., a primary peg buy order is priced in relation to the NBB and a primary peg sell order is priced in relation to the NBO. In contrast, a market peg order with discretion is priced according to the opposite side of the NBBO, i.e., a market peg buy order is priced in relation to the NBO and a market peg sell order is priced in relation to the NBB.

As a pegged discretionary order is generally not marketable when it is first received, it is ranked in the internal order book 29a in the same manner as a non-pegged discretionary order. The order is ranked in the Display Order Process according to the price/time priority of its displayed price, whereas the discretionary price of the pegged order is ranked in the Working Order Process according to the price/time priority of the displayed order. While resting in the internal order book 29a, pegged orders with discretion are automatically repriced as necessary when the NBBO changes. As the discretionary price is always computed as an offset from the displayed price, both the displayed price and the discretionary price are automatically adjusted.

A resting pegged order with discretion is eligible for participation in the Directed Order Process or the LMM Guarantee Process according to the same rules for non-pegged discretionary orders. If the pegged discretionary order is a customer order with a displayed price at the NBBO and has time priority over the applicable market maker's quote (either the lead market maker or the designated market maker), then the pegged discretionary order is eligible to step ahead of other orders and quotes at the NBBO that were received earlier. However, if the displayed price is inferior to the NBBO, then the order is not eligible to participate in the Directed Order Process or the LMM Guarantee Process even if its discretionary price is equal to or superior to the NBBO.

Incoming Discretionary Buy Order Received

Figure 4A:
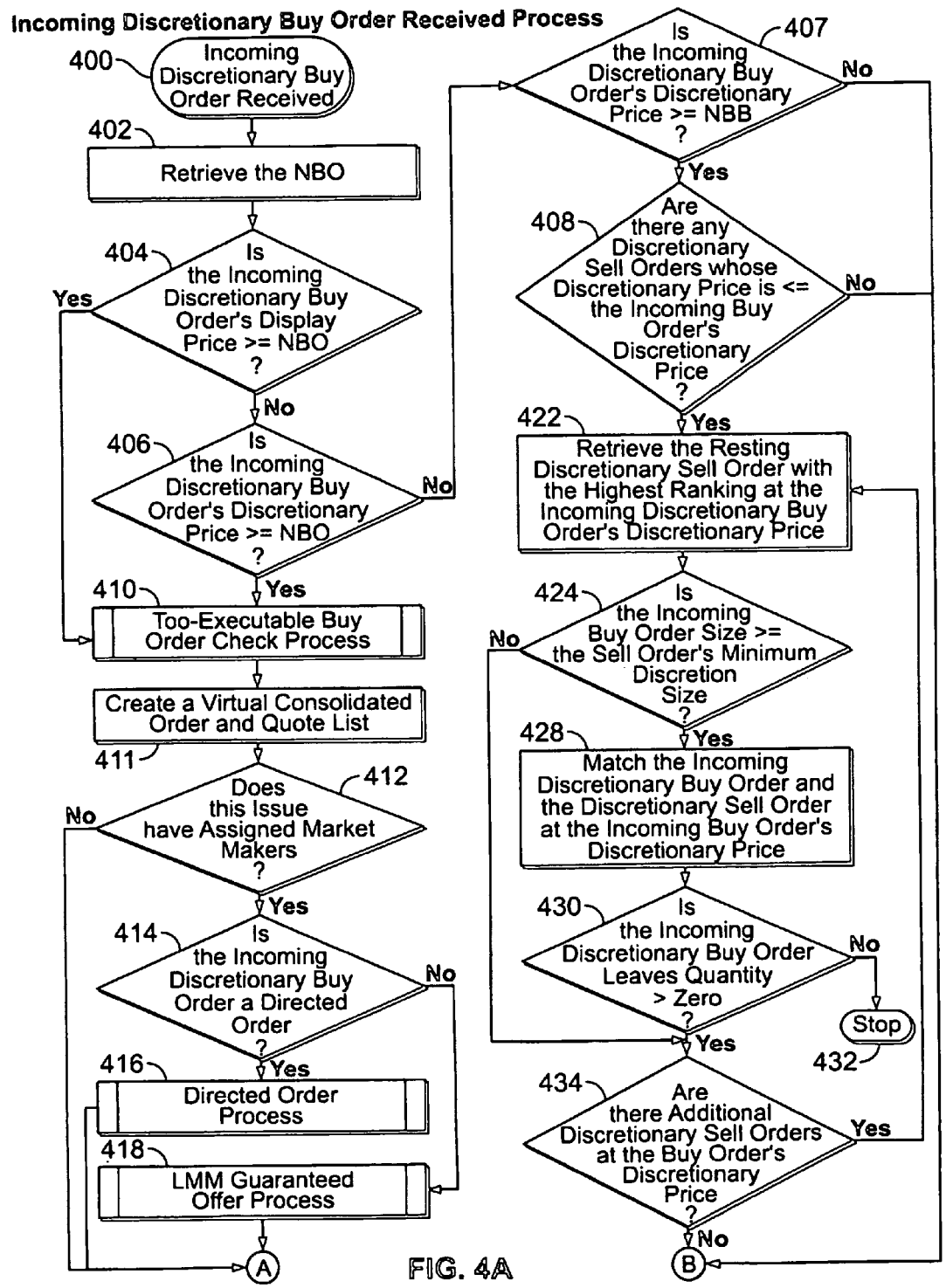
FIGS. 4A-4B are flow diagrams illustrating a process for receiving an incoming discretionary buy order in an embodiment of the present invention.
Figure 4B:
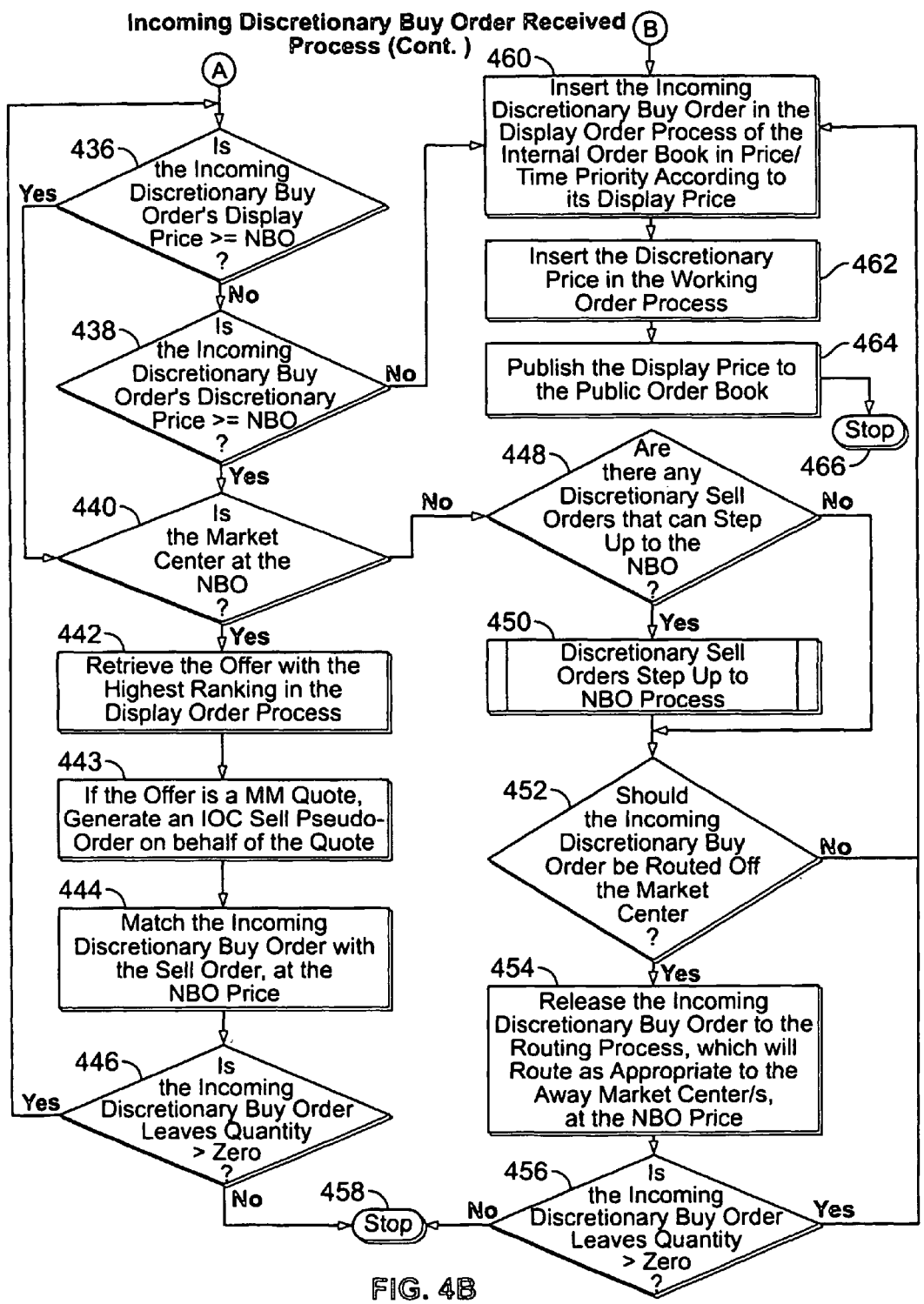

Referring to FIGS. 4A-4B, in this embodiment, the order matching engine 21 receives an incoming discretionary buy order as indicated at step 400, and determines whether the order can execute. If the incoming discretionary buy order is marketable against the NBO, then the process determines if the incoming discretionary buy order is eligible to execute first in a guaranteed entitlement process and, if it is, processing the incoming discretionary buy order in the guaranteed entitlement process. The process then releases any unexecuted portion of the order to the Display Order Process for additional matching opportunities. If the incoming discretionary buy order is not marketable against the NBO, it may be able to execute between the spread if there are any resting discretionary sell orders on the internal order book 29*a* that can step up to match it. If, however, the incoming discretionary buy order cannot execute, then it ranks the order in the internal order book 29*a* in price/time priority according to its display price. The displayed portion of the discretionary buy order resides in the Display Order Process whereas the discretionary price resides in the Working Order Process.

In step 402, the process retrieves the NBO, and in step 404, it checks if the incoming discretionary buy order's display price is greater than or equal to the NBO. If the incoming discretionary buy order's display price is not marketable, i.e., its price is lower than the NBO, then the process continues to step 406, where it checks if the incoming discretionary buy order's discretionary price is greater than or equal to the NBO. If the incoming discretionary buy order's discretionary price is also not marketable, i.e., its price is also lower than the NBO, then the process continues to step 407, where it checks if the incoming discretionary buy order's discretionary price is greater than or equal to the NBB.

If the discretionary price is less than the NBB, then the order is not executable as it would cause a trade-through violation, and must be ranked in the internal order book 29*a*. The process continues to step 460, where it ranks the incoming discretionary buy order in the Display Order Process according to the price/time priority of its display price. In step 462, the process stores the incoming discretionary buy order's discretionary price in the Working Order Process. By way of explanation, the discretionary buy order has only one position in the internal order book 29*a*. The discretionary price is not treated as a separate order. In step 464, the process publishes the discretionary buy order's display price to the public order book, and the process terminates in step 466 as indicated.

Returning to step 407, if, however, the incoming discretionary buy order's discretionary price is greater than or equal to the NBB, then the incoming order may be executable if there are eligible discretionary sell orders on the order book 29*a*. The process continues to step 408, where it checks if there are any resting discretionary sell orders whose discretionary price is less than or equal to the incoming buy order's discretionary price. If there are such resting discretionary sell orders, then in step 422, the process retrieves the discretionary sell order with the highest ranking in the internal order book 29*a* at the incoming discretionary buy order's discretionary price. For example, if an incoming buy order has a discretionary price of 2.05, then the process evaluates all the discretionary sell orders that can step up to the price of 2.05 and then retrieves the discretionary sell order with the highest ranking at the price of 2.05.

In step 424, the process checks if the incoming discretionary buy order's size is greater than or equal to the resting sell order's minimum discretion size (which defaults to zero if no minimum discretion size is specified). In this embodiment, if the resting discretionary sell order does include a minimum discretion size and the incoming discretionary buy order does not have sufficient size to fill it, then the orders cannot execute, and the process continues to step 434, where it checks if there are any additional discretionary sell orders that can step up to trade with the incoming discretionary buy order.

Returning to step 424, if, however, the incoming discretionary buy order's size is greater than or equal to the resting discretionary sell order's minimum discretion size (if no minimum discretion size is specified, then the buy order size is automatically greater), then the process continues to step 428, where it matches the incoming discretionary buy order and the resting discretionary sell order at the incoming discretionary buy order's discretionary price. Accordingly, the resting discretionary sell order only used as much discretion as was required to execute.

In step 430, the process checks if the incoming discretionary buy order still has any quantity remaining. If it does not, then the process terminates in step 432 as indicated. If, however, the incoming discretionary buy order still has available contracts, then the process continues to step 434, where it checks if there are any additional resting discretionary sell orders that can step up to trade with the incoming discretionary buy order.

If additional eligible orders are indeed on the order book 29*a*, then the process returns to step 422, where it retrieves the next highest-ranked discretionary sell order and repeats the steps described above until the incoming discretionary buy order is fully matched or else is no longer executable and must be posted. Returning to step 434, if there are no additional discretionary sell orders that can step up to match the incoming discretionary buy order, then the process continues to steps 460 through 466, where it posts the remainder of the incoming discretionary buy order as described above and then terminates.

Figure 5:
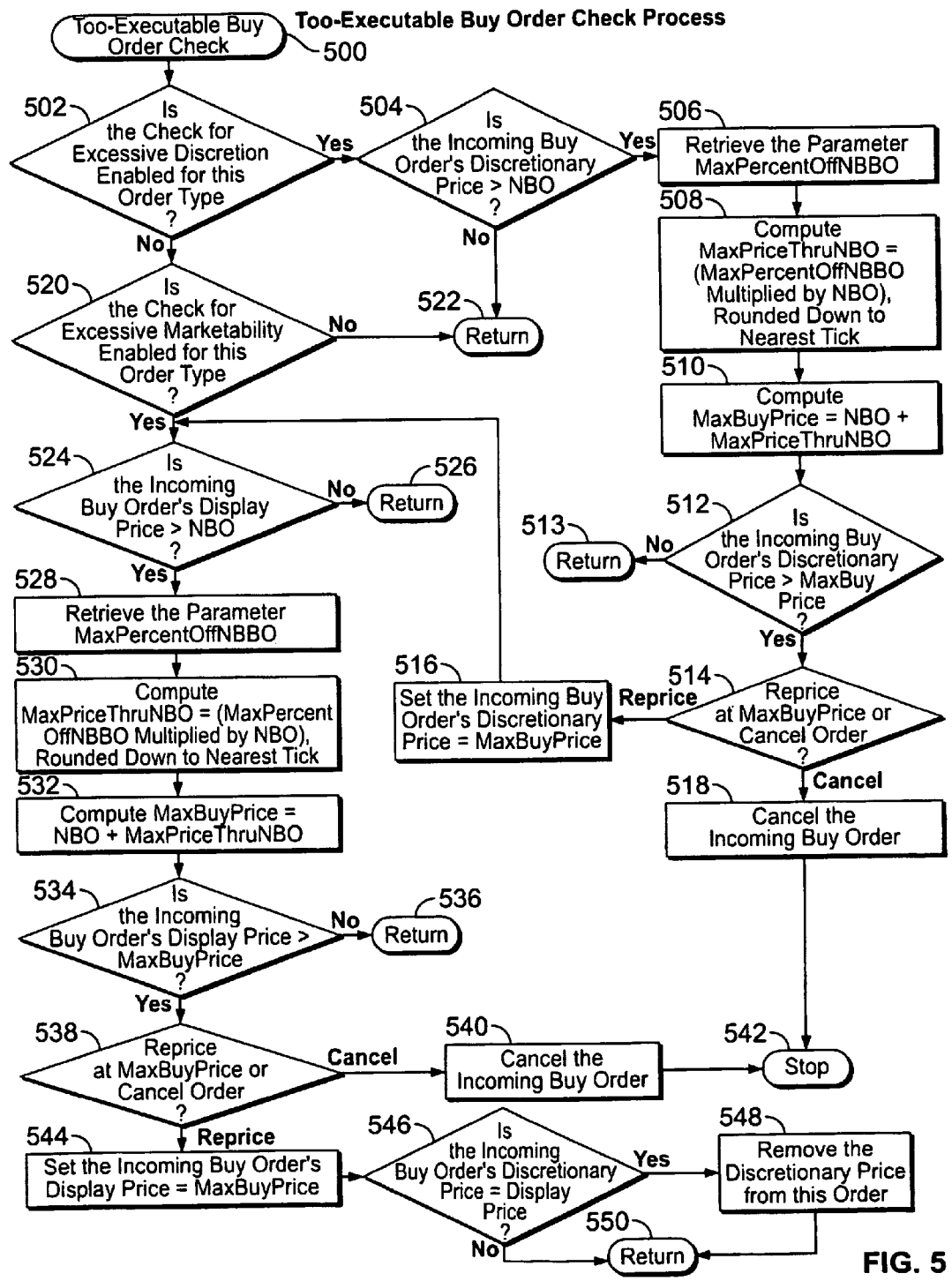
FIG. 5 is a flow diagram illustrating a process for checking if a buy order is too-executable.
Figure 6:
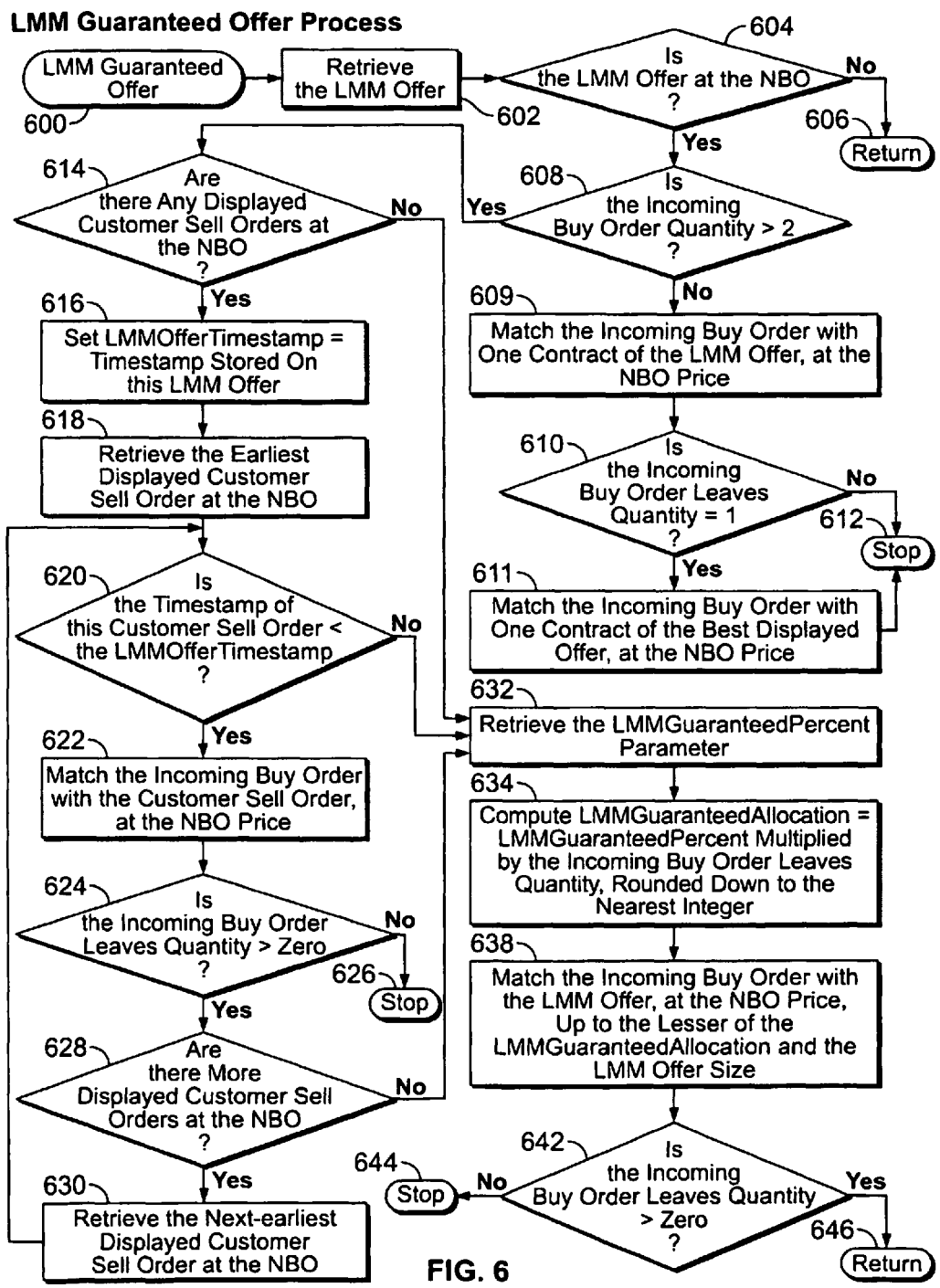
FIG. 6 is a flow diagram illustrating a process for handling lead market maker guaranteed offer entitlements in an embodiment of the present invention.
Figure 7A:
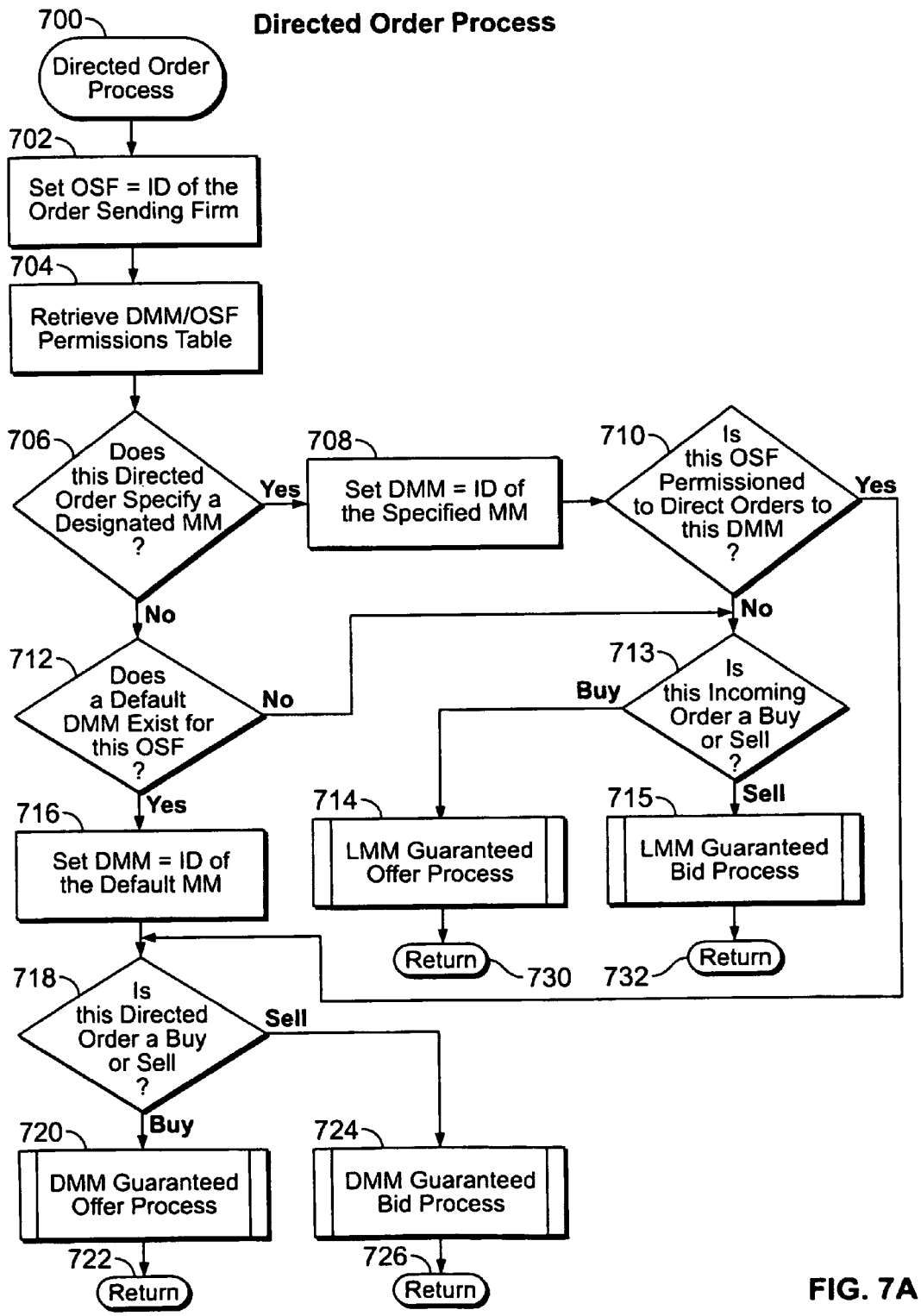
FIG. 7A is a flow diagram illustrating a process for handling directed orders in an embodiment of the present invention.

Returning to step 404, if, however, the incoming discretionary buy order's display price is greater than or equal to the NBO, then the process continues to step 410, where the "Too-Executable Buy Order Check Process" is initiated at step 500 (FIG. 5). The process also continues to step 410 if at step 406 the process determines that the incoming discretionary buy order's discretionary price is greater than or equal to the NBO. If the incoming discretionary buy order is not canceled by the Too-Executable Buy Order Check Process as described in detail below, then the process continues to step 411, where it creates a virtual consolidated order and quote list in this embodiment for the option series by combining the away market BBO book 25*a*, the market maker quote book 33*a*, and the order book 29*a*, and ranking the orders and quotes according to price/display/time priority, but with a preference for displayed trading interest over away market quotes at the same price. The process continues to step 412, where it checks if the option series has any assigned market makers. If it does, then the process continues to step 414, where it checks whether the incoming discretionary buy order is a directed order. If the incoming discretionary buy order is a directed order, then the process continues to step 416 where the "Directed Order Process" is initiated in step 700 (FIG. 7A). If, however, the incoming discretionary buy order is not a directed order, then the process proceeds to step 418 where the "LMM Guaranteed Offer Process" is initiated instead in step 600 (FIG. 6).

Regardless of whether the incoming discretionary buy order executes in the Directed Order Process, in the LMM Guarantee Process or in neither process (if the applicable market maker is not quoting at the NBO and is therefore ineligible for a guaranteed entitlement), if the incoming discretionary buy order still has quantity available to trade, then the process continues to step 436, where it checks if the incoming discretionary buy order's display price is greater than or equal to the NBO. If it is, the process continues to step 440. If it is not, then the process checks if the incoming discretionary buy order's discretionary price is greater than or equal to the NBO at step 438, and if it is, the process continues to step 440 at that point as well. If, however, at step 438, the process determines that the incoming discretionary buy order's discretionary price is now less than the NBO (which is possible if the order exhausted the NBO by trading), then the process continues to steps 460 through 466, where it posts the remainder of the incoming discretionary buy order as described above and then terminates.

Referring to step 440, at step 440, the process checks if the market center 20 is at the NBO. If it is, then the process continues to step 442, where it retrieves the displayed sell order or market maker offer with the highest ranking in the Display Order Process. If it is a market maker offer, then in step 443, the process in this embodiment generates an IOC sell pseudo-order on behalf of the underlying market maker offer. In step 444, it matches the incoming discretionary buy order and the sell order or pseudo-order, at the NBO price. If the sell order is a pseudo-order, then the process also notifies the market maker quote engine 32b of the quantity of contracts that were executed so that it can decrement the market maker offer as appropriate.

In step 446, the process checks if the incoming discretionary buy order has any quantity remaining. If it does not, then the process continues to step 458, where it terminates as indicated. If it does still have quantity available, then it returns to step 436, where it repeats the steps described above until the incoming discretionary buy order is depleted or can no longer execute against the order book 29a.

Figure 9:
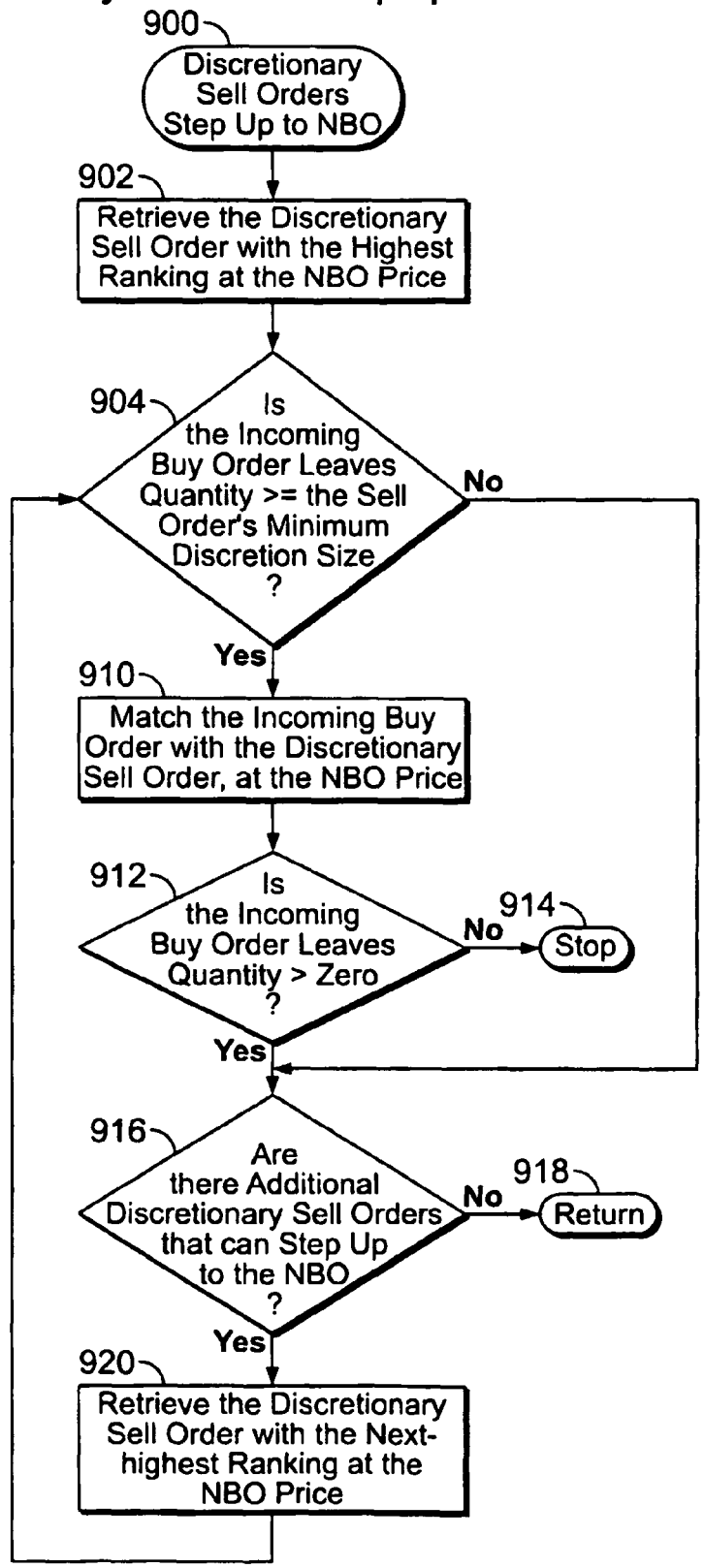
FIG. 9 is a flow diagram illustrating a process where a posted discretionary sell order steps up to the national best offer ("NBO") to execute in an embodiment of the invention.

Returning to step 440, if the market center 20 is not at the NBO, then the process may have to route the incoming discretionary buy order. However, in step 448, the process first checks if there are any resting discretionary sell orders that can step up to the NBO price. If there are eligible resting discretionary sell orders, then the process continues to step 450, where the "Discretionary Sell Orders Step Up to NBO Process" activates and proceeds to step 900 (FIG. 9).

Returning to step 448, if, however, there are no eligible discretionary sell orders, then the process continues to step 452, where it checks whether the incoming discretionary buy order should be routed off the market center 20. Unless all the away market centers quoting at the NBO have already been fully satisfied by prior routed orders, the process continues to step 454, where it releases the incoming discretionary buy order to the routing process, which routes to any away market center at the NBO whose offer size has not been fully satisfied, at the disseminated NBO price.

The process then continues to step 456, where it checks if the incoming discretionary buy order has any quantity remaining after it has routed. If it does not, then the process terminates in step 458 as indicated. If, however, it still has quantity available, then the process continues to steps 460 through 466, where it posts the remainder of the incoming discretionary buy order as described above and then terminates. Returning to step 452, if the process determines that the incoming discretionary buy order should not be routed, then the process continues to steps 460 through 466, where it posts the remainder of the incoming discretionary buy order as described above and then terminates.

Too-Executable Buy Order Check Process

Referring now to FIG. 5, the Too-Executable Buy Order Check Process is illustrated. The Too-Executable Buy Order Check Process determines if an incoming buy order is "too executable," i.e., is priced so aggressively that it exceeds a predefined allowable percentage through the published NBO quotation. In the preferred embodiment, the predefined percentage is stored as a configurable parameter "MaxPercentOffNBBO," which caps the highest limit price allowed for an incoming buy order based on the current NBO. Additionally, the market center 20 may also decide to implement the "too executable" check not only for displayed prices, but also for discretionary prices. Even though discretionary prices are not posted and therefore cannot cause a crossed NBBO to be disseminated, the market center 20 may nevertheless decide to reject overly-aggressive discretionary prices.

In step 500, the Too-Executable Buy Order Check Process is initiated when the order matching engine 21 receives an incoming buy order that is marketable. In step 502, the process evaluates whether the check for excessive discretion is enabled for the order type. By definition, only a discretionary order can include a discretionary price, and therefore a non-discretionary order is never checked for excessive discretion. However, the market center 20 can choose to disable the check for excessive discretion on discretionary orders as well.

If at step 502 the process determines that the incoming buy order is a discretionary order and that the check for excessive discretion is enabled, then it continues to step 504, where it compares the incoming buy order's discretionary price to the NBO. If the incoming buy order's discretionary price is not greater than the NBO, then the process continues to step 522, where it returns to the step where the procedure was originally initiated, as the process has determined that the incoming buy order is not "too executable." If the discretionary price is not too executable, then there is no reason to check if the display price is too executable, as by definition the discretionary price must be more aggressive than the display price, and this was previously checked by normal order validation routines.

Returning to step 504, if, however, the incoming buy order's discretionary price is greater than the NBO, then the process continues to step 506, where it retrieves the parameter "MaxPercentOffNBBO." In step 508, the process computes the price interval allowed beyond the NBO for an incoming buy order (the "MaxPriceThruNBO" parameter) by multiplying the current NBO price by the MaxPercentOffNBBO. Accordingly, the MaxPriceThruNBO parameter is computed as the stored percentage parameter times the NBO price, rounded down to the nearest tick if necessary. For example, if the NBO is 2.10 and the MaxPercentOffNBBO is 15%, then the MaxPriceThruNBO parameter is 0.315, which would be rounded down to 0.30 if the tick is a nickel at this price level. If the issue trades in pennies, then it would be rounded down to 0.31 instead. In step 510, the process adds the computed MaxPriceThruNBO parameter to the current NBO to derive the highest valid discretionary price for the incoming buy order, i.e., the "MaxBuyPrice."

In step 512, the process compares the discretionary price of the incoming buy order to the derived MaxBuyPrice parameter. If the incoming buy order's discretionary price is not higher than the MaxBuyPrice parameter, then the incoming buy order is not "too executable," and is eligible for further processing. In this case, the process continues to step 513, where it returns to the step where the procedure was originally initiated, as the process has determined that the incoming buy order is not "too executable."

Returning to step 512, if, however, the incoming buy order's discretionary price is higher than the derived MaxBuyPrice parameter, then the incoming buy order is presently "too executable," i.e., is priced too far through the NBO. Accordingly, the incoming buy order must either be canceled or repriced depending on the business rules of the market center 20. In step 514, if the rules determine that the order must be canceled, then the process continues to step 518, where it cancels the incoming buy order and terminates in step 542, as indicated. If, however, in step 514 the business rules of the market center 20 determine that the incoming buy order should be repriced less aggressively instead of being canceled, then the process continues to step 516, where it caps the discretionary price of the incoming buy order at the derived MaxBuyPrice parameter. The process continues to step 524, as having determined that the incoming buy order's original discretionary price was too executable, it must now also check if the incoming buy order's display price is also too executable and must be similarly capped.

Referring now to step 502, if, however, the process determines that the check for excessive discretion is not enabled for this incoming order type, then the process continues to step 520, where it evaluates whether the check for excessive marketability is enabled for the incoming order type, i.e., if its display price is too aggressive. If the check for excessive marketability is not enabled, then the process continues to step 522, where it returns to step where the procedure was originally initiated. If, however, the check for excessive marketability is enabled, then the process continues to step 524, where it compares the incoming buy order's display price to the NBO. If the buy order's display price is not higher, then the process continues to step 526, where it returns to the step where the procedure was originally initiated, as the process has determined that the order is not too executable. If, however, the process determines that the incoming buy order's price is greater than the NBO, then the process continues to step 528 instead.

In step 528, the process retrieves the parameter "MaxPercentOffNBBO." In step 530, the process computes the price interval allowed beyond the NBO for an incoming buy order (the "MaxPriceThruNBO" parameter) by multiplying the current NBO price by the MaxPercentOffNBBO parameter. Accordingly, the MaxPriceThruNBO parameter is computed as the stored parameter times the NBO price, rounded down to the nearest tick if necessary. In step 532, the process adds the computed MaxPriceThruNBO parameter to the current NBO to derive the highest valid display price for the incoming buy order, i.e., the "MaxBuyPrice."

In step 534, the process compares the display price of the incoming buy order to the derived MaxBuyPrice parameter. If the incoming buy order's price is not higher than the MaxBuyPrice, then the incoming buy order is not "too executable," and is eligible for further processing. In this case, the process continues to step 536, where it returns to the step where the procedure was originally initiated, as the process has determined that the incoming buy order is not "too executable."

Returning to step 534, if, however, the incoming buy order's display price is higher than the derived MaxBuyPrice parameter, then the incoming buy order is "too executable," i.e., is priced too far through the NBO. Accordingly, the incoming buy order is not allowed to execute, and must either be canceled or repriced depending on the business rules of the market center 20. In step 538, if the rules determine that the order must be canceled, then the process continues to step 540, where it cancels the incoming buy order and terminates in step 542, as indicated. If, however, in step 538 the business rules of the market center 20 determine that the incoming buy order should be repriced less aggressively instead of being canceled, then the process continues to step 544, where it caps the display price of the incoming buy order at the derived MaxBuyPrice parameter. The process continues to step 546, where it checks if the incoming buy order's capped display price is equal to the incoming buy order's capped discretionary price. If the incoming order is a discretionary order and the two prices are equal because both have been capped, then the process continues to step 548, where it removes the discretionary price from the incoming buy order, and the process continues to step 550. In step 550, the process returns to the step where it was originally initiated, because the repriced buy order is no longer "too executable" and is eligible for further processing. Returning to step 546, the process also continues to step 550 if the incoming buy order is not a discretionary order, as it will not include a discretionary price.

The LMM Guaranteed Offer Process

Referring now to FIG. 6, the LMM Guaranteed Offer Process is illustrated. At step 600, the process is initiated. At step 602, the process retrieves the lead market maker's offer. In step 604, the process checks if the lead market maker's offer is at the NBO price. If the lead market maker's offer is inferior to the NBO, then the lead market maker is not entitled to guaranteed participation with the incoming buy order, and the process continues to step 606, where it returns to the step where it was originally initiated.

Returning to step 604, if, however, the lead market maker's offer is at the NBO, then the lead market maker is entitled to guaranteed participation with the incoming buy order. The process proceeds to step 608, where it checks if the incoming buy order's size is greater than two contracts. If it is less than or equal to two contracts, then the process continues to step 609, where it matches the incoming buy order with one contract of the lead market offer, at the NBO price. It does this by generating an immediate or cancel ("IOC") sell pseudo-order on behalf of the underlying lead market maker offer, and executing the incoming buy order against the sell pseudo-order. After executing the sell pseudo-order, the order matching engine notifies the market maker quote engine 32b of the quantity of contracts that executed (one contract) so that it can decrement the lead market maker's offer.

Then at step 610, the process checks if the incoming buy order still has one contract available to trade. If it does not, then the process terminates in step 612 as indicated. If it does, then the process continues to step 611, where it matches the single remaining contract of the incoming buy order with one contract of the best displayed offer. The best displayed offer is the sell order or quote with the highest ranking in the Display Order Process according to price/time priority. The process terminates in step 612 as indicated.

Returning to step 608, if, however, the incoming buy order has more than two contracts available to execute, then the process, in this embodiment, determines if there are any customer orders that are eligible to execute ahead of the lead market maker's offer. Accordingly, the process proceeds to step 614, where it checks if there are any displayed customer sell orders at the NBO. It should be noted that a customer discretionary sell order whose displayed price is at the NBO qualifies as an eligible displayed order. However, if the discretionary price is at or better than the NBO but the display price is inferior to the NBO, then the customer discretionary sell order is not eligible to participate in the LMM Guarantee Process.

If there are no displayed customer sell orders at the NBO, then the lead market maker is entitled to participate immediately with the incoming buy order. The process proceeds to step 632, where it retrieves a stored, configurable guaranteed allocation parameter determined by the market center's business rules ("LMMGuaranteedPercent"). At step 634, the process computes the maximum quantity of contracts that the lead market maker is guaranteed for execution ("LMMGuaranteedAllocation") by multiplying the remaining ("Leaves") quantity of the incoming buy order by the LMMGuaranteedPercent parameter, and rounding the result down to the nearest integer value if necessary. In step 638, the process matches the incoming buy order with the lead market maker's offer, at the NBO price, up to the lesser of the computed LMMGuaranteedAllocation size and the lead marker maker offer size. It does this by generating an IOC sell pseudo-order on behalf of the underlying lead market maker offer, and executing the incoming buy order against the sell pseudo-order. After executing the sell pseudo-order, the order matching engine notifies the market maker quote engine 32b of the quantity of contracts that executed so that it can decrement the lead market maker's offer.

In step 642, the process checks if the incoming buy order still has any contracts available to trade. If the incoming buy order has been completely executed, then the process terminates in step 644 as indicated. However, if the incoming buy order still has contracts available to trade, then the process returns to the step where it was originally initiated, so that the incoming buy order can continue to execute against other offers if possible. The LMM Guaranteed Offer Process is completed, and any remaining quantity of the incoming buy order is released to the Display Order Process.

Returning to step 614, if, however, there are displayed customer sell orders at the NBO, then the process continues to step 616, where it retrieves the timestamp assigned to the lead market maker's offer (the time assigned by the market maker quote engine 32b) and stores it in the parameter "LMMOfferTimestamp." In step 618, the process retrieves the earliest displayed customer sell order at the NBO. In step 620, the process compares the timestamp of the retrieved customer sell order with the LMMOfferTimestamp parameter, and if the customer sell order preceded the lead market maker's offer, then the process continues to step 622, where it matches the incoming buy order with the retrieved customer sell order at the NBO price.

In step 624, the process checks if the incoming buy order still has contracts available to trade. If it does not, then the process terminates in step 626 as indicated. If it does, then the process continues to step 628, where it checks if there are any additional displayed customer sell orders priced at the NBO. If there are additional customer orders, then in step 630, the process retrieves the next earliest displayed customer sell order at the NBO and returns to step 620, where it checks if the newly-retrieved customer sell order was received prior to the lead market maker's offer. It repeats this process until all customer sell orders with price/time priority over the lead market maker's offer have been matched, unless the incoming buy order is exhausted first.

Returning to step 620, if, however, the timestamp of the retrieved customer sell order is not lower than the LMMOfferTimestamp, then the customer order was not received prior to the lead market maker's offer, and is therefore not eligible to execute in the LMM Guaranteed Offer Process. In this case, the process proceeds to step 632, and executes the lead market maker guaranteed allocation according to steps 632 through 644 (or 646) as described above.

Returning to step 628, if, however, there are no additional displayed customer sell orders at the NBO, then the process also proceeds to step 632 at this point, and executes the lead market maker guaranteed allocation according to steps 632 through 644 (or 646) as described above.

The Directed Order Process

Referring now to FIGS. 7A-7B, the Directed Order Process is illustrated. When the market center 20 receives a directed order, it must first determine if the order sending firm 26 is permissioned to direct orders to the designated market maker firm 31. At step 700, the process is initiated. At step 702, the process sets the parameter designated as "OSF" to the order sending firm identification ("ID") included on the incoming directed order. Then, at step 704, the process retrieves a designated market maker/order sending firm ("DMM/OSF") permissions table, similar to the exemplary one depicted in FIG. 7B.

At step 706, the process checks if the incoming directed order includes the ID of a designated market maker, i.e., a specific market maker firm that is the intended recipient of this directed order. If a designated market maker is not specified, then the process continues to step 712, where it consults the DMM/OSF permissions table to see if a default designated market maker has been established for this order sending firm. If no default market maker has been established in the DMM/OSF permissions table, then the incoming order cannot execute in the Directed Order Process, but it may be able to execute in one of the LMM Guarantee Processes instead. Accordingly, the process continues to step 713, where it checks if the incoming order is a buy or sell. If the incoming order is a buy order, then the process continues to step 714, where it initiates the LMM Guaranteed Offer Process. After the LMM Guaranteed Offer Process is complete, the process then continues to step 730, where it returns to the step where the routine was originally initiated. If, however, the incoming order is a sell order, then the process continues to step 715, where it initiates the LMM Guaranteed Bid Process. After the LMM Guaranteed Bid Process is complete, the process then continues to step 732, where it returns to the step where the routine was originally initiated.

Referring again to step 706, if the directed order includes the ID of a designated market maker, then the process, at step 708, assigns the designated market maker ID to the parameter "DMM." At step 710, the process consults the DMM/OSF permissions table to determine if a rule exists for this DMM/OSF pair. If a rule does not exist, then this order sending firm 26 is not permissioned to send directed orders to this designated market maker. In this case, the incoming order cannot execute in the Directed Order Process, but it may be able to execute in a LMM Guarantee Process instead. Accordingly, the process continues to step 713 where it checks if the incoming order is a buy order or a sell order and then proceeds as described in the steps above.

Referring again to step 710, however, if a rule does exist for the DMM/OSF pair, then this order sending firm 26 is permissioned to send directed orders to the designated market maker 31. That being the case, the process continues to step 718, where it checks if the incoming directed order is a buy order or a sell order.

Figure 8:
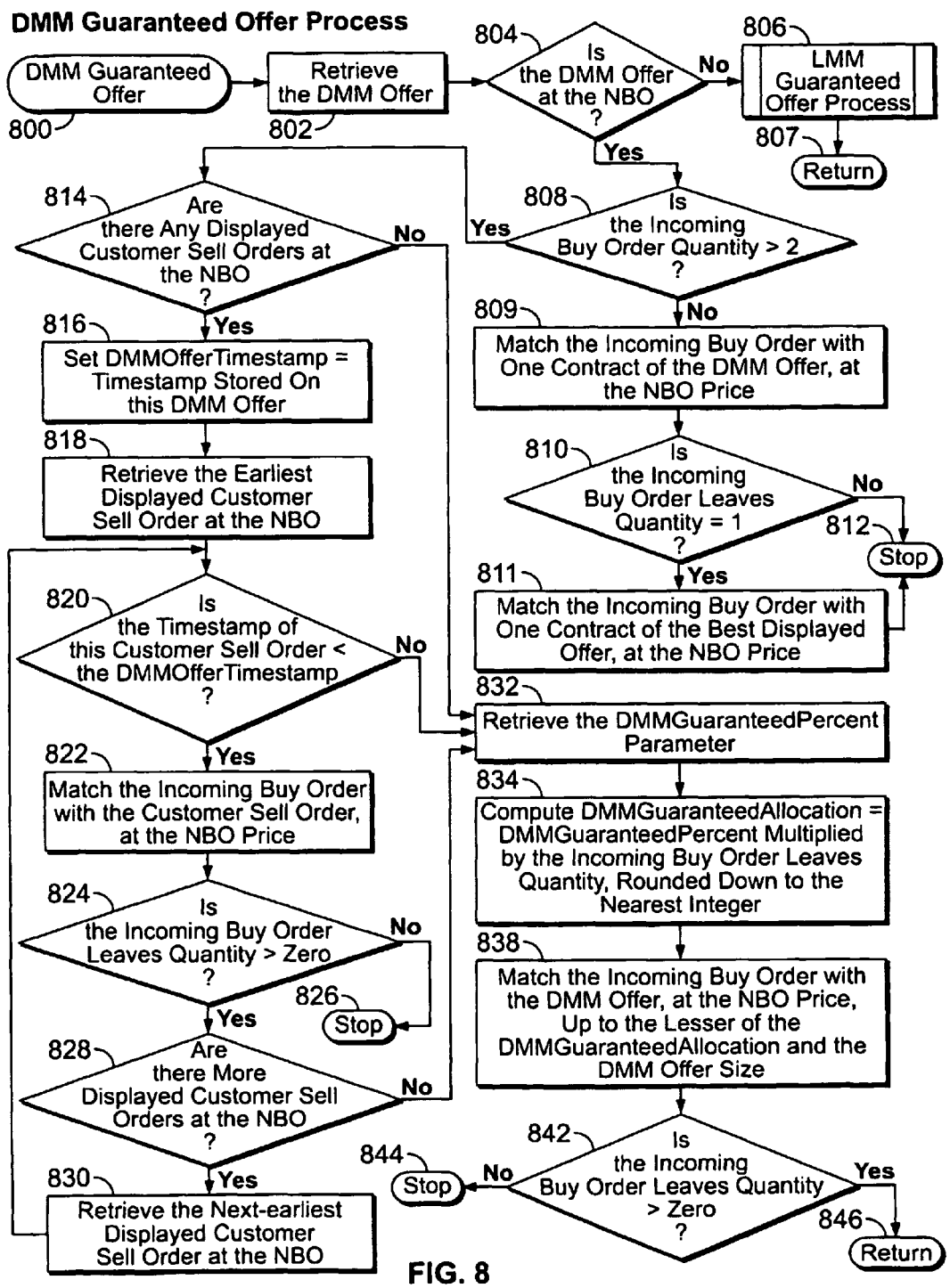
FIG. 8 is a flow diagram illustrating a process for handling designated market maker guaranteed offer entitlements in an embodiment of the present invention.
Figure 15:
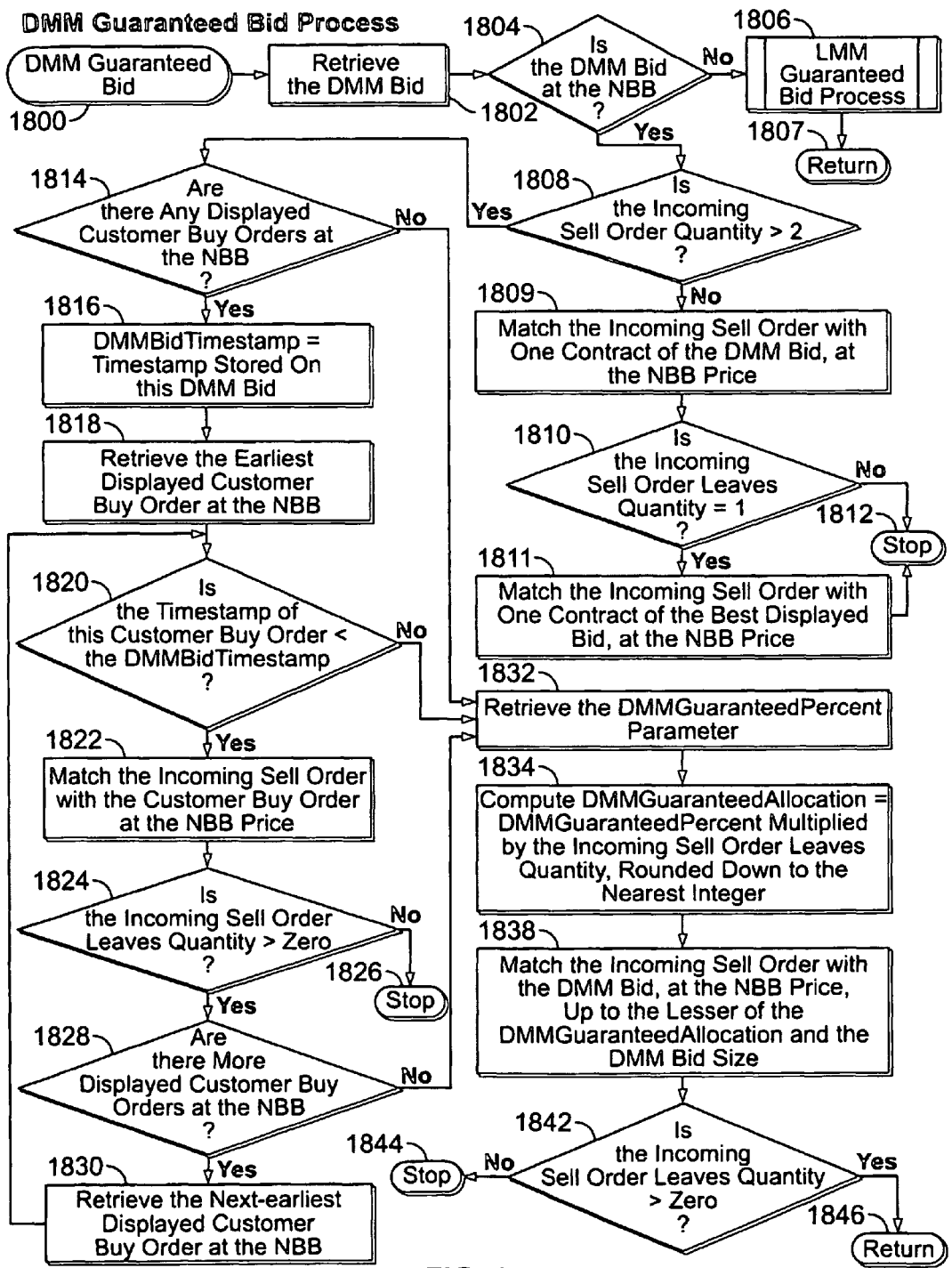
FIG. 15 is a flow diagram illustrating a process for handling designated market maker guaranteed bid entitlements in an embodiment of the present invention.

Referring again to step 712, if the process determines that a default designated market maker exists for the order sending firm sending the order, then the process, at step 716 sets the parameter designated as "DMM" to the default market maker ID and continues to step 718. At step 718, the process determines whether the incoming directed order is a buy order or a sell order. If the directed order is a buy order, then the process proceeds to step 720, where the DMM Guaranteed Offer Process is initiated, and the process proceeds to step 800 (FIG. 8). After the DMM Guaranteed Offer Process is complete, the process proceeds to step 722 where it returns to the step where the routine was originally initiated. If, on the other hand, the directed order is a sell order, then the process proceeds to step 724, where the DMM Guaranteed Bid Process is initiated, and the process proceeds to step 1800 (FIG. 15). After the DMM Guaranteed Bid Process is complete, the process proceeds to step 726 where it returns to the step where the routine was originally initiated.

The DMM Guaranteed Offer Process

Where the process has determined that an incoming buy order was sent by an order sending firm 26 that is permissioned to send directed orders to a market maker firm 31, the DMM Guaranteed Offer Process is activated as indicated at step 800 (FIG. 8). FIG. 8 illustrates a routine wherein the order matching engine 21 executes the incoming directed buy order in the Directed Order Process, but only if the designated market maker's offer is at the NBO. The DMM Guaranteed Offer Process is very similar to the previously described LMM Guaranteed Offer Process, as the designated market maker in this situation receives the same privileges as the lead market maker for the purpose of executing with the incoming directed order.

At step 802, the process retrieves the designated market maker's offer. In step 804, the process checks if the designated market maker's offer is at the NBO price. If the designated market maker's offer is inferior to the NBO, then the designated market maker is not entitled to guaranteed participation with the incoming directed buy order. However, the lead market maker may still be entitled to participate with the incoming order instead. Accordingly, the process continues to step 806, where the LMM Guaranteed Offer Process is activated, and the process proceeds to step 600 (FIG. 6).

Returning to step 804, if, however, the designated market maker's offer is at the NBO, then the designated market maker is entitled to guaranteed participation with the incoming order. The process proceeds to step 808, where, in this embodiment, it checks if the incoming directed buy order's size is greater than two contracts. If it is less than or equal to two contracts, then the process continues to step 809, where it matches the incoming buy order with one contract of the designated market maker's offer, at the NBO price. It does this by generating an IOC sell pseudo-order on behalf of the underlying designated market maker offer, and executing the incoming buy order against the sell pseudo-order. After executing the sell pseudo-order, the order matching engine notifies the market maker quote engine 32b of the quantity of contracts that executed (one contract) so that it can decrement the designated market maker's offer.

In step 810, the process checks if the incoming buy order still has one contract available to trade. If it does not, then the process terminates in step 812 as indicated. If it does, then the process continues to step 811, where it matches the single remaining contract of the incoming buy order with one contract of the best displayed offer. The best displayed offer is the sell order or quote with the highest ranking in the Display Order Process according to price/time priority. The process terminates in step 812 as indicated.

Returning to step 808, if, however, the incoming directed buy order has more than two contracts available to execute, then the process must determine if there are any customer orders that are eligible to execute ahead of the designated market maker's offer. Accordingly, it proceeds to step 814, where it checks if there are any displayed customer sell orders at the NBO. It should be noted that a customer discretionary sell order whose displayed price is at the NBO qualifies as an eligible displayed order. However, if the discretionary price is at or better than the NBO but the display price is inferior to the NBO, then the customer discretionary sell order is not eligible to participate in the DMM Guarantee Process.

If there are no displayed customer sell orders at the NBO, then the designated market maker is entitled to participate immediately with the incoming directed buy order. The process proceeds to step 832, where it retrieves a stored, configurable guaranteed allocation parameter determined by the market center's business rules ("DMMGuaranteedPercent").

In step 834, the process computes the maximum quantity of contracts that the designated market maker is guaranteed for execution ("DMMGuaranteedAllocation") by multiplying the remaining ("Leaves") quantity of the incoming directed buy order by the DMMGuaranteedPercent parameter, and rounding the result down to the nearest integer value if necessary. In step 838, the process matches the incoming buy order with the designated market maker's offer, at the NBO price, up to the lesser of the computed DMMGuaranteedAllocation size and the designated market maker offer size. It does this by generating an IOC sell pseudo-order on behalf of the underlying designated market maker offer, and executing the incoming buy order against the sell pseudo-order. After executing the sell pseudo-order, the order matching engine notifies the market maker quote engine 32b of the quantity of contracts that executed so that it can decrement the designated market maker's offer.

In step 842, the process checks if the incoming directed buy order still has any contracts available to trade. If the incoming directed buy order has been completely executed, then the process terminates in step 844 as indicated. However, if the incoming directed buy order still has contracts available to trade, then the process continues to step 846, where it returns to the step where it was originally initiated, so that the incoming buy order (no longer directed) can continue to execute against other offers if possible. The DMM Guaranteed Offer Process is completed, and any remaining quantity of the incoming buy order is released to the Display Order Process.

Returning to step 814, if, however, there are displayed customer sell orders at the NBO, then the process continues to step 816, where it retrieves the timestamp assigned to the designated market maker's offer (the time assigned by the market maker quote engine 32b) and stores it in the parameter "DMMOfferTimestamp." In step 818, the process retrieves the earliest displayed customer sell order at the NBO. In step 820, the process compares the timestamp of the retrieved customer sell order with the DMMOfferTimestamp parameter, and if the customer sell order preceded the designated market maker's offer, then the process continues to step 822, where it matches the incoming directed buy order with the retrieved customer sell order at the NBO price.

In step 824, the process checks if the incoming directed buy order still has contracts available to trade. If it does not, then the process terminates in step 826 as indicated. If it does, then the process continues to step 828, where it checks if there are any additional displayed customer sell orders priced at the NBO. If there are additional customer orders, then in step 830, the process retrieves the next earliest displayed customer sell order at the NBO and returns to step 820, where it checks if the newly-retrieved customer sell order was received prior to the designated market maker's offer. It repeats this process until all customer sell orders with price/time priority over the designated market maker's offer have been matched, unless the incoming directed buy order is exhausted first.

Returning to step 820, if, however, the timestamp of the retrieved customer sell order is not lower than the DMMOfferTimestamp, then the customer order was not received prior to the designated market maker's offer, and is therefore not eligible to execute in the Directed Order Process. In this case, the process proceeds to step 832, and executes the designated market maker guaranteed allocation according to steps 832 through 844 (or 846) as described above.

Returning to step 828, if, however, there are no additional displayed customer sell orders at the NBO, then the process also proceeds to step 832, and executes the designated market maker guaranteed allocation according to steps 832 through 844 (or 846) as described above.

Discretionary Sell Orders Step Up to NBO Process

Referring now to FIG. 9, the Discretionary Sell Orders Step Up to NBO Process is illustrated. The Discretionary Sell Orders Step Up to NBO Process allows resting discretionary sell orders to step up to the NBO price to execute against an incoming buy order that would otherwise be posted, routed, canceled, hidden, or repriced to not lock/cross the NBO. The routine is initiated at step 900 after it has already been determined that one or more eligible discretionary sell orders are on the order book 29a.

In step 902, the process retrieves the discretionary sell order with the highest ranking at the NBO price. In step 904, it checks if the incoming buy order's Leaves quantity is greater than or equal to the retrieved discretionary sell order's minimum discretion size. If the sell order does not include a minimum discretion size, then its value defaults to zero, and the incoming buy order's size is automatically greater. If, however, the discretionary sell order does include a minimum discretion size and the buy order's size is not at least its equal, then the retrieved discretionary sell order cannot use its discretion to match the incoming buy order, and the process continues to step 916, where it checks if there are any other resting discretionary sell orders that might be eligible instead. If there are no other additional discretionary sell orders that can step up to the NBO, then the process continues to step 918, where it returns to the step where it was originally initiated.

Returning to step 904, if, however, the incoming buy order does have quantity at least equal to the discretionary sell order's minimum discretion size, then the process continues to step 910, where it matches the incoming buy order with the retrieved discretionary sell order, at the price of the NBO. In step 912, the process checks if the incoming buy order still has any quantity remaining. If it does not, then the process continues to step 914, where it terminates as indicated. If it does still have available quantity, then the process continues to step 916 where it checks if there are any additional discretionary sell orders that can step up to the NBO to trade.

If there are no additional orders, then the process continues to step 918, where it returns to the step where the procedure was originally initiated. If, however, there are additional eligible discretionary sell orders, then the process continues to step 920, where it retrieves the next discretionary sell order with the highest ranking at the NBO price. The process returns to step 904, where it repeats the process of checking if the retrieved discretionary sell order can execute with the incoming buy order, or whether the process must retrieve the next-best discretionary sell order instead. It repeats the steps described above until the incoming buy order is completely matched, or until there are no more resting discretionary sell orders that can trade with the incoming buy order.

Incoming Buy Order Received

Figure 10A:
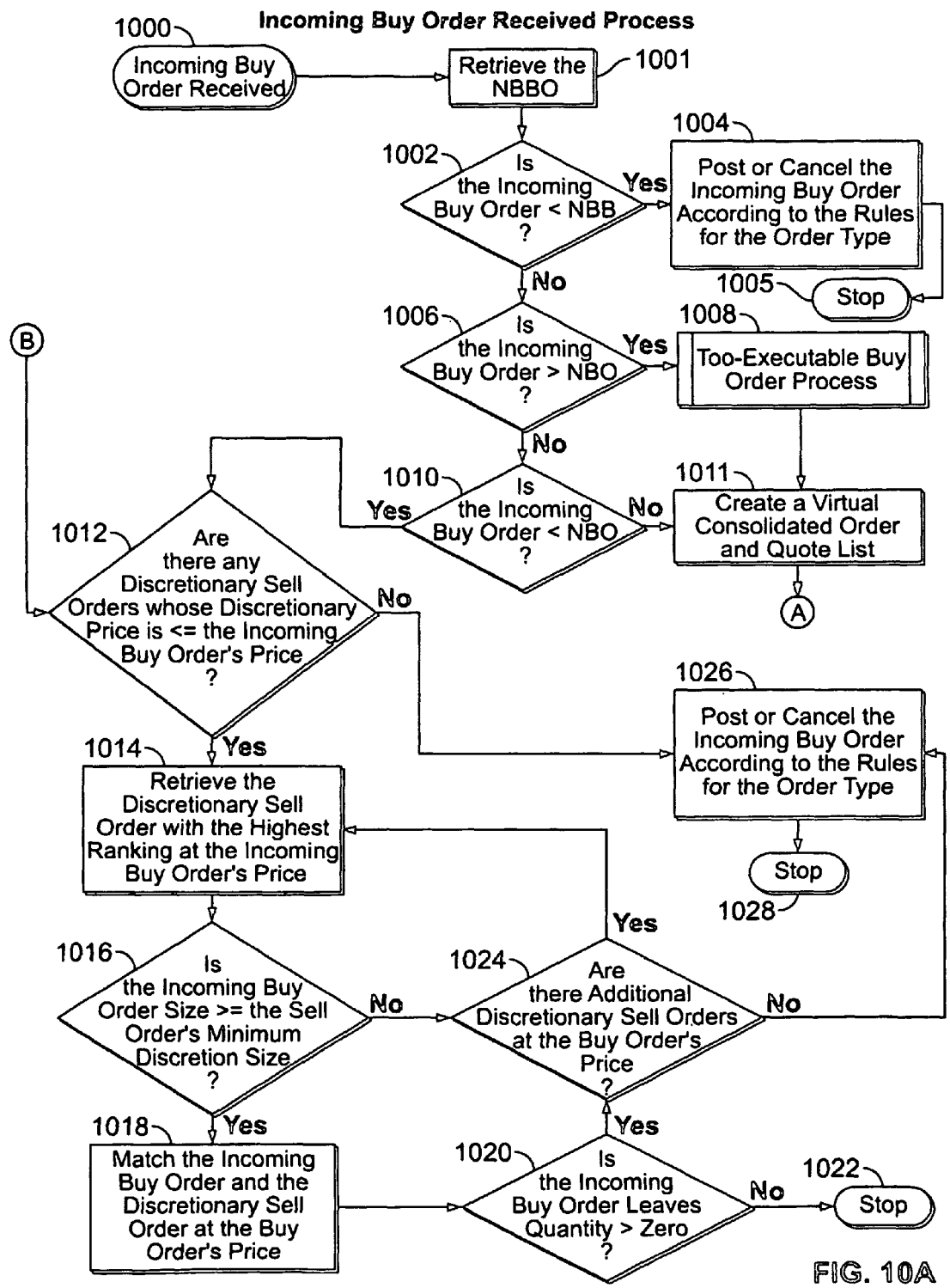
FIGS. 10A-10B are flow diagrams illustrating a process for receiving an incoming regular (non-discretionary) buy order in an embodiment of the present invention.
Figure 10B:
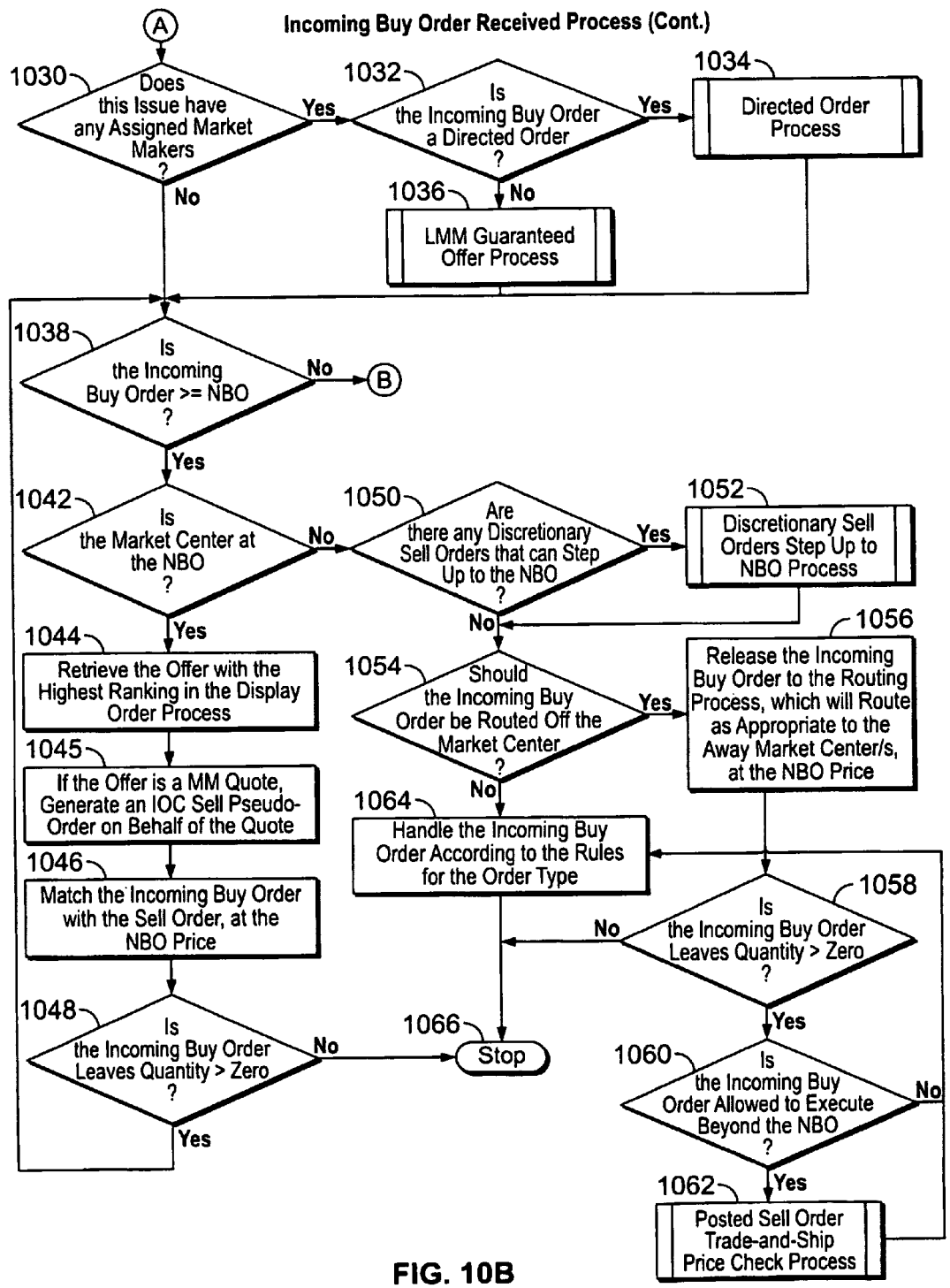

Referring now to FIGS. 10A-10B, the process is illustrated where the order matching engine 21 receives an incoming buy order without discretion. As in the previous FIGS. 4A-4B which illustrate a routine for receiving an incoming discretionary buy order, the routine illustrates the execution and/or routing of a marketable incoming buy order. The incoming buy order attempts to execute against as many displayed orders and market maker quotes as appropriate, but at the point where the incoming buy order is about to be posted, routed, or canceled, then the process looks for resting discretionary sell orders that can step up to execute. Additionally, if the incoming buy order is an order type that can execute contemporaneously beyond the NBO after satisfying all away markets quoting at the NBO, e.g., using the "trade and ship" exception, then the process looks for resting sell orders at one tick inferior to the NBO, including resting discretionary sell orders that can step up to one tick inferior to the NBO.

At step 1000, the incoming buy order is received. In step 1001, the process retrieves the NBBO, and in step 1002, it checks if the incoming buy order is less than the NBB. If the price is lower than the NBB, then the order is not executable, and accordingly the process continues to step 1004, where it posts or cancels the incoming buy order according to the rules of the order type, and the process terminates in step 1005. If, however, the incoming buy order is not less than the NBB, then the process continues to step 1006 to determine if it is greater than the NBO. If the price is higher than the NBO, then the process continues to step 1008, where it initiates the Too-Executable Buy Order Check Process, and proceeds to step 500 in FIG. 5. If the incoming buy order is not canceled in the Too-Executable Buy Order Check Process, i.e., it is not determined to be too executable, then the process continues to step 1011, where it creates a virtual consolidated order and quote list for the option series by combining the away market BBO book 25a, the market maker quote book 33a, and the internal order book 29a, and ranking the orders and quotes according to price/display/time priority, but with a preference for displayed trading interest over away market quotes at the same price. The process then continues to step 1030.

Returning to step 1006, if the incoming buy order is not greater than the NBO, then the process continues to step 1010, where it checks if it is less than the NBO. If it is neither greater than nor less than the NBO, then it is equal to the NBO, and the process continues to step 1011, where it creates a virtual consolidated order and quote list for the option series. The process then continues to step 1030 as the incoming buy order is marketable at the NBO.

Returning to step 1010, if, however, the incoming buy order is less than the NBO, then it is priced between the spread and is not executable unless there are resting discretionary sell orders that can step up to match it. Accordingly, the process continues to step 1012, where it checks if any resting discretionary sell orders have a discretionary price that is less than or equal to the incoming buy order's price. If there are no such eligible discretionary sell orders, then the process continues to step 1026, where it posts or cancels the incoming buy order according to the rules of the order type, and the process terminates in step 1028 as indicated.

Returning to step 1012, if there are resting discretionary sell orders that can step up to the buy order's price, then the process continues to step 1014, where it retrieves the discretionary sell order with the highest ranking at the incoming buy order's price. For example, if the buy order's price is 1.95, then all discretionary sell orders that can step up to 1.95 are evaluated, and the order with the highest ranking at the price of 1.95 is retrieved. The process continues to step 1016, where it checks if the incoming buy order's size is greater than or equal to the resting discretionary sell order's minimum discretion size. If the sell order does not include a minimum discretion size, then its value defaults to zero and the incoming buy order's size is automatically greater. If the sell order does include a minimum discretion size, then the incoming buy order's size must be at least its equal. If the resting discretionary sell order's minimum discretion size is higher, then the incoming buy order does not have sufficient size, and the process continues to step 1024, where it checks if there are additional resting discretionary sell orders that can step up to the incoming buy order's price. If there are, the process returns to step 1014, where it retrieves the next highest-ranked discretionary sell order, and repeats the process of checking its minimum discretion size against the incoming buy order size.

Returning to step 1016, if, however, the incoming buy order has sufficient size to execute against the retrieved discretionary sell order, then the process continues to step 1018, where it matches the incoming buy order and the resting discretionary sell order, at the price of the incoming buy order. Accordingly, the discretionary sell order steps up only as high as is necessary to execute. The process continues to step 1020, where it checks if the incoming buy order still has quantity remaining. If it does not, then the process terminates in step 1022 as indicated. If, however, the incoming buy order still has available quantity, then the process continues to step 1024, where it checks if there are additional resting discretionary sell orders that can step up to execute against it. The process continues until the incoming buy order is depleted, or until there are no more discretionary sell orders that can execute against it, in which case it is posted or canceled according to its order type, as described above.

If in the process of executing the procedures described above, the process determines that the incoming buy order is executable against the NBO, then at step 1030, it checks if the issue has any assigned market makers. If it does, then the process continues to step 1032, where it checks whether the incoming buy order is a directed order. If it is a directed order, then the process continues to step 1034, where it initiates the Directed Order Process and proceeds to step 700 in FIG. 7A. Returning to step 1032, if, however, the incoming buy order is not a directed order, then the process continues to step 1036, where it initiates the LMM Guaranteed Offer Process and proceeds to step 600 in FIG. 6.

Regardless of whether the incoming buy order participates in the Directed Order Process or the LMM Guaranteed Offer Process or in neither process (if the applicable market maker was not quoting at the NBO), the process continues to step 1038, where it checks if the incoming buy order is still greater than or equal to the NBO. By way of explanation, it may have exhausted the NBO if it executed in a market maker guaranteed entitlement process. If the incoming buy order is not executable at the present NBO, then the process returns to step 1012, where it checks if there are any resting discretionary sell orders that can step up to the incoming buy order's price. By way of explanation, the process is now looking for resting discretionary sell orders at this point because if displayed sell orders or market maker offers can execute against the incoming buy order, then those orders/quotes have priority over any resting discretionary sell orders that must use discretion to execute. The discretionary sell orders are allowed to step up now only because all trading interest at the previous NBO has been depleted by trading and the incoming buy order would otherwise be posted or canceled at this point, as it is currently priced between the spread. The process continues to steps 1012 through 1028, as previously described in detail, until the incoming buy order is either completely matched or else is posted or canceled.

Returning to step 1038, if, however, the incoming buy order is still greater than or equal to the NBO, then the process continues to step 1042, where it checks if the market center 20 is at the NBO or not. If it is at the NBO, then the process continues to step 1044, where it retrieves the displayed sell order or market maker offer with the highest ranking in the Display Order Process. If it is a market maker offer, then in step 1045, the process generates an IOC sell pseudo-order on behalf of the underlying market maker offer. In step 1046, it matches the incoming buy order and the sell order or pseudo-order, at the NBO price. If the sell order is a pseudo-order, then the process also notifies the market maker quote engine 32b of the quantity of contracts that were executed so that it can decrement the market maker offer as appropriate.

In step 1048, the process checks if the incoming buy order still has any quantity remaining, and if it does not, the process continues to step 1066, where it terminates as indicated. If, however, the incoming buy order still has quantity available, then the process returns to step 1038, where it repeats the procedure described above for determining if the incoming buy order can execute against additional posted sell orders or market maker offers.

Returning to step 1042, if, however, the market center 20 is not at the NBO, then the incoming buy order may be required to route to one or more away markets at the NBO. However, before any such routing decision occurs, the process first checks at step 1050 if there are any resting discretionary sell orders that can step up to the NBO to execute with the incoming buy order. If there are such eligible orders, then the process continues to step 1052, where it initiates the Discretionary Sell Orders Step Up to NBO Process and proceeds to step 900 in FIG. 9. If the incoming buy order still has quantity available after executing with the resting discretionary sell orders in FIG. 9, then the process continues to step 1054. The process also continues to step 1054 if at step 1050 the process determines that there are no resting discretionary sell orders that can step up to the NBO.

In step 1054, the process checks if the incoming buy order should be routed off the market center 20. It is possible that the incoming buy order is an order type that cannot be routed (e.g., an Exchange-Restricted Order, or an IOC order). It is also possible that the incoming buy order type can be routed, but all the away market centers quoting at the NBO have already been fully satisfied by prior orders routed over the linkage. If the incoming buy order should not route, then the process continues to step 1064, where it posts, queues, cancels, hides, or reprices the incoming buy order according to the rules for the order type, and the process terminates in step 1066 as indicated.

Returning to step 1054, if, however, the process determines that the incoming buy order should be routed, then the process continues to step 1056, where it releases the incoming buy order to the routing process, which routes the incoming buy order to each eligible away market center quoting at the NBO, at a quantity up to its unsatisfied offer size, and at a price equal to the NBO. After routing to all eligible market centers, the process continues to step 1058, where it checks if the incoming buy order still has quantity remaining. If it does not, the process continues to step 1066, where it terminates as indicated. If, however, the incoming buy order does still have quantity available, then the process continues to step 1060, where it checks if the incoming buy order type is allowed to execute beyond the NBO after it has satisfied the NBO. For example, sweep limit orders are allowed to execute beyond the NBO. If the incoming buy order type is not allowed to execute beyond the NBO, then the process continues to step 1064 where the remainder of the incoming buy order is posted, queued, canceled, or repriced according to the rules of the order type, and the process terminates in step 1066. If, however, the incoming buy order type is allowed to execute beyond the NBO, then the process continues to step 1062, where it initiates the Posted Sell Order Trade-and-Ship Price Check Process and proceeds to step 1100 in FIG. 11. After attempting to execute in FIG. 11, if the incoming buy order is not fully matched, then the remaining quantity is posted, queued, canceled, hidden, or repriced in step 1064 according to the rules of the order type, and the process terminates in step 1066.

Posted Sell Order Trade-and-Ship Price Check Process

Figure 11:
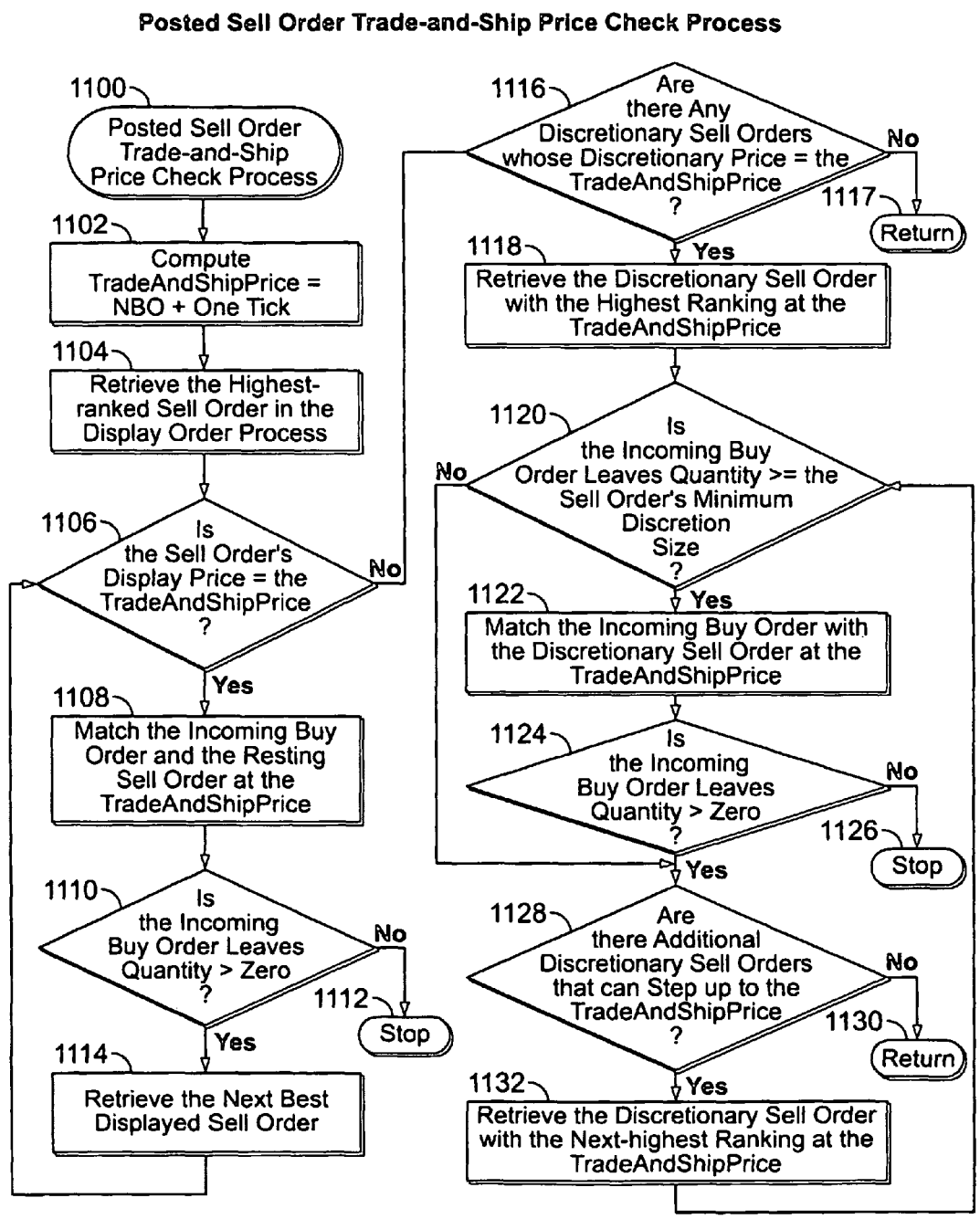
FIG. 11 is a flow diagram illustrating a process for matching an incoming buy order with resting sell orders that can execute at a price that is one tick inferior to the NBO.

Referring now to FIG. 11, the Posted Sell Order Trade-and-Ship Price Check Process is illustrated. The Posted Sell Order Trade-and-Ship Price Check Process is a process that executes when an incoming buy order has been determined to be eligible to execute against resting sell orders priced at one tick inferior to the NBO contemporaneously with satisfying all away markets offering at the NBO, for example, in accordance with the "trade and ship" marketplace exception. In this embodiment, resting discretionary sell orders that can step up to one tick inferior to the NBO are also allowed to execute against the incoming buy order.

The process is initiated at step 1100 and at step 1102, the process computes the price that is one tick inferior to the NBO (the "TradeAndShipPrice") by adding one minimum price increment (tick) to the current NBO price. In step 1104, it retrieves the displayed sell order with the highest ranking in the Display Order Process. In step 1106, it checks if the retrieved sell order's price is equal to the computed TradeAndShipPrice, i.e., if the retrieved sell order is one tick worse than the NBO. If it is, the process continues to step 1108, where it matches the incoming buy order and the retrieved sell order at the computed TradeAndShipPrice.

In step 1110, the process checks if the incoming buy order has any quantity remaining. If it does not, then the process terminates in step 1112 as indicated. If it does still have available quantity, then the process continues to step 1114 where it retrieves the next-best displayed sell order and returns to step 1106, where it repeats the process of checking if the retrieved sell order's price is equal to the computed TradeAndShipPrice. If it is, the process matches the orders at the TradeAndShipPrice, and continues according to the steps described above until the incoming buy order is completely matched or until there are no additional displayed sell orders at the TradeAndShipPrice, as described next.

Returning to step 1106, if, however, the retrieved displayed sell order has a price that is inferior to the computed TradeAndShipPrice, then the process continues to step 1116, where it checks if there are any resting discretionary sell orders that can step up to the computed TradeAndShipPrice. If there are no such eligible orders, then the process continues to step 1117, where it returns to the step where it was originally initiated, back to step 1062 (FIG. 10B). If, however, there are resting discretionary sell orders that can step up to the TradeAndShipPrice, then the process continues to step 1118, where it retrieves the discretionary sell order with the highest ranking at the TradeAndShipPrice. For example, if the NBO is 2.00 and this issue has a tick of 0.05 at this price level, then the TradeAndShipPrice is 2.05, and the discretionary sell order with the highest ranking at the price of 2.05 is retrieved.

The process continues to step 1120, where it checks if the incoming buy order's leaves quantity is greater than or equal to the retrieved discretionary sell order's minimum discretion size. If the retrieved sell order does not have a minimum discretion size, then its value defaults to zero, and the incoming buy order's size is automatically greater. If, however, the retrieved sell order does include a minimum discretion size and the incoming buy order's size is not at least equal to it, then the process continues to step 1128, where it checks if there are any other resting discretionary sell orders that can step up to trade with the incoming buy order instead.

If there are none, then the process continues to step 1130, where it returns to the step where it was originally initiated, back to step 1062 (FIG. 10B). If, however, there are additional discretionary sell orders that can step up to the computed TradeAndShipPrice, then the process continues to step 1132, where it retrieves the next-best discretionary sell order and then returns to step 1120 to repeat the process described above for determining if the orders are eligible to match. It continues this process until the incoming buy order is completely matched or until there are no more discretionary sell orders that are eligible to trade.

Returning to step 1120, if the incoming buy order has sufficient size to at least equal the discretionary sell order's minimum discretion size, then the process continues to step 1122, where it matches the incoming buy order with the retrieved discretionary sell order, at the computed TradeAndShipPrice. In step 1124, the process checks if the incoming buy order still has any remaining quantity, and if it does not, it terminates in step 1126 as indicated. If the incoming buy order still has available quantity, then the process continues to step 1128, where it checks if there are additional resting discretionary sell orders that can step up to execute. It continues according to the steps described above until the incoming buy order is completely matched or until there are no more discretionary sell orders that are eligible to trade.

It should be noted that if market maker offers priced at one tick inferior to the NBO are also allowed to execute with the incoming buy order according to marketplace rules, then at step 1104 and step 1114, the process will retrieve the best displayed sell order or market maker offer, as determined by their ranking in the Display Order Process. In the case of a market maker offer, the process generates an IOC sell pseudo-order on behalf of the market maker offer, executes the incoming buy order against the sell pseudo-order at the TradeAndShipPrice, and then notifies the market maker quote engine 32b of the executed quantity so that it can decrement the market maker offer as appropriate.

Incoming Discretionary Sell Order Received

Figure 12A:
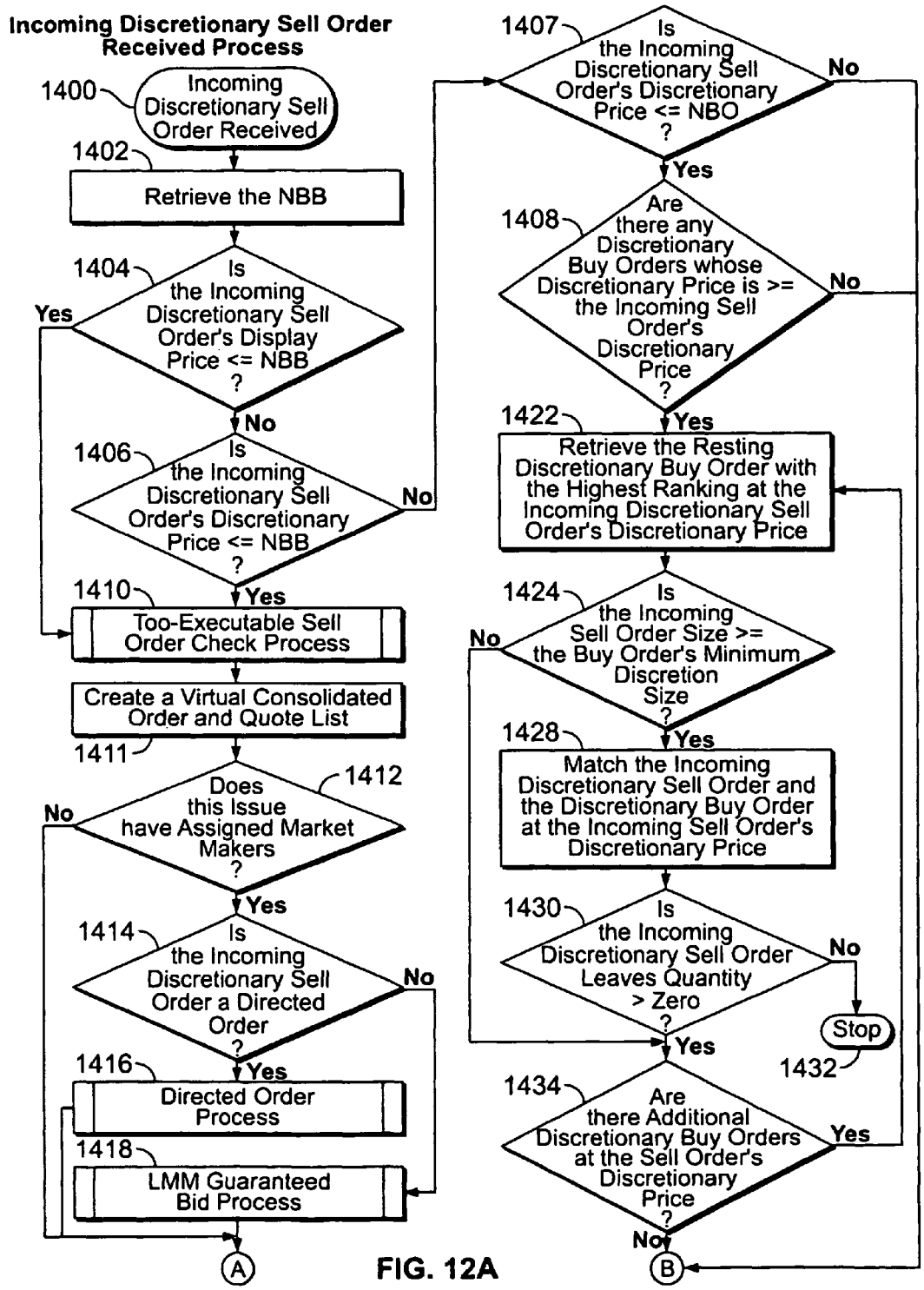
FIGS. 12A-12B are flow diagrams illustrating a process for receiving an incoming discretionary sell order in an embodiment of the present invention.
Figure 12B:
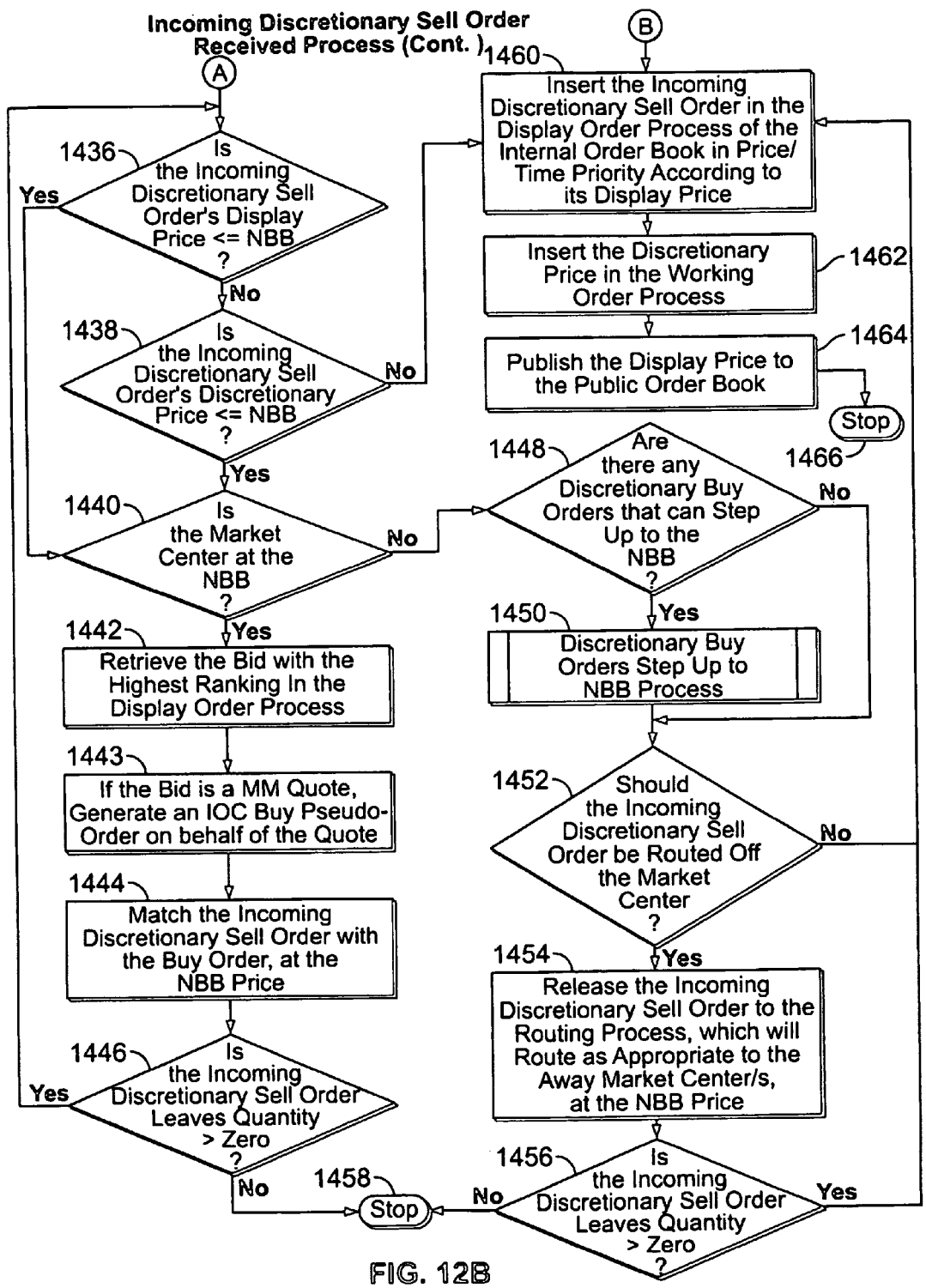

Referring to FIGS. 12A-12B, in this embodiment, the order matching engine 21 receives an incoming discretionary sell order as indicated at step 1400, and determines whether the order can execute. If the incoming discretionary sell order is marketable against the NBB, then the process determines if the incoming discretionary sell order is eligible to execute first in a guaranteed entitlement process and, if it is, processing the incoming discretionary sell order in the guaranteed entitlement process. The process then releases any unexecuted portion of the order to the Display Order Process for additional matching opportunities. If the incoming discretionary sell order is not marketable against the NBB, it may be able to execute between the spread if there are any resting discretionary buy orders on the internal order book 29a that can step up to match it. If, however, the incoming discretionary sell order cannot execute, then it ranks the order in the internal order book 29a in price/time priority according to its display price. The displayed portion of the discretionary sell order resides in the Display Order Process whereas the discretionary price resides in the Working Order Process.

In step 1402, the process retrieves the NBB, and in step 1404, it checks if the incoming discretionary sell order's display price is less than or equal to the NBB. If the incoming discretionary sell order's display price is not marketable, i.e., its price is higher than the NBB, then the process continues to step 1406, where it checks if the incoming discretionary sell order's discretionary price is less than or equal to the NBB. If the incoming discretionary sell order's discretionary price is also not marketable, i.e., its price is also higher than the NBB, then the process continues to step 1407, where it checks if the incoming discretionary sell order's discretionary price is less than or equal to the NBO.

If the discretionary price is higher than the NBO, then the order is not executable as it would cause a trade-through violation, and therefore the order must be ranked in the internal order book 29a. The process continues to step 1460, where it ranks the incoming discretionary sell order in the Display Order Process according to the price/time priority of its display price. In step 1462, the process stores the incoming discretionary sell order's discretionary price in the Working Order Process. By way of explanation, the discretionary sell order has only one position in the internal order book 29*a*. The discretionary price is not treated as a separate order. In step 1464, the process publishes the discretionary sell order's display price to the public order book, and the process terminates in step 1466 as indicated.

Returning to step 1407, if, however, the incoming discretionary sell order's discretionary price is less than or equal to the NBO, then the incoming order may be executable if there are eligible discretionary buy orders on the order book 29*a*. The process continues to step 1408, where it checks if there are any resting discretionary buy orders whose discretionary price is greater than or equal to the incoming sell order's discretionary price. If there are such resting discretionary buy orders, then in step 1422, the process retrieves the discretionary buy order with the highest ranking in the internal order book 29*a* at the incoming discretionary sell order's discretionary price. For example, if an incoming sell order has a discretionary price of 2.10, then the process evaluates all the discretionary buy orders that can step up to the price of 2.10 and then retrieves the discretionary buy order with the highest ranking at the price of 2.10.

In step 1424, the process checks if the incoming discretionary sell order's size is greater than or equal to the resting buy order's minimum discretion size (which defaults to zero if no minimum discretion size is specified). In this embodiment, if the resting discretionary buy order does include a minimum discretion size and the incoming discretionary sell order does not have sufficient size to fill it, then the orders cannot execute, and the process continues to step 1434, where it checks if there are any additional discretionary buy orders that can step up to trade with the incoming discretionary sell order.

Returning to step 1424, if, however, the incoming discretionary sell order's size is greater than or equal to the resting discretionary buy order's minimum discretion size (if no minimum discretion size is specified, then the sell order size is automatically greater), then the process continues to step 1428, where it matches the incoming discretionary sell order and the resting discretionary buy order at the incoming discretionary sell order's discretionary price. Accordingly, the resting discretionary buy order only used as much discretion as was required to execute.

In step 1430, the process checks if the incoming discretionary sell order still has any quantity remaining. If it does not, then the process terminates in step 1432 as indicated. If, however, the incoming discretionary sell order still has available contracts, then the process continues to step 1434, where it checks if there are any additional resting discretionary buy orders that can step up to trade with the incoming discretionary sell order.

If additional eligible orders are indeed on the order book 29*a*, then the process returns to step 1422, where it retrieves the next highest-ranked discretionary buy order and repeats the steps described above until the incoming discretionary sell order is fully matched or else is no longer executable and must be posted. Returning to step 1434, if there are no additional discretionary buy orders that can step up to match the incoming discretionary sell order, then the process continues to steps 1460 through 1466, where it posts the remainder of the incoming discretionary sell order as described above and then terminates.

Figure 13:
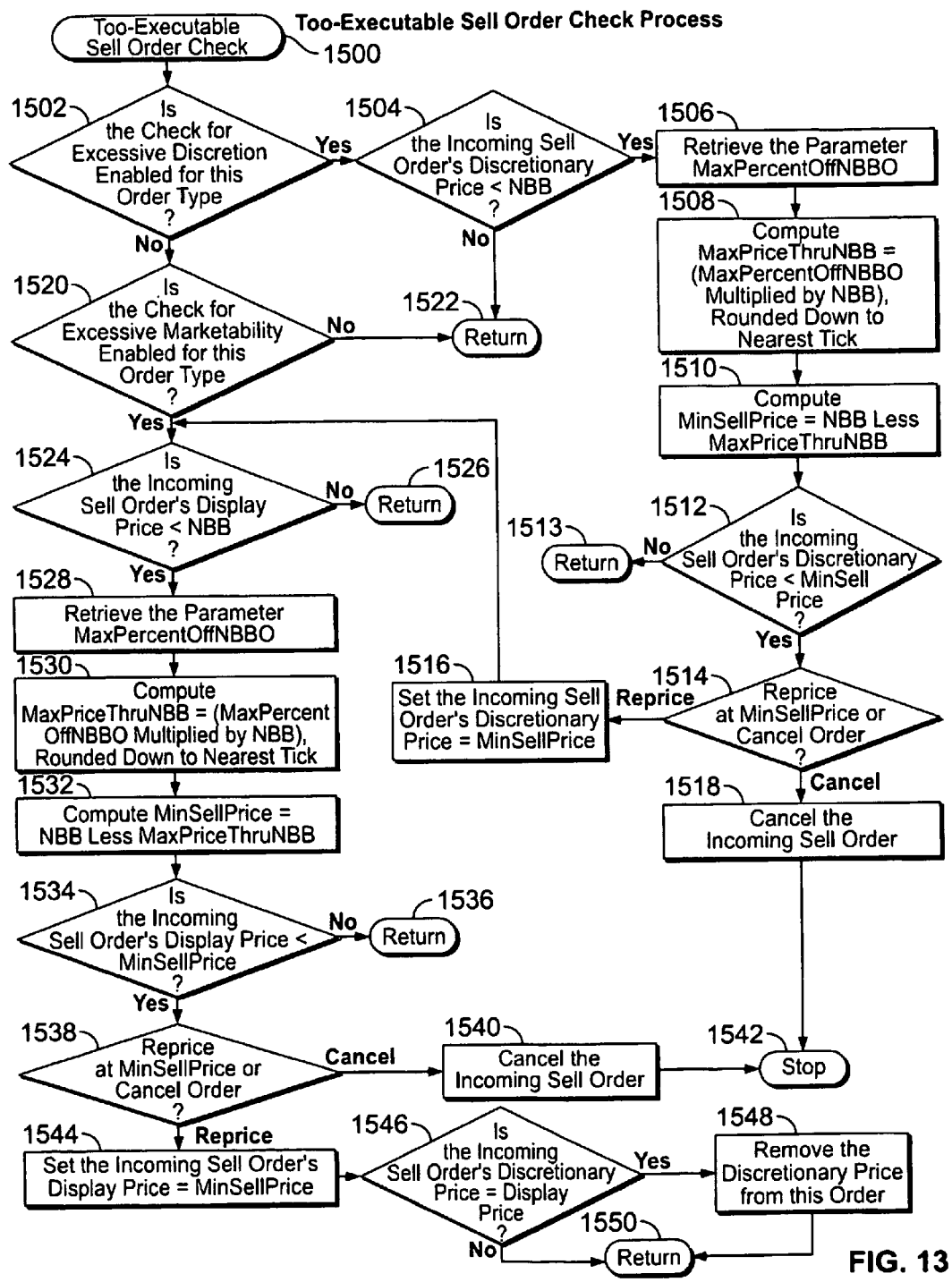
FIG. 13 is a flow diagram illustrating a process for checking if a sell order is too-executable.
Figure 14:
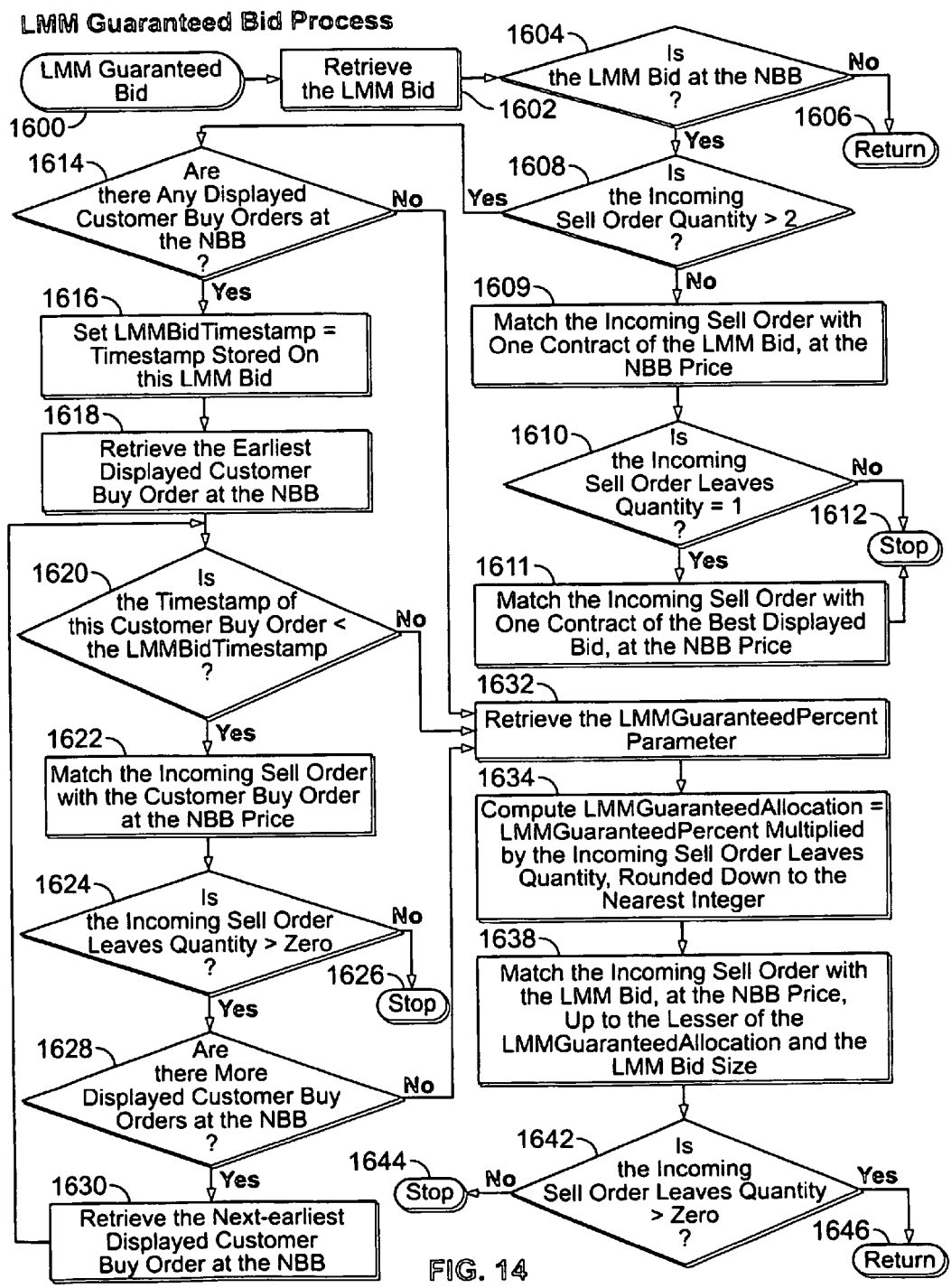
FIG. 14 is a flow diagram illustrating a process for handling lead market maker guaranteed bid entitlements in an embodiment of the present invention.

Returning to step 1404, if, however, the incoming discretionary sell order's display price is less than or equal to the NBB, then the process continues to step 1410, where the "Too-Executable Sell Order Check Process" is initiated at step 1500 (FIG. 13). The process also continues to step 1410 if at step 1406 the process determines that the incoming discretionary sell order's discretionary price is less than or equal to the NBB. If the incoming discretionary sell order is not canceled by the Too-Executable Sell Order Check Process as described in detail below, then the process continues to step 1411, where it creates a virtual consolidated order and quote list for the option series. The process continues to step 1412, where it checks if the option series has any assigned market makers. If it does, then the process continues to step 1414, where it checks whether the incoming discretionary sell order is a directed order. If the incoming discretionary sell order is a directed order, then the process continues to step 1416 where the "Directed Order Process" is initiated in step 700 (FIG. 7A). If, however, the incoming discretionary sell order is not a directed order, then the process proceeds to step 1418 where the "LMM Guaranteed Bid Process" is initiated instead in step 1600 (FIG. 14).

Regardless of whether the incoming discretionary sell order executes in the Directed Order Process, in the LMM Guarantee Process or in neither process (if the applicable market maker is not quoting at the NBB and is therefore ineligible for a guaranteed entitlement), if the incoming discretionary sell order still has quantity available to trade, then the process continues to step 1436, where it checks if the incoming discretionary sell order's display price is less than or equal to the NBB. If it is, the process continues to step 1440. If it is not, then the process checks if the incoming discretionary sell order's discretionary price is less than or equal to the NBB at step 1438, and if it is, the process continues to step 1440 at that point as well. If, however, at step 1438, the process determines that the incoming discretionary sell order's discretionary price is now greater than the NBB (which is possible if the order exhausted the NBB by trading), then the process continues to steps 1460 through 1466, where it posts the remainder of the incoming discretionary sell order as described above and then terminates.

Referring to step 1440, at step 1440, the process checks if the market center 20 is at the NBB. If it is, then the process continues to step 1442, where it retrieves the displayed buy order or market maker bid with the highest ranking in the Display Order Process. If it is a market maker bid, then in step 1443, the process in this embodiment generates an IOC buy pseudo-order on behalf of the underlying market maker bid. In step 1444, it matches the incoming discretionary sell order and the buy order or pseudo-order, at the NBB price. If the buy order is a pseudo-order, then the process also notifies the market maker quote engine 32*b* of the quantity of contracts that were executed so that it can decrement the market maker bid as appropriate.

In step 1446, the process checks if the incoming discretionary sell order has any quantity remaining. If it does not, then the process continues to step 1458, where it terminates as indicated. If it does still have quantity available, then it returns to step 1436, where it repeats the steps described above until the incoming discretionary sell order is depleted or can no longer execute against the order book 29*a*.

Figure 16:
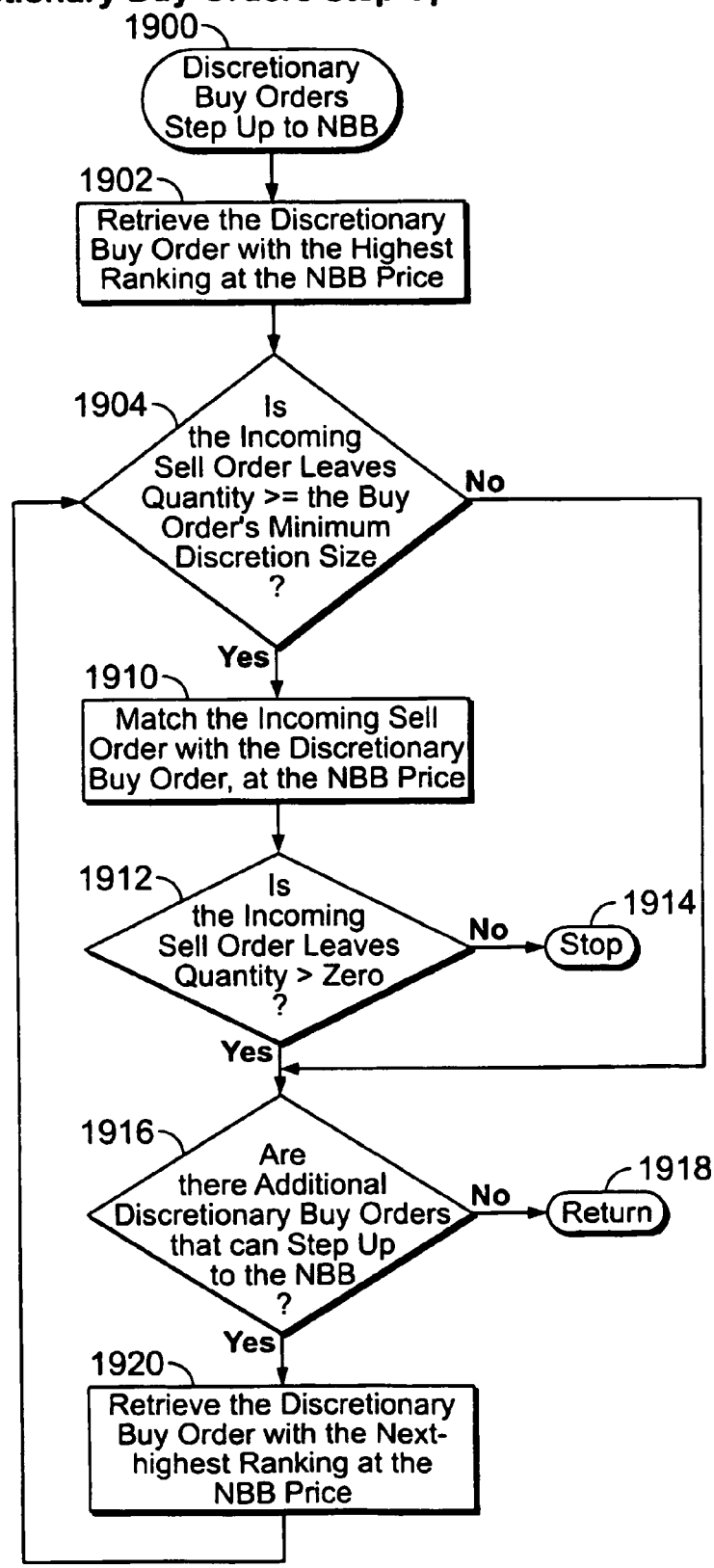
FIG. 16 is a flow diagram illustrating a process where a posted discretionary buy order steps up to the national best bid ("NBB") to execute in an embodiment of the invention.

Returning to step 1440, if the market center 20 is not at the NBB, then the process may have to route the incoming discretionary sell order. However, in step 1448, the process first checks if there are any resting discretionary buy orders that can step up to the NBB price. If there are eligible resting discretionary buy orders, then the process continues to step 1450, where the "Discretionary Buy Orders Step Up to NBB Process" activates and proceeds to step 1900 (FIG. 16).

Returning to step 1448, if, however, there are no eligible discretionary buy orders, then the process continues to step 1452, where it checks whether the incoming discretionary sell order should be routed off the market center 20. Unless all the away market centers quoting at the NBB have already been fully satisfied by prior routed orders, the process continues to step 1454, where it releases the incoming discretionary sell order to the routing process, which routes to any away market center at the NBB whose bid size has not been fully satisfied, at the disseminated NBB price.

The process then continues to step 1456, where it checks if the incoming discretionary sell order has any quantity remaining after it has routed. If it does not, then the process terminates in step 1458 as indicated. If, however, it still has quantity available, then the process continues to steps 1460 through 1466, where it posts the remainder of the incoming discretionary sell order as described above and then terminates. Returning to step 1452, if the process determines that the incoming discretionary sell order should not be routed, then the process continues to steps 1460 through 1466, where it posts the remainder of the incoming discretionary sell order as described above and then terminates.

Too-Executable Sell Order Check Process

Referring now to FIG. 13, the Too-Executable Sell Order Check Process is illustrated. The Too-Executable Sell Order Check Process determines if an incoming sell order is "too executable," i.e., is priced so aggressively that it exceeds a predefined allowable percentage through the published NBB quotation. In the preferred embodiment, the predefined percentage is stored as a configurable parameter "MaxPercentOffNBBO," which caps the highest limit price allowed for an incoming sell order based on the current NBB. Additionally, the market center 20 may also decide to implement the "too executable" check not only for displayed prices, but also for discretionary prices. Even though discretionary prices are not posted and therefore cannot cause a crossed NBBO to be disseminated, the market center 20 may nevertheless decide to reject overly-aggressive discretionary prices.

In step 1500, the Too-Executable Sell Order Check Process is initiated when the order matching engine 21 receives an incoming sell order that is marketable. In step 1502, the process evaluates whether the check for excessive discretion is enabled for the order type. If at step 1502 the process determines that the incoming sell order is a discretionary order and that the check for excessive discretion is enabled, then it continues to step 1504, where it compares the incoming sell order's discretionary price to the NBB. If the incoming sell order's discretionary price is not less than the NBB, then the process continues to step 1522, where it returns to the step where the procedure was originally initiated, as the process has determined that the incoming sell order is not "too executable." If the discretionary price is not too executable, then there is no reason to check if the display price is too executable, as by definition the discretionary price must be more aggressive than the display price, and this was previously checked by normal order validation routines.

Returning to step 1504, if, however, the incoming sell order's discretionary price is less than the NBB, then the process continues to step 1506, where it retrieves the parameter "MaxPercentOffNBBO." In step 1508, the process computes the price interval allowed beyond the NBB for an incoming sell order (the "MaxPriceThruNBB" parameter) by multiplying the current NBB price by the MaxPercentOffNBBO. Accordingly, the MaxPriceThruNBB parameter is computed as the stored percentage parameter times the NBB price, rounded down to the nearest tick if necessary. For example, if the NBB is 1.95 and the MaxPercentOffNBBO is 15%, then the MaxPriceThruNBB parameter is 0.2925, which would be rounded down to 0.25 if the tick is a nickel at this price level. If the issue trades in pennies, then it would be rounded down to 0.29 instead. In step 1510, the process subtracts the computed MaxPriceThruNBB parameter from the current NBB to derive the lowest valid discretionary price for the incoming sell order, i.e., the "MinSellPrice."

In step 1512, the process compares the discretionary price of the incoming sell order to the derived MinSellPrice parameter. If the incoming sell order's discretionary price is not lower than the MinSellPrice parameter, then the incoming sell order is not "too executable," and is eligible for further processing. In this case, the process continues to step 1513, where it returns to the step where the procedure was originally initiated, as the process has determined that the incoming sell order is not "too executable."

Returning to step 1512, if, however, the incoming sell order's discretionary price is lower than the derived MinSellPrice parameter, then the incoming sell order is presently "too executable," i.e., is priced too far through the NBB. Accordingly, the incoming sell order must either be canceled or repriced depending on the business rules of the market center 20. In step 1514, if the rules determine that the order must be canceled, then the process continues to step 1518, where it cancels the incoming sell order and terminates in step 1542, as indicated. If, however, in step 1514 the business rules of the market center 20 determine that the incoming sell order should be repriced less aggressively instead of being canceled, then the process continues to step 1516, where it caps the discretionary price of the incoming sell order at the derived MinSellPrice parameter. The process continues to step 1524, as having determined that the incoming sell order's original discretionary price was too executable, it must now also check if the incoming sell order's display price is also too executable and must be similarly capped.

Referring now to step 1502, if, however, the process determines that the check for excessive discretion is not enabled for this incoming order type, then the process continues to step 1520, where it evaluates whether the check for excessive marketability is enabled for the incoming order type, i.e., if its display price is too aggressive. If the check for excessive marketability is not enabled, then the process continues to step 1522, where it returns to step where the procedure was originally initiated. If, however, the check for excessive marketability is enabled, then the process continues to step 1524, where it compares the incoming sell order's display price to the NBB. If the sell order's display price is not lower, then the process continues to step 1526, where it returns to the step where the procedure was originally initiated, as the process has determined that the order is not too executable. If, however, the process determines that the incoming sell order's price is less than the NBB, then the process continues to step 1528 instead.

In step 1528, the process retrieves the parameter "MaxPercentOffNBBO." In step 1530, the process computes the price interval allowed beyond the NBB for an incoming sell order (the "MaxPriceThruNBB" parameter) by multiplying the current NBB price by the MaxPercentOffNBBO parameter. Accordingly, the MaxPriceThruNBB parameter is computed as the stored parameter times the NBB price, rounded down to the nearest tick if necessary. In step 1532, the process subtracts the computed MaxPriceThruNBB parameter from the current NBB to derive the lowest valid display price for the incoming sell order, i.e., the "MinSellPrice."

In step 1534, the process compares the display price of the incoming sell order to the derived MinSellPrice parameter. If the incoming sell order's price is not lower than the MinSell- Price, then the incoming sell order is not "too executable," and is eligible for further processing. In this case, the process continues to step 1536, where it returns to the step where the procedure was originally initiated, as the process has determined that the incoming sell order is not "too executable."

Returning to step 1534, if, however, the incoming sell order's display price is lower than the derived MinSellPrice parameter, then the incoming sell order is "too executable," i.e., is priced too far through the NBB. Accordingly, the incoming sell order is not allowed to execute, and must either be canceled or repriced depending on the business rules of the market center 20. In step 1538, if the rules determine that the order must be canceled, then the process continues to step 1540, where it cancels the incoming sell order and terminates in step 1542, as indicated. If, however, in step 1538 the business rules of the market center 20 determine that the incoming sell order should be repriced less aggressively instead of being canceled, then the process continues to step 1544, where it caps the display price of the incoming sell order at the derived MinSellPrice parameter. The process continues to step 1546, where it checks if the incoming sell order's capped display price is equal to the incoming sell order's capped discretionary price. If the incoming order is a discretionary order and the two prices are equal because both have been capped, then the process continues to step 1548, where it removes the discretionary price from the incoming sell order, and the process continues to step 1550. In step 1550, the process returns to the step where it was originally initiated, because the repriced sell order is no longer "too executable" and is eligible for further processing. Returning to step 1546, the process also continues to step 1550 if the incoming sell order is not a discretionary order, as it will not include a discretionary price.

The LMM Guaranteed Bid Process

Referring now to FIG. 14, the LMM Guaranteed Bid Process is illustrated. At step 1600, the process is initiated. At step 1602, the process retrieves the lead market maker's bid. In step 1604, the process checks if the lead market maker's bid is at the NBB price. If the lead market maker's bid is inferior to the NBB, then the lead market maker is not entitled to guaranteed participation with the incoming sell order, and the process continues to step 1606, where it returns to the step where it was originally initiated.

Returning to step 1604, if, however, the lead market maker's bid is at the NBB, then the lead market maker is entitled to guaranteed participation with the incoming sell order. The process proceeds to step 1608, where it checks if the incoming sell order's size is greater than two contracts. If it is less than or equal to two contracts, then the process continues to step 1609, where it matches the incoming sell order with one contract of the lead market's bid, at the NBB price. It does this by generating an immediate or cancel ("IOC") buy pseudo-order on behalf of the underlying lead market maker bid, and executing the incoming sell order against the buy pseudo-order. After executing the buy pseudo-order, the order matching engine notifies the market maker quote engine 32b of the quantity of contracts that executed (one contract) so that it can decrement the lead market maker's bid.

Then at step 1610, the process checks if the incoming sell order still has one contract available to trade. If it does not, then the process terminates in step 1612 as indicated. If it does, then the process continues to step 1611, where it matches the single remaining contract of the incoming sell order with one contract of the best displayed bid. The best displayed bid is the buy order or quote with the highest ranking in the Display Order Process according to price/time priority. The process terminates in step 1612 as indicated.

Returning to step 1608, if, however, the incoming sell order has more than two contracts available to execute, then the process, in this embodiment, determines if there are any customer orders that are eligible to execute ahead of the lead market maker's bid. Accordingly, the process proceeds to step 1614, where it checks if there are any displayed customer buy orders at the NBB. It should be noted that a customer discretionary buy order whose displayed price is at the NBB qualifies as an eligible displayed order. However, if the discretionary price is at or better than the NBB but the display price is inferior to the NBB, then the customer discretionary buy order is not eligible to participate in the LMM Guarantee Process.

If there are no displayed customer buy orders at the NBB, then the lead market maker is entitled to participate immediately with the incoming sell order. The process proceeds to step 1632, where it retrieves a stored, configurable guaranteed allocation parameter determined by the market center's business rules ("LMMGuaranteedPercent"). At step 1634, the process computes the maximum quantity of contracts that the lead market maker is guaranteed for execution ("LMMGuaranteedAllocation") by multiplying the remaining ("Leaves") quantity of the incoming sell order by the LMMGuaranteedPercent parameter, and rounding the result down to the nearest integer value if necessary. In step 1638, the process matches the incoming sell order with the lead market maker's bid, at the NBB price, up to the lesser of the computed LMMGuaranteedAllocation size and the lead marker maker bid size. It does this by generating an IOC buy pseudo-order on behalf of the underlying lead market maker bid, and executing the incoming sell order against the buy pseudo-order. After executing the buy pseudo-order, the order matching engine notifies the market maker quote engine 32b of the quantity of contracts that executed so that it can decrement the lead market maker's bid.

In step 1642, the process checks if the incoming sell order still has any contracts available to trade. If the incoming sell order has been completely executed, then the process terminates in step 1644 as indicated. However, if the incoming sell order still has contracts available to trade, then the process returns to the step where it was originally initiated, so that the incoming sell order can continue to execute against other bids if possible. The LMM Guaranteed Bid Process is completed, and any remaining quantity of the incoming sell order is released to the Display Order Process.

Returning to step 1614, if, however, there are displayed customer buy orders at the NBB, then the process continues to step 1616, where it retrieves the timestamp assigned to the lead market maker's bid (the time assigned by the market maker quote engine 32b) and stores it in the parameter "LMMBidTimestamp." In step 1618, the process retrieves the earliest displayed customer buy order at the NBB. In step 1620, the process compares the timestamp of the retrieved customer buy order with the LMMBidTimestamp parameter, and if the customer buy order preceded the lead market maker's bid, then the process continues to step 1622, where it matches the incoming sell order with the retrieved customer buy order at the NBB price.

In step 1624, the process checks if the incoming sell order still has contracts available to trade. If it does not, then the process terminates in step 1626 as indicated. If it does, then the process continues to step 1628, where it checks if there are any additional displayed customer buy orders priced at the NBB. If there are additional customer orders, then in step 1630, the process retrieves the next earliest displayed customer buy order at the NBB and returns to step 1620, where it checks if the newly-retrieved customer buy order was received prior to the lead market maker's bid. It repeats this process until all customer buy orders with price/time priority over the lead market maker's bid have been matched, unless the incoming sell order is exhausted first.

Returning to step 1620, if, however, the timestamp of the retrieved customer buy order is not lower than the LMMBidTimestamp, then the customer order was not received prior to the lead market maker's bid, and is therefore not eligible to execute in the LMM Guaranteed Bid Process. In this case, the process proceeds to step 1632, and executes the lead market maker guaranteed allocation according to steps 1632 through 1644 (or 1646) as described above.

Returning to step 1628, if, however, there are no additional displayed customer buy orders at the NBB, then the process also proceeds to step 1632 at this point, and executes the lead market maker guaranteed allocation according to steps 1632 through 1644 (or 1646) as described above.

The DMM Guaranteed Bid Process

Where the process has determined that an incoming sell order was sent by an order sending firm 26 that is permissioned to send directed orders to a market maker firm 31, the DMM Guaranteed Bid Process is activated as indicated at step 1800 (FIG. 15). FIG. 15 illustrates a routine wherein the order matching engine 21 executes the incoming directed sell order in the Directed Order Process, but only if the designated market maker's bid is at the NBB. The DMM Guaranteed Bid Process is very similar to the previously described LMM Guaranteed Bid Process, as the designated market maker in this situation receives the same privileges as the lead market maker for the purpose of executing with the incoming directed order.

At step 1802, the process retrieves the designated market maker's bid. In step 1804, the process checks if the designated market maker's bid is at the NBB price. If the designated market maker's bid is inferior to the NBB, then the designated market maker is not entitled to guaranteed participation with the incoming directed sell order. However, the lead market maker may still be entitled to participate with the incoming order instead. Accordingly, the process continues to step 1806, where the LMM Guaranteed Bid Process is activated, and the process proceeds to step 1600 (FIG. 14).

Returning to step 1804, if, however, the designated market maker's bid is at the NBB, then the designated market maker is entitled to guaranteed participation with the incoming order. The process proceeds to step 1808, where, in this embodiment, it checks if the incoming directed sell order's size is greater than two contracts. If it is less than or equal to two contracts, then the process continues to step 1809, where it matches the incoming sell order with one contract of the designated market maker's bid, at the NBB price. It does this by generating an IOC buy pseudo-order on behalf of the underlying designated market maker bid, and executing the incoming sell order against the buy pseudo-order. After executing the buy pseudo-order, the order matching engine notifies the market maker quote engine 32b of the quantity of contracts that executed (one contract) so that it can decrement the designated market maker's bid.

In step 1810, the process checks if the incoming sell order still has one contract available to trade. If it does not, then the process terminates in step 1812 as indicated. If it does, then the process continues to step 1811, where it matches the single remaining contract of the incoming sell order with one contract of the best displayed bid. The best displayed bid is the buy order or quote with the highest ranking in the Display Order Process according to price/time priority. The process terminates in step 1812 as indicated.

Returning to step 1808, if, however, the incoming directed sell order has more than two contracts available to execute, then the process must determine if there are any customer orders that are eligible to execute ahead of the designated market maker's bid. Accordingly, it proceeds to step 1814, where it checks if there are any displayed customer buy orders at the NBB. It should be noted that a customer discretionary buy order whose displayed price is at the NBB qualifies as an eligible displayed order. However, if the discretionary price is at or better than the NBB but the display price is inferior to the NBB, then the customer discretionary buy order is not eligible to participate in the DMM Guarantee Process.

If there are no displayed customer buy orders at the NBB, then the designated market maker is entitled to participate immediately with the incoming directed sell order. The process proceeds to step 1832, where it retrieves a stored, configurable guaranteed allocation parameter determined by the market center's business rules ("DMMGuaranteedPercent"). In step 1834, the process computes the maximum quantity of contracts that the designated market maker is guaranteed for execution ("DMMGuaranteedAllocation") by multiplying the remaining ("Leaves") quantity of the incoming directed sell order by the DMMGuaranteedPercent parameter, and rounding the result down to the nearest integer value if necessary. In step 1838, the process matches the incoming sell order with the designated market maker bid, at the NBB price, up to the lesser of the computed DMMGuaranteedAllocation size and the designated market maker bid size. It does this by generating an IOC buy pseudo-order on behalf of the underlying designated market maker bid, and executing the incoming sell order against the buy pseudo-order. After executing the buy pseudo-order, the order matching engine notifies the market maker quote engine 32b of the quantity of contracts that executed so that it can decrement the designated market maker's bid.

In step 1842, the process checks if the incoming directed sell order still has any contracts available to trade. If the incoming directed sell order has been completely executed, then the process terminates in step 1844 as indicated. However, if the incoming directed sell order still has contracts available to trade, then the process continues to step 1846, where it returns to the step where it was originally initiated, so that the incoming sell order (no longer directed) can continue to execute against other bids if possible. The DMM Guaranteed Bid Process is completed, and any remaining quantity of the incoming sell order is released to the Display Order Process.

Returning to step 1814, if, however, there are displayed customer buy orders at the NBB, then the process continues to step 1816, where it retrieves the timestamp assigned to the designated market maker's bid (the time assigned by the market maker quote engine 32b) and stores it in the parameter "DMMBidTimestamp." In step 1818, the process retrieves the earliest displayed customer buy order at the NBB. In step 1820, the process compares the timestamp of the retrieved customer buy order with the DMMBidTimestamp parameter, and if the customer buy order preceded the designated market maker bid, then the process continues to step 1822, where it matches the incoming directed sell order with the retrieved customer buy order at the NBB price.

In step 1824, the process checks if the incoming directed sell order still has contracts available to trade. If it does not, then the process terminates in step 1826 as indicated. If it does, then the process continues to step 1828, where it checks if there are any additional displayed customer buy orders priced at the NBB. If there are additional customer orders, then in step 1830, the process retrieves the next earliest displayed customer buy order at the NBB and returns to step 1820, where it checks if the newly-retrieved customer buy order was received prior to the designated market maker's bid. It repeats this process until all customer buy orders with price/time priority over the designated market maker's bid have been matched, unless the incoming directed sell order is exhausted first.

Returning to step 1820, if, however, the timestamp of the retrieved customer buy order is not lower than the DMMBid-Timestamp, then the customer order was not received prior to the designated market makers bid, and is therefore not eligible to execute in the Directed Order Process. In this case, the process proceeds to step 1832, and executes the designated market maker guaranteed allocation according to steps 1832 through 1844 (or 1846) as described above.

Returning to step 1828, if, however, there are no additional displayed customer buy orders at the NBB, then the process also proceeds to step 1832, and executes the designated market maker guaranteed allocation according to steps 1832 through 1844 (or 1846) as described above.

Discretionary Buy Orders Step Up to NBB Process

Referring now to FIG. 16, the Discretionary Buy Orders Step Up to NBB Process is illustrated. The Discretionary Buy Orders Step Up to NBB Process allows resting discretionary buy orders to step up to the NBB price to execute against an incoming sell order that would otherwise be posted, routed, canceled, hidden, or repriced to not lock/cross the NBB. The routine is initiated at step 1900 after it has already been determined that one or more eligible discretionary buy orders are on the order book 29*a*.

In step 1902, the process retrieves the discretionary buy order with the highest ranking at the NBB price. In step 1904, it checks if the incoming sell order's Leaves quantity is greater than or equal to the retrieved discretionary buy order's minimum discretion size. If the buy order does not include a minimum discretion size, then its value defaults to zero, and the incoming sell order's size is automatically greater. If, however, the discretionary buy order does include a minimum discretion size and the sell order's size is not at least its equal, then the retrieved discretionary buy order cannot use its discretion to match the incoming sell order, and the process continues to step 1916, where it checks if there are any other resting discretionary buy orders that might be eligible instead. If there are no other additional discretionary buy orders that can step up to the NBB, then the process continues to step 1918, where it returns to the step where it was originally initiated.

Returning to step 1904, if, however, the incoming sell order does have quantity at least equal to the discretionary buy order's minimum discretion size, then the process continues to step 1910, where it matches the incoming sell order with the retrieved discretionary buy order, at the price of the NBB. In step 1912, the process checks if the incoming sell order still has any quantity remaining. If it does not, then the process continues to step 1914, where it terminates as indicated. If it does still have available quantity, then the process continues to step 1916 where it checks if there are any additional discretionary buy orders that can step up to the NBB to trade.

If there are no additional orders, then the process continues to step 1918, where it returns to the step where the procedure was originally initiated. If, however, there are additional eligible discretionary buy orders, then the process continues to step 1920, where it retrieves the next discretionary buy order with the highest ranking at the NBB price. The process returns to step 1904, where it repeats the process of checking if the retrieved discretionary buy order can execute with the incoming sell order, or whether the process must retrieve the next-best discretionary buy order instead. It repeats the steps described above until the incoming sell order is completely matched, or until there are no more resting discretionary buy orders that can trade with the incoming sell order.

Incoming Sell Order Received

Figure 17A:
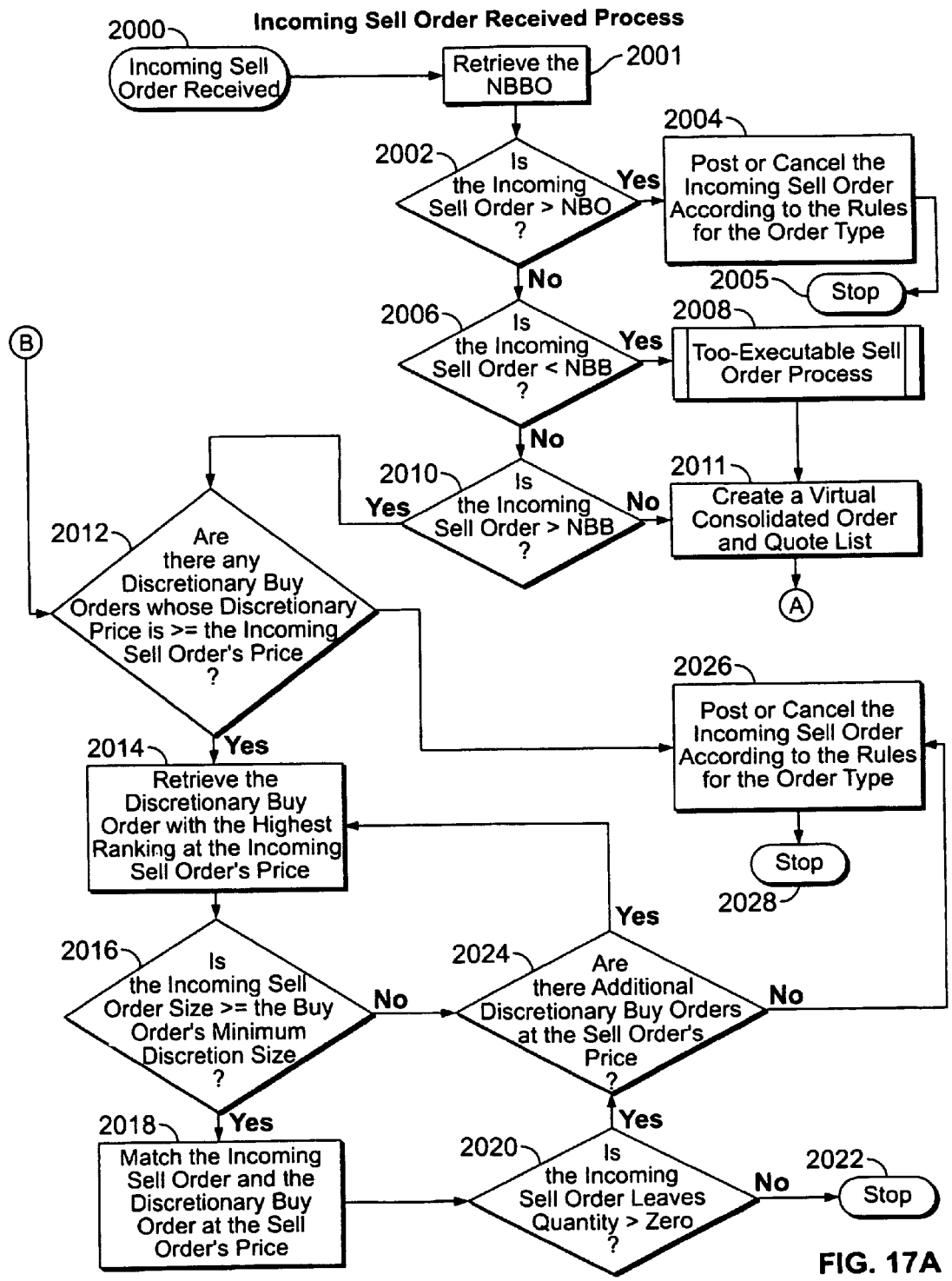
FIGS. 17A-17B are flow diagrams illustrating a process for receiving an incoming regular (non-discretionary) sell order in an embodiment of the present invention.
Figure 17B:
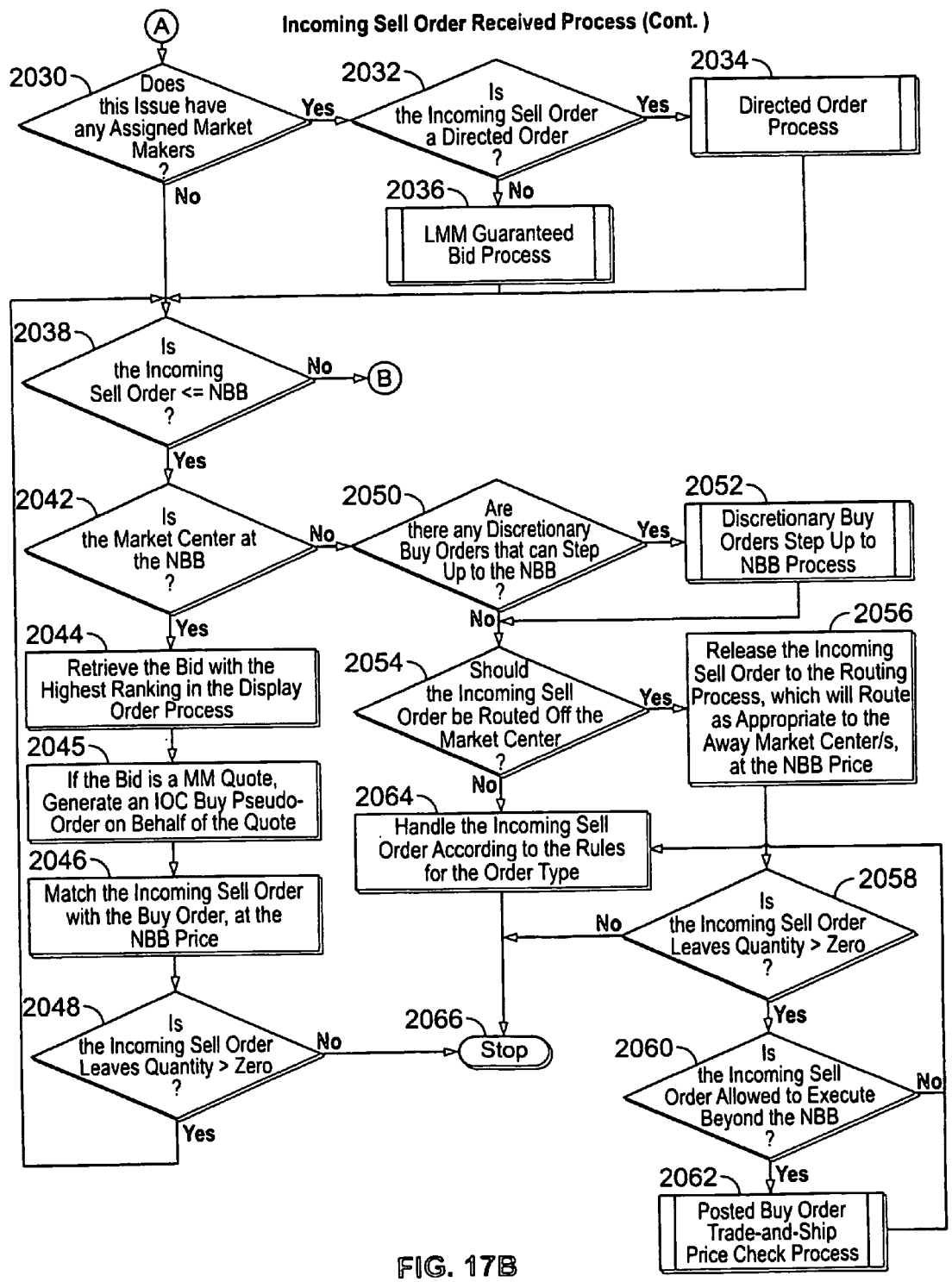

Referring now to FIGS. 17A-17B, the process is illustrated where the order matching engine 21 receives an incoming sell order without discretion. As in the previous FIGS. 12A-12B which illustrate a routine for receiving an incoming discretionary sell order, the routine illustrates the execution and/or routing of a marketable incoming sell order. The incoming sell order attempts to execute against as many displayed orders and market maker quotes as appropriate, but at the point where the incoming sell order is about to be posted, routed, or canceled, then the process looks for resting discretionary buy orders that can step up to execute. Additionally, if the incoming sell order is an order type that can contemporaneously execute beyond the NBB after satisfying all the away markets quoting at the NBB, e.g., using the "trade and ship" exception, then the process looks for resting buy orders at one tick inferior to the NBB, including resting discretionary buy orders that can step up to one tick inferior to the NBB.

At step 2000, the incoming sell order is received. In step 2001, the process retrieves the NBBO, and in step 2002, it checks if the incoming sell order is greater than the NBO. If the price is higher than the NBO, then the order is not executable, and accordingly the process continues to step 2004, where it posts or cancels the incoming sell order according to the rules of the order type, and the process terminates in step 2005. If, however, the incoming sell order is not greater than the NBO, then the process continues to step 2006 to determine if it is less than the NBB. If the price is lower than the NBB, then the process continues to step 2008, where it initiates the Too-Executable Sell Order Check Process, and proceeds to step 1500 in FIG. 13. If the incoming sell order is not canceled in the Too-Executable Sell Order Check Process, i.e., it is not determined to be too executable, then the process continues to step 2011, where it creates a virtual consolidated order and quote list for the option series by combining the away market BBO book 25*a*, the market maker quote book 33*a*, and the internal order book 29*a*, and ranking the orders and quotes according to price/display/time priority, but with a preference for displayed trading interest over away market quotes at the same price. The process then continues to step 2030.

Returning to step 2006, if the incoming sell order is not less than the NBB, then the process continues to step 2010, where it checks if it is greater than the NBB. If it is neither less than nor greater than the NBB, then it is equal to the NBB, and the process continues to step 2011, where it creates a virtual consolidated order and quote list for the option series. The process then continues to step 2030 as the incoming sell order is marketable at the NBB.

Returning to step 2010, if, however, the incoming sell order is greater than the NBB, then it is priced between the spread and is not executable unless there are resting discretionary buy orders that can step up to match it. Accordingly, the process continues to step 2012, where it checks if any resting discretionary buy orders have a discretionary price that is greater than or equal to the incoming sell order's price. If there are no such eligible discretionary buy orders, then the process continues to step 2026, where it posts or cancels the incoming sell order according to the rules of the order type, and the process terminates in step 2028 as indicated.

Returning to step 2012, if there are resting discretionary buy orders that can step up to the sell order's price, then the process continues to step 2014, where it retrieves the discretionary buy order with the highest ranking at the incoming sell order's price. For example, if the sell order's price is 1.95, then all discretionary buy orders that can step up to 1.95 are evaluated, and the order with the highest ranking at the price of 1.95 is retrieved. The process continues to step 2016, where it checks if the incoming sell order's size is greater than or equal to the resting discretionary buy order's minimum discretion size. It should be noted that in this embodiment of the invention, only the minimum discretion size of a resting discretionary order is checked, to disguise its presence in the order book. The minimum discretion size of an incoming discretionary order is not checked, as the process attempts to execute as much quantity as possible. If the buy order does not include a minimum discretion size, then its value defaults to zero and the incoming sell order's size is automatically greater. If the buy order does include a minimum discretion size, then the incoming sell order's size must be at least its equal. If the resting discretionary buy order's minimum discretion size is higher, then the incoming sell order does not have sufficient size, and the process continues to step 2024, where it checks if there are additional resting discretionary buy orders that can step up to the incoming sell order's price. If there are, the process returns to step 2014, where it retrieves the next highest-ranked discretionary buy order, and repeats the process of checking its minimum discretion size against the incoming sell order size.

Returning to step 2016, it however, the incoming sell order has sufficient size to execute against the retrieved discretionary buy order, then the process continues to step 2018, where it matches the incoming sell order and the resting discretionary buy order, at the price of the incoming sell order. Accordingly, the discretionary buy order steps up only as high as is necessary to execute. The process continues to step 2020, where it checks if the incoming sell order still has quantity remaining. If it does not, then the process terminates in step 2022 as indicated. If, however, the incoming sell order still has available quantity, then the process continues to step 2024, where it checks if there are additional resting discretionary buy orders that can step up to execute against it. The process continues until the incoming sell order is depleted, or until there are no more discretionary buy orders that can execute against it, in which case it is posted or canceled according to its order type, as described above.

If in the process of executing the procedures described above, the process determines that the incoming sell order is executable against the NBB, then at step 2030, it checks if the issue has any assigned market makers. If it does, then the process continues to step 2032, where it checks whether the incoming sell order is a directed order. If it is a directed order, then the process continues to step 2034, where it initiates the Directed Order Process and proceeds to step 700 in FIG. 7A. Returning to step 2032, if, however, the incoming sell order is not a directed order, then the process continues to step 2036, where it initiates the LMM Guaranteed Bid Process and proceeds to step 1600 in FIG. 14.

Regardless of whether the incoming sell order participates in the Directed Order Process or the LMM Guaranteed Bid Process or in neither process (if the applicable market maker was not quoting at the NBB), the process continues to step 2038, where it checks if the incoming sell order is still less than or equal to the NBB. By way of explanation, it may have exhausted the NBB if it executed in a market maker guaranteed entitlement process. If the incoming sell order is not executable at the present NBB, then the process returns to step 2012, where it checks if there are any resting discretionary buy orders that can step up to the incoming sell order's price. By way of explanation, the process is now looking for resting discretionary buy orders at this point because if displayed buy orders or market maker bids can execute against the incoming sell order, then those orders/quotes have priority over any resting discretionary buy orders that must use discretion to execute. The discretionary buy orders are allowed to step up now only because all trading interest at the previous NBB has been depleted by trading and the incoming sell order would otherwise be posted or canceled at this point, as it is currently priced between the spread. The process continues to steps 2012 through 2028, as previously described in detail, until the incoming sell order is either completely matched or else is posted or canceled.

Returning to step 2038, if, however, the incoming sell order is still less than or equal to the NBB, then the process continues to step 2042, where it checks if the market center 20 is at the NBB or not. If it is at the NBB, then the process continues to step 2044, where it retrieves the displayed buy order or market maker bid with the highest ranking in the Display Order Process. If it is a market maker bid, then in step 2045, the process generates an IOC buy pseudo-order on behalf of the underlying market maker bid. In step 2046, it matches the incoming sell order and the buy order or pseudo-order, at the NBB price. If the buy order is a pseudo-order, then the process also notifies the market maker quote engine 32b of the quantity of contracts that were executed so that it can decrement the market maker's bid as appropriate.

In step 2048, the process checks if the incoming sell order still has any quantity remaining, and if it does not, the process continues to step 2066, where it terminates as indicated. If, however, the incoming sell order still has quantity available, then the process returns to step 2038, where it repeats the procedure described above for determining if the incoming sell order can execute against additional posted buy orders or market maker bids.

Returning to step 2042, if, however, the market center 20 is not at the NBB, then the incoming sell order may be required to route to one or more away markets at the NBB. However, before any such routing decision occurs, the process first checks at step 2050 if there are any resting discretionary buy orders that can step up to the NBB to execute with the incoming sell order. If there are such eligible orders, then the process continues to step 2052, where it initiates the Discretionary Buy Orders Step Up to NBB Process and proceeds to step 1900 in FIG. 16. If the incoming sell order still has quantity available after executing with the resting discretionary buy orders in FIG. 16, then the process continues to step 2054. The process also continues to step 2054 if at step 2050 the process determines that there are no resting discretionary buy orders that can step up to the NBB.

In step 2054, the process checks if the incoming sell order should be routed off the market center 20. It is possible that the incoming sell order is an order type that cannot be routed (e.g., an Exchange-Restricted Order, or an IOC order). It is also possible that the incoming sell order type can be routed, but all the away market centers quoting at the NBB have already been fully satisfied by prior orders routed over the linkage. If the incoming sell order should not route, then the process continues to step 2064, where it posts, queues, cancels, hides, or reprices the incoming sell order according to the rules for the order type, and the process terminates in step 2066 as indicated.

Returning to step 2054, if, however, the process determines that the incoming sell order should be routed, then the process continues to step 2056, where it releases the incoming sell order to the routing process, which routes the incoming sell order to each eligible away market center quoting at the NBB, at a quantity up to its unsatisfied bid size, and at a price equal to the NBB. After routing to all eligible market centers, the process continues to step 2058, where it checks if the incoming sell order still has quantity remaining. If it does not, the process continues to step 2066, where it terminates as indicated. If, however, the incoming sell order does still have quantity available, then the process continues to step 2060, where it checks if the incoming sell order type is allowed to execute beyond the NBB after it has satisfied the NBB. For example, sweep limit orders are allowed to execute beyond the NBB. If the incoming sell order type is not allowed to execute beyond the NBB, then the process continues to step 2064 where the remainder of the incoming sell order is posted, queued, canceled, or repriced according to the rules of the order type, and the process terminates in step 2066. If, however, the incoming sell order type is allowed to execute beyond the NBB, then the process continues to step 2062, where it initiates the Posted Buy Order Trade-and-Ship Price Check Process" and proceeds to step 2100 in FIG. 18. After attempting to execute in FIG. 18, if the incoming sell order is not fully matched, then the remaining quantity is posted, queued, canceled, hidden, or repriced in step 2064 according to the rules of the order type, and the process terminates in step 2066.

Posted Buy Order Trade-and-Ship Price Check Process

Figure 18:
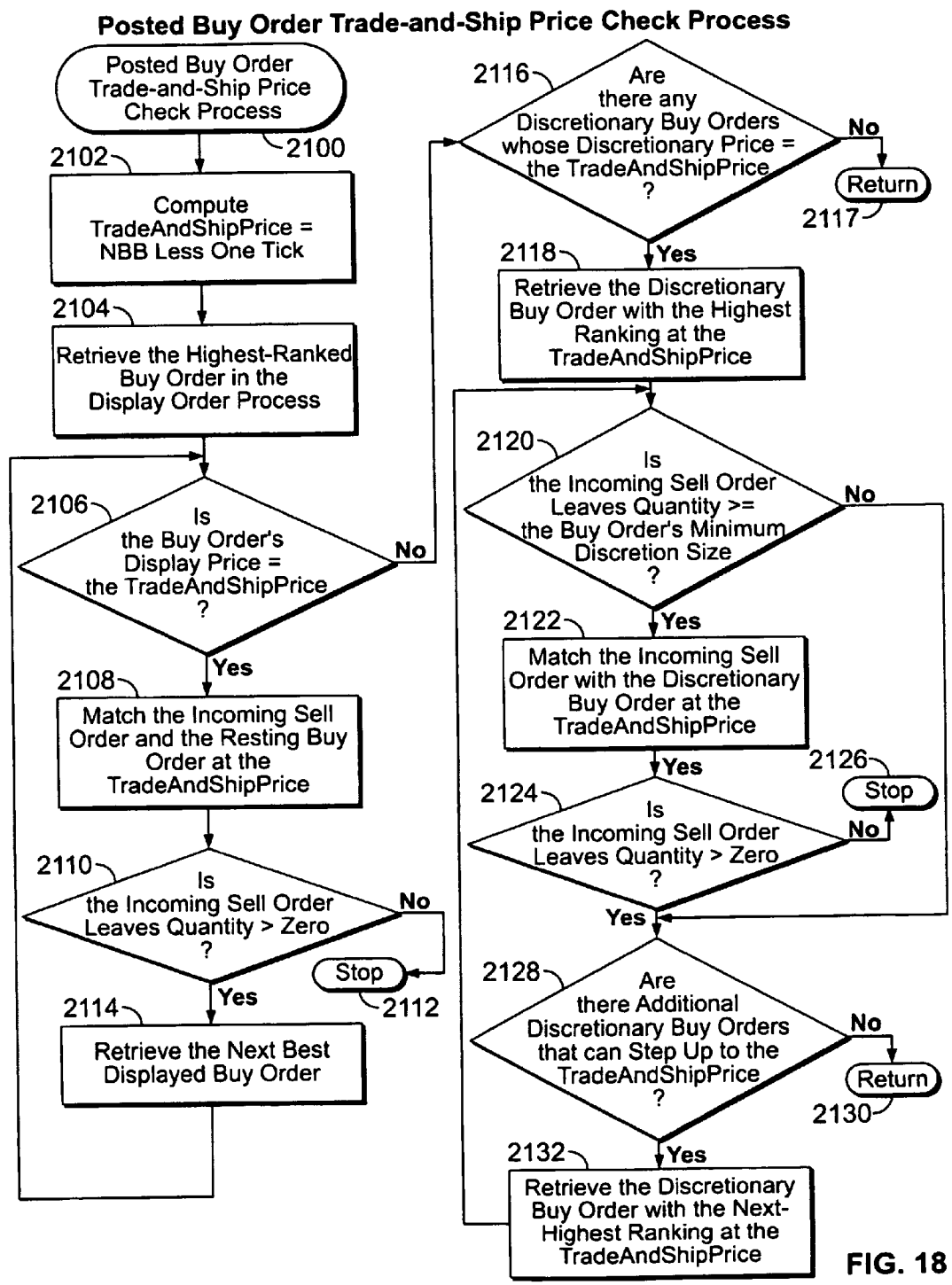
FIG. 18 is a flow diagram illustrating a process for matching an incoming sell order with resting buy orders that can execute at a price that is one tick inferior to the NBB.

Referring now to FIG. 18, the Posted Buy Order Trade-and-Ship Price Check Process is illustrated. The Posted Buy Order Trade-and-Ship Price Check Process is a process that executes when an incoming sell order has been determined to be eligible to execute against resting buy orders priced at one tick inferior to the NBB contemporaneously with satisfying all away markets bidding at the NBB, for example, in accordance with the "trade and ship" marketplace exception. In this embodiment, resting discretionary buy orders that can step up to one tick inferior to the NBB are also allowed to execute against the incoming sell order.

The process is initiated at step 2100, and at step 2102, the process computes the price that is one tick inferior to the NBB (the "TradeAndShipPrice") by subtracting one minimum price increment (tick) from the current NBB price. In step 2104, it retrieves the displayed buy order with the highest ranking in the Display Order Process. In step 2106, it checks if the retrieved buy order's price is equal to the computed TradeAndShipPrice, i.e., if the retrieved buy order is one tick worse than the NBB. If it is, the process continues to step 2108, where it matches the incoming sell order and the retrieved buy order at the computed TradeAndShipPrice.

In step 2110, the process checks if the incoming sell order has any quantity remaining. If it does not, then the process terminates in step 2112 as indicated. If it does still have available quantity, then the process continues to step 2114 where it retrieves the next-best displayed buy order and returns to step 2106, where it repeats the process of checking if the retrieved buy order's price is equal to the computed TradeAndShipPrice. If it is, the process matches the orders at the TradeAndShipPrice, and continues according to the steps described above until the incoming sell order is completely matched or until there are no additional displayed buy orders at the TradeAndShipPrice, as described next.

Returning to step 2106, if, however, the retrieved displayed buy order has a price that is inferior to the computed TradeAndShipPrice, then the process continues to step 2116, where it checks if there are any resting discretionary buy orders that can step up to the computed TradeAndShipPrice. If there are no such eligible orders, then the process continues to step 2117, where it returns to the step where it was originally initiated, back to step 2062 (FIG. 17B). If, however, there are resting discretionary buy orders that can step up to the TradeAndShipPrice, then the process continues to step 2118, where it retrieves the discretionary buy order with the highest ranking at the TradeAndShipPrice. For example, if the NBB is 2.00 and this issue has a tick of 0.05 at this price level, then the TradeAndShipPrice is 1.95, and the discretionary buy order with the highest ranking at the price of 1.95 is retrieved.

The process continues to step 2120, where it checks if the incoming sell order's leaves quantity is greater than or equal to the retrieved discretionary buy order's minimum discretion size. If the retrieved buy order does not have a minimum discretion size, then its value defaults to zero, and the incoming sell order's size is automatically greater. If, however, the retrieved buy order does include a minimum discretion size and the incoming sell order's size is not at least equal to it, then the process continues to step 2128, where it checks if there are any other resting discretionary buy orders that can step up to trade with the incoming sell order instead.

If there are none, then the process continues to step 2130, where it returns to the step where it was originally initiated, back to step 2062 (FIG. 17B). If, however, there are additional discretionary buy orders that can step up to the computed TradeAndShipPrice, then the process continues to step 2132, where it retrieves the next-best discretionary buy order and then returns to step 2120 to repeat the process described above for determining if the orders are eligible to match. It continues this process until the incoming sell order is completely matched or until there are no more discretionary buy orders that are eligible to trade.

Returning to step 2120, if the incoming sell order has sufficient size to at least equal the discretionary buy order's minimum discretion size, then the process continues to step 2122, where it matches the incoming sell order with the retrieved discretionary buy order, at the computed TradeAndShipPrice. In step 2124, the process checks if the incoming sell order still has any remaining quantity, and if it does not, it terminates in step 2126 as indicated. If the incoming sell order still has available quantity, then the process continues to step 2128, where it checks if there are additional resting discretionary buy orders that can step up to execute. It continues according to the steps described above until the incoming sell order is completely matched or until there are no more discretionary buy orders that are eligible to trade.

It should be noted that if market maker bids priced at one tick inferior to the NBB are also allowed to execute with the incoming sell order according to marketplace rules, then at step 2104 and step 2114, the process will retrieve the best displayed buy order or market maker bid, as determined by their ranking in the Display Order Process. In the case of a market maker bid, the process generates an IOC buy pseudo-order on behalf of the market maker bid, executes the incoming sell order against the buy pseudo-order at the TradeAndShipPrice, and then notifies the market maker quote engine 32b of the executed quantity so that it can decrement the market maker bid as appropriate.

Example of the Ranking of a Discretionary Order in the Display Order Process and the Working Order Process A discretionary order resides in the Display Order Process, but also has a price component that resides in the Working Order Process. This is illustrated in the figure below by explicitly showing a link at each price level at which a discretionary order can execute. As the prices are not publicly displayed, the links are shown "dark" in this example. Although Discretionary Orders A and C may appear to reside in multiple cells, a discretionary order only has one position in the internal order book 29a, and that position is based on its display price. If multiple discretionary orders are eligible to "step up" to execute against an incoming order, then the order with the highest ranking in the Display Order Process is also granted the highest ranking in the Working Order Process.

For example, the order matching engine 21 receives the following three orders, in this sequence:
Order A: Buy 30@2.25, Discretionary Price=2.30
Order B: Buy 10@2.25
Order C: Buy 20@2.20, Discretionary Price=2.35
The orders conceptually look like this in the bid side of the internal order book 29a:

| Price | Display Order Process | Working Order Process |
|---|---|---|
| 2.35 | | ▓▓▓▓▓▓▓ |
| 2.30 | | ▓▓▓▓▓▓▓ |
| 2.25 | Order A: Buy 30 | ▓▓▓▓▓▓▓ |
| | Order B: Buy 10 | |
| 2.20 | Order C: Buy 20 | |

→In this example, assume that the NBB is 2.25 and the best away market center's bid is also 2.25 so that there are no trade-through issues.

As illustrated by the way the order matching engine 21 has ranked the orders in the internal order book 29a, the posted buy orders can trade with a marketable incoming sell order as follows:

If the incoming sell order's price is 2.35, only Order C can trade.
If the incoming sell order's price is 2.30, both Order A and Order C can trade. As Order A has a higher priority in the Display Order Process (its display price of 2.25 is superior to Order C's display price of 2.20), it also has higher priority in the Working Order Process at the price level of 2.30, regardless of the fact that its discretionary price (2.30) is inferior to the discretionary price (2.35) of Order C.
If the incoming sell order's price is 2.25, then Orders A, B, and C can trade. Orders A and B can only trade in the Display Order Process, with Order A having time priority over Order B. Order C can only trade in the Working Order Process after Orders A and B have been completely executed first.

As illustrated above, an order can trade with discretion only after all displayed trading interest is exhausted first. As also illustrated above, when multiple discretionary orders can "step up" to the same discretionary price, the order with the higher priority in the Display Order Process is also granted the higher priority in the Working Order Process. These rules serve to reward orders for displaying more aggressive prices in the public order book.

Detailed Examples of Discretionary Order Trading

Examples of how quotes and orders are processed in a preferred embodiment of the invention are provided below. It should be understood that the order and quote prices and sizes discussed in these examples are by way of example only to illustrate how the process of an embodiment of the invention operates. Quote and order processing is not limited to these examples. It should also be noted that the term "linkage" when referring to the routing of orders between market centers is not limited to an intermarket linkage such as the Options Linkage Authority, but may also include any other direct or third-party network connection or any broker/dealer affiliate acting as an agent for routing orders.

Example 1

Incoming Directed Market Order Executes Against Resting Discretionary Orders in the Directed Order Process and the Working Order Process In the Directed Order Process, a customer order can step ahead of other non-customer orders and quotes that were received before it, as can the designated market maker quote. Therefore, in the Directed Order Process, price priority is strictly enforced, but time priority is not.

The following example illustrates the ranking of orders and quotes within the DMM Guarantee Process, the Display Order Process, and the Working Order Process. In this example, the issue has a lead market maker (Firm B) and a regular market maker (Firm A). After executing in the Directed Order Process first, the incoming order then proceeds to execute in the Display Order Process next, and then executes in the Working Order Process last. For ease of illustration, only the offer side of the books is shown in this example.

→The NBBO is 1.95 to 2.05
The offer side of the away market BBO quote book 25a looks like this:

| Offer | Details | Source | Time received |
|---|---|---|---|
| AwayMktA | Offer 60 @ 2.05 | Away Market A | 10:02:32 |
| AwayMktB | Offer 30 @ 2.05 | Away Market B | 10:03:15 |

The offer side of the market maker quote book 33a looks like this:

| Offer | Details | Source | Time received |
|---|---|---|---|
| Quote A | Offer 60 @ 2.05 | FirmA | 10:04:22 |
| Quote B | Offer 30 @ 2.05 | FirmB | 10:05:30 |

The offer side of the internal order book 29a looks like this:

| Order | Details | On behalf of | Time received |
|---|---|---|---|
| Order D | Sell 30 @ 2.05 | Non-customer | 10:01:03 |
| Order E | Sell 10 @ 2.05, Discretion to 2.00 | Customer | 10:03:50 |
| Order G | Sell 40 @ 2.10, Discretion to 2.00 | Customer | 09:58:57 |

The offer side of the public order book looks like this:

| Published Offers |
|---|
| 130 @ 2.05 |
| 40 @ 2.10 |

Step 1a: Determine if a Designated Market Maker is Entitled to a Guaranteed Allocation of an Incoming Directed Order In step 1000 (FIG. 10A), the process receives the following incoming Directed Order in issue XYZ from order sending firm "FirmB" designated for market maker firm "FirmA":
Order 1: Buy 150@Market, Directed Order for FirmA
In step 1001, the process retrieves the NBBO (1.95 to 2.05). In step 1002, it checks if the incoming Directed Buy Order 1 is less than the NBB (1.95). As market buy orders are priced at the NBO by definition, the process continues to step 1006, where it checks if incoming Directed Buy Order 1 is greater than the NBO. Again, as market buy orders are priced at the NBO by definition, the process continues to step 1010, where it checks if incoming Directed Buy Order 1 is less than the NBO. As it is priced at the NBO by definition, the process continues to step 1011, where it generates a virtual consolidated order and quote list for the option series.

The offer side of the virtual consolidated order and quote list looks like this:

| Order or Quote | Details | Source | Time received |
|---|---|---|---|
| Order D | Sell 30 @ 2.05 | Non-customer | 10:01:03 |
| Order E | Sell 10 @ 2.05, Discretion to 2.00 | Customer | 10:03:50 |
| Quote A | Offer 60 @ 2.05 | FirmA | 10:04:22 |
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The process continues to step 1030, where it checks if this issue has any assigned market makers. As it does, the process continues to step 1032, where it checks if incoming Buy Order 1 is a directed order or not. As it is a directed order, the process continues to step 1034, where it initiates the Directed Order Process and proceeds to step 700 (FIG. 7A).

In step 702, the process sets the order sending firm ("OSF") parameter to "FirmB," the ID assigned to the firm that sent incoming Directed Buy Order 1. In step 704, it retrieves the DMM/OSF Permissions Table, which looks like this:

| Issue | Designated Market Maker Firm (DMM) | Default Market Maker? | Order Sending Firm (OSF) |
|---|---|---|---|
| XYZ | FirmA | | FirmB |
| XYZ | FirmA | Yes | FirmC |
| XYZ | FirmB | Yes | FirmB |
| XYZ | FirmB | | FirmA |

In step 706, the process checks if incoming Directed Buy Order 1 specifies a designated market maker. As it has specified Firm A as the designated market maker, the process continues to step 708, where it sets the designated market maker ("DMM") parameter to "FirmA," the ID assigned to the designated firm. In step 710, the process checks the rules in the DMM/OSF Permissions Table, and determines that Firm B is indeed permissioned to direct orders to Firm A (first rule in the Table).

The process proceeds to step 718, where it checks if incoming Directed Buy Order 1 is a buy order or a sell order. As it is a buy order, the process continues to step 720, where it initiates the DMM Guaranteed Offer Process and proceeds to step 800 FIG. 8).

Step 1b: Execute the Incoming Directed Order Against a Customer Order and the DMM Quote In step 802, the process retrieves the offer for the designated market maker, Firm A. As shown below, the designated market maker offer is Quote A:

| Order or Quote | Details | Source | Time received |
|---|---|---|---|
| Order D | Sell 30 @ 2.05 | Non-customer | 10:01:03 |
| Order E | Sell 10 @ 2.05, Discretion to 2.00 | Customer | 10:03:50 |

-continued

| Order or Quote | Details | Source | Time received |
|---|---|---|---|
| Quote A | Offer 60 @ 2.05 ← | FirmA | 10:04:22 |
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

In step 804, the process determines that Quote A (2.05) is equal to the NBO (2.05), and accordingly Quote A is eligible to participate in the Directed Order Process. The process continues to step 808, where it checks if incoming Directed Buy Order 1's size (150 contracts) is greater than two contracts. As it is, in step 814, the process checks if there are any displayed customer sell orders at the NBO (2.05). As shown below, Discretionary Order E is a customer sell order at the NBO because its display price is 2.05:

| Order or Quote | Details | Source | Time received |
|---|---|---|---|
| Order D | Sell 30 @ 2.05 | Non-customer | 10:01:03 |
| Order E | Sell 10 @ 2.05, ← Discretion to 2.00 | Customer | 10:03:50 |
| Quote A | Offer 60 @ 2.05 | FirmA | 10:04:22 |
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The process continues to step 816, where it stores the timestamp assigned to Quote A (10:04:22) in the parameter DMMOfferTimestamp. In step 818, it retrieves the earliest displayed customer sell order at the NBO, Discretionary Sell Order E. In step 820, the process compares the timestamp of Discretionary Sell Order E (10:03:50) to the value of the DMMOfferTimestamp parameter (10:04:22) and determines that the order timestamp is lower, i.e., the order was received prior to the quote. Accordingly, the process continues to step 822, where it matches 10 contracts of incoming Directed Buy Order 1 with customer Discretionary Sell Order E at its displayed price of 2.05, completely depleting Discretionary Sell Order E.

The offer side of the virtual consolidated order and quote list now looks like this:

| Order or Quote | Details | Source | Time received |
|---|---|---|---|
| Order D | Sell 30 @ 2.05 | Non-customer | 10:01:03 |
| Quote A | Offer 60 @ 2.05 | FirmA | 10:04:22 |
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The offer side of the internal order book 29a now looks like this:

| Order | Details | On behalf of | Time received |
|---|---|---|---|
| Order D | Sell 30 @ 2.05 | Non-customer | 10:01:03 |
| Order G | Sell 40 @ 2.10, Discretion to 2.00 | Customer | 09:58:57 |

The offer side of the public order book now looks like this:

| Published Offers |
|---|
| 120 @ 2.05 ← |
| 40 @ 2.10 |

The process continues to step 824, where it checks if incoming Directed Buy Order 1 still has any quantity available to trade. As it has 140 contracts remaining, the process continues to step 828, where it checks if there are any more displayed customer sell orders at the NBO. It should be noted that Discretionary Sell Order G is a customer order, but its display price (2.10) is inferior to the NBO (2.05), even though its discretionary price (2.00) is superior to the NBO. Accordingly, it is not eligible to participate in the Directed Order Process. The process proceeds to step 832, where it retrieves the guaranteed percentage allocated for designated market makers, which is stored in the parameter "DMMGuaranteedPercent."

In this example, the DMMGuaranteedPercent is configured to 40%. In step 834, the process multiplies the remaining quantity of incoming Directed Buy Order 1 (140 contracts) by the DMMGuaranteedPercent (40%) to derive the DMMGuaranteedAllocation of 56 contracts (40% of 140 contracts=56 contracts). In step 838, the process matches 56 contracts of incoming Directed Buy Order 1 against Quote A, the lesser of the DMMGuaranteedAllocation (56 contracts) and the DMM Offer size (60 contracts), at the price of 2.05. It does this by generating an IOC pseudo-order to Sell 60@2.05 on behalf of DMM Offer Quote A, and executing the incoming Directed Buy Order 1 against the sell pseudo-order. The process also notifies the market maker quote engine 32b to decrement Quote A by the 56 contracts just executed. Quote A still has 4 contracts available to trade. The Directed Order Process is completed.

The offer side of the virtual consolidated order and quote list now looks like this:

| Order or Quote | Details | Source | Time received |
|---|---|---|---|
| Order D | Sell 30 @ 2.05 | Non-customer | 10:01:03 |
| Quote A | Offer 4 @ 2.05 ← | FirmA | 10:04:22 |
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The market maker quote engine 32b decrements Quote A. The offer side of the market maker quote book 33a now looks like this:

| Offer | Details | Source | Time received |
|---|---|---|---|
| Quote A | Offer 4 @ 2.05 ← | FirmA | 10:04:22 |
| Quote B | Offer 30 @ 2.05 | FirmB | 10:05:30 |

The offer side of the public order book now looks like this:

| Published Offers |
|---|
| 64 @ 2.05 ← |
| 40 @ 2.10 |

The process continues to step 842, where it checks if incoming Directed Buy Order 1 still has any quantity available to trade. As it still has 84 contracts remaining, the process continues to step 846, where it returns to the step where it was originally initiated, back to step 720 (FIG. 7A).

From step 720, the process continues to step 722, where it returns to the step where it was originally initiated, back to step 1034 (FIG. 10B).

Step 1c: Execute the Incoming Order in the Display Order Process

After the Directed Order Process completes, incoming Buy Order 1 is no longer a directed order, and is processed like any other non-directed order. In step 1038, the process checks if incoming Buy Order 1 is still greater than or equal to the NBO. As a market buy order is priced at the NBO by definition, the process continues to step 1042, where it checks if the market center 20 is at the NBO. As it is, the process continues to step 1044, where it retrieves the sell order or market maker offer with the highest ranking in the Display Order Process. As illustrated in the table above, Sell Order D is the highest-ranked offer. The process continues to step 1046, where it matches 30 contracts of incoming Buy Order 1 against Sell Order D, at the price of 2.05, completely depleting Sell Order D.

The offer side of the virtual consolidated order and quote list now looks like this:

| Order or Quote | Details | Source | Time received |
|---|---|---|---|
| Quote A | Offer 4 @ 2.05 | FirmA | 10:04:22 |
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The offer side of the internal order book 29a now looks like this:

| Order | Details | On behalf of | Time received |
|---|---|---|---|
| Order G | Sell 40 @ 2.10, Discretion to 2.00 | Customer | 09:58:57 |

The offer side of the public order book now looks like this:

| Published Offers |
|---|
| 34 @ 2.05 ← |
| 40 @ 2.10 |

The process continues to step 1048, where it checks if incoming Buy Order 1 still has any contracts available to trade. As it still has 54 contracts remaining, the process returns to step 1038, where it checks if incoming Buy Order 1 is still greater than or equal to the NBO. As it is, the process continues to step 1042, where it checks if the market center 20 is still at the NBO. As it is, the process continues to step 1044, where it retrieves the sell order or market maker offer with the highest ranking in the Display Order Process.

As illustrated in the table above, Quote A now has the highest ranking in the Display Order Process. As the process has already generated a sell pseudo-order on behalf of Quote A in the Directed Order Process, the process continues to step 1046, where it matches 4 contracts of incoming Buy Order 1 against the 4 remaining contracts of the sell pseudo-order, at the price of 2.05. Quote A is completely depleted and is removed from the virtual consolidated order and quote list. The process also notifies the market maker quote engine 32b to decrement Quote A by the 4 contracts executed.

The offer side of the virtual consolidated order and quote list now looks like this:

| Order or Quote | Details | Source | Time received |
|---|---|---|---|
| Quote B | Offer 30 @ 2.05 | FirmB | 10:05:30 |
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The market maker quote engine 32b removes depleted Quote A. The offer side of the market maker quote book 33a now looks like this (Firm A must manually replenish its offer):

| Offer | Details | Source | Time received |
|---|---|---|---|
| Quote B | Offer 30 @ 2.05 | FirmB | 10:05:30 |

The offer side of the public order book now looks like this:

| Published Offers |
|---|
| 30 @ 2.05 ← |
| 40 @ 2.10 |

The process continues to step 1048, where it checks if incoming Buy Order 1 still has any contracts available to trade. As it still has 50 contracts remaining, the process returns to step 1038, where it checks if incoming Buy Order 1 is still greater than or equal to the NBO. As it is, the process continues to step 1042, where it checks if the market center 20 is still at the NBO. As it is, the continues to step 1044, where it retrieves the sell order or market maker offer with the highest ranking in the Display Order Process.

As illustrated in the table above, Quote B now has the highest ranking in the Display Order Process. The process continues to step 1045, where it generates an IOC pseudo-order to Sell 30@2.05 on behalf of Quote B. The process continues to step 1046, where it matches 30 contracts of incoming Buy Order 1 against the sell pseudo-order, at the price of 2.05. Quote B is completely depleted, and is removed from the virtual consolidated order and quote list. The process also notifies the market maker quote engine 32b to decrement Quote B by the 30 contracts executed.

The offer side of the virtual consolidated order and quote list now looks like this:

| Order or Quote | Details | Source | Time received |
|---|---|---|---|
| AwayMktA | Offer 60 @ 2.05 | Away Market A | 10:02:32 |
| AwayMktB | Offer 30 @ 2.05 | Away Market B | 10:03:15 |
| Order G | Sell 40 @ 2.10, Discretion to 2.00 | Customer | 09:58:57 |

The offer side of the market maker quote book 33a is completely depleted until Firm A and Firm B manually replenish their offers.

The offer side of the public order book now looks like this:

| Published Offers |
|---|
| 40 @ 2.10 ← |

Step 1d: Incoming Market Order is Ready to Route to an Away Market

The process continues to step 1048, where it checks if incoming Buy Order 1 still has any contracts available to trade. As it still has 20 contracts remaining, the process returns to step 1038, where it checks if incoming Buy Order 1 is still greater than or equal to the NBO. As it is, the process continues to step 1042, where it checks if the market center 20 is at the NBO.

As shown in the Table above, Away Market A is now alone at the NBO. As a market order, incoming Buy Order 1 is eligible to route. The process continues to step 1050, where it checks if there are any resting discretionary sell orders that can step up to the NBO price of 2.05. As Discretionary Sell Order G can step up as high as 2.00, the process continues to step 1052, where it initiates the Discretionary Sell Orders Step Up to NBO Process and proceeds to step 900 (FIG. 9).

Step 1e: Posted Discretionary Order Steps Up to the NBO to Match the Incoming Market Order In step 902, the process retrieves resting Discretionary Sell Order G. In step 904, it checks if incoming Buy Order 1's Leaves quantity (20 contracts) is greater than or equal to resting Discretionary Sell Order G's minimum discretion size. As Sell Order G does not have a minimum discretion size and it therefore defaults to zero, incoming Buy Order 1's size is greater.

In step 910, the process matches the remaining 20 contracts of incoming Buy Order 1 against resting Discretionary Sell Order G, at the NBO price of 2.05. In step 912, the process checks if incoming Buy Order 1 has any contracts remaining. As it does not, the process terminates in step 914 as indicated. Discretionary Sell Order G still has 20 contracts remaining.

The offer side of the virtual consolidated order and quote list now looks like this:

| Order or Quote | Details | Source | Time received |
|---|---|---|---|
| AwayMktA | Offer 60 @ 2.05 | Away Market A | 10:02:32 |
| AwayMktB | Offer 30 @ 2.05 | Away Market B | 10:03:15 |
| Order G | Sell 20 @ 2.10, ← Discretion to 2.00 | Customer | 09:58:57 |

The offer side of the internal order book 29a now looks like this:

| Order | Details | On behalf of | Time received |
|---|---|---|---|
| Order G | Sell 20 @ 2.10, ← Discretion to 2.00 | Customer | 09:58:57 |

The offer side of the public order book now looks like this:

| Published Offers |
|---|
| 20 @ 2.10 ← |

As the incoming order has completed processing, the virtual consolidated order and quote list is deleted from local memory.

Example 2

Incoming Discretionary Order Participates in the Lead Market Maker Guarantee Process, the Display Order Process, and the Working Order Process In this example, an incoming discretionary order uses discretion to execute against a posted customer order and lead market maker quote in the LMM Guarantee Process. The internal order book 29a also contains a posted discretionary order that is unable to execute in the LMM Guarantee Process because its display price is inferior to the NBBO, even though its discretionary price can step up to the NBBO. After the LMM Guarantee Process completes, the process continues to execute the incoming discretionary order against the remaining displayed orders and market maker quotes, and the posted discretionary order is finally allowed to execute after the displayed interest has executed first. For ease of illustration, only the offer side of the books is shown in this example.
→The NBBO is 1.95 to 2.05

The offer side of the away market BBO quote book 25a looks like this:

| Offer | Details | Source | Time received |
|---|---|---|---|
| AwayMktA | Offer 10 @ 2.10 | Away Market A | 10:02:32 |
| AwayMktB | Offer 20 @ 2.15 | Away Market B | 10:03:15 |

The offer side of the market maker quote book 33a looks like this:

| Offer | Details | Source | Time received |
|---|---|---|---|
| Quote A | Offer 20 @ 2.05 | LMM | 10:04:22 |
| Quote B | Offer 30 @ 2.10 | MM2 | 10:00:15 |

The offer side of the internal order book 29a looks like this:

| Order | Details | On behalf of | Time received |
|---|---|---|---|
| Order D | Sell 30 @ 2.05 | Non-customer | 10:01:03 |
| Order E | Sell 10 @ 2.05, Discretion to 2.00 | Customer | 10:03:50 |

| Order | Details | On behalf of | Time received |
|---|---|---|---|
| Order G | Sell 10 @ 2.20, Discretion to 2.05 | Customer | 10:00:20 |

The offer side of the public order book looks like this:

| Published Offers |
|---|
| 60 @ 2.05 |
| 30 @ 2.10 |
| 10 @ 2.20 |

Step 2a: Incoming Discretionary Order Passes Check for Excessive Marketability

In step 400 (FIG. 4A), the process receives the following incoming discretionary buy order:

Order U2: Buy 100@2.00, Discretionary Price=2.10

In step 402, the process retrieves the NBO (2.05). In step 404, it checks if incoming Discretionary Buy Order U2's display price (2.00) is greater than or equal to the NBO (2.05). As incoming Discretionary Buy Order U2's display price is lower, the process continues to step 406, where it checks if incoming Discretionary Buy Order U2's discretionary price (2.10) is greater than or equal to the NBO (2.05). As incoming Discretionary Buy Order U2's discretionary price is higher, this means the order is marketable unless it is rejected for being "too executable." The process continues to step 410, where it initiates the Too-Executable Buy Order Check Process and proceeds to step 500 (FIG. 5).

In step 502, the process evaluates whether the check for excessive discretion is enabled for this order type. In this example, the market center 20 has decided to check discretionary prices and display prices for excessive marketability. As incoming Buy Order U2 is a discretionary order, the process continues to step 504, where it checks if incoming Buy Order U2's discretionary price (2.10) is greater than the NBO (2.05). As it is, the process continues to step 506, where it retrieves the stored parameter that specifies the maximum percentage allowed through the NBBO ("MaxPercentOffNBBO"). In this example, the MaxPercentOffNBBO is configured to be 15%, i.e., an incoming discretionary order's discretionary price is allowed to be up to 15% more aggressive than the opposite side of the NBBO.

In step 508, the process derives the maximum allowable price increment through the NBBO ("MaxPriceThruNBO") by multiplying the MaxPercentOffNBBO (15%) and the NBO price (2.05). The MaxPriceThruNBO is computed as 0.3075 (15% of 2.05=0.3075), which is rounded down to 0.30, the nearest tick. In step 510, the process computes the highest valid discretionary price for incoming Buy Order U2 ("MaxBuyPrice") by adding the derived MaxPriceThruNBO (0.30) to the NBO (2.05), yielding a MaxBuyPrice=2.35. In step 512, the process checks if incoming Buy Order U2's discretionary price (2.10) is greater than the derived MaxBuyPrice (2.35). As it not greater, incoming Buy Order U2's discretionary price is not "too executable," and accordingly the process continues to step 513, where it returns to the step where it was originally initiated, back to step 410. The process continues to step 411, where it generates a virtual consolidated order and quote list for the option series.

The offer side of the virtual consolidated order and quote list looks like this:

| Order or Quote | Details | Source | Time received |
|---|---|---|---|
| Order D | Sell 30 @ 2.05 | Non-customer | 10:01:03 |
| Order E | Sell 10 @ 2.05, Discretion to 2.00 | Customer | 10:03:50 |
| Quote A | Offer 20 @ 2.05 | LMM | 10:04:22 |
| Quote B | Offer 30 @ 2.10 | MM2 | 10:00:15 |
| AwayMktA | Offer 10 @ 2.10 | Away Market A | 10:02:32 |
| AwayMktB | Offer 20 @ 2.15 | Away Market B | 10:03:15 |
| Order G | Sell 10 @ 2.20, Discretion to 2.05 | Customer | 10:00:20 |

The process continues to step 412, where it checks if this issue has assigned market makers. As it does, the process continues to step 414, where it checks if incoming Discretionary Buy Order U2 is a directed order. As it is not, the process continues to step 418, where it initiates the LMM Guaranteed Offer Process, and proceeds to step 600 (FIG. 6).

Step 2b: LMM Guarantee Process is in Effect for this Issue

In step 602, the process retrieves the lead market maker's offer (20@2.05). In step 604, the process checks if the lead market maker's offer is at the NBO. As it is, the lead market maker is entitled to guaranteed participation with incoming Discretionary Buy Order U2, after any superior displayed customer orders are executed first. The process continues to step 608, where it checks if incoming Discretionary Buy Order U2's size is greater than two contracts. As it is, the process continues to step 614.

Step 2c: Incoming Discretionary Order Matches Displayed Customer Order with Time Priority Over the LMM Quote In step 614, the process checks if there are any displayed customer sell orders at the NBO, and finds posted Sell Order E. As posted Sell Order E is a displayed customer order at the NBO, the process stores the timestamp of the LMM Offer (10:04:22) in step 616. In step 618, it retrieves posted customer Sell Order E. In step 620, it compares the timestamp of posted Sell Order E (10:03:50) to the timestamp of the LMM Offer (10:04:22). As posted Sell Order E was received prior to the lead market maker's offer, in step 622, the process matches 10 contracts of incoming Discretionary Buy Order U2 with posted Sell Order E, completely depleting posted Sell Order E and removing it from the books.

The offer side of the virtual consolidated order and quote list now looks like this:

| Order or Quote | Details | Source | Time received |
|---|---|---|---|
| Order D | Sell 30 @ 2.05 | Non-customer | 10:01:03 |
| Quote A | Offer 20 @ 2.05 | LMM | 10:04:22 |
| Quote B | Offer 30 @ 2.10 | MM2 | 10:00:15 |
| AwayMktA | Offer 10 @ 2.10 | Away Market A | 10:02:32 |
| AwayMktB | Offer 20 @ 2.15 | Away Market B | 10:03:15 |
| Order G | Sell 10 @ 2.20, Discretion to 2.05 | Customer | 10:00:20 |

The offer side of the internal order book 29a now looks like this:

| Order | Details | On behalf of | Time received |
|---|---|---|---|
| Order D | Sell 30 @ 2.05 | Non-customer | 10:01:03 |
| Order G | Sell 10 @ 2.20, Discretion to 2.05 | Customer | 10:00:20 |

The offer side of the public order book now looks like this:

| Published Offers |
|---|
| 50 @ 2.05 ← |
| 30 @ 2.10 |
| 10 @ 2.20 |

In step 624, the process checks if incoming Discretionary Buy Order U2 still has any contracts remaining. As it still has 90 contracts, it continues to step 628, where it checks if there are any more displayed customer sell orders at the NBO. Note that although posted customer Sell Order G has discretion up to 2.05, the NBO, it is not displayed at the NBO (it is displayed at 2.20), and is therefore ineligible to participate in the LMM Guarantee Process. Accordingly, as there are no other displayed customer sell orders at the NBO, the process proceeds to step 632.

Step 2d: Incoming Discretionary Order Matches the LMM Quote According to Guaranteed Participation Rules In step 632, the process retrieves the LMMGuaranteedPercent parameter, which is configured to 40% in this example. In step 634, the process derives the LMMGuaranteedAllocation (36 contracts) by multiplying the LMMGuaranteedPercent (40%) by the remaining portion of incoming Discretionary Buy Order U2 (90 contracts). The LMMGuaranteedAllocation is the maximum quantity of contracts that can execute in the LMM Guarantee Process.

In step 638, the process matches 20 contracts of incoming Discretionary Buy Order U2 against the lead market maker's offer, the lesser of the LMMGuaranteedAllocation (36 contracts) and the LMM Offer size (20 contracts), at the NBO price of 2.05. It does this by generating an IOC pseudo-order to Sell 20@2.05 on behalf of Quote A, the lead market maker's offer, and executing incoming Buy Order U2 against the sell pseudo-order. The lead market maker's offer at 2.05 is completely depleted, and is removed from the virtual consolidated order and quote list. The process notifies the market maker quote engine 32b to decrement the lead market maker's offer by the 20 contracts executed. The LMM Guarantee Process has completed.

The offer side of the virtual consolidated order and quote list now looks like this:

| Order or Quote | Details | Source | Time received |
|---|---|---|---|
| Order D | Sell 30 @ 2.05 | Non-customer | 10:01:03 |
| Quote B | Offer 30 @ 2.10 | MM2 | 10:00:15 |
| AwayMktA | Offer 10 @ 2.10 | Away Market A | 10:02:32 |
| AwayMktB | Offer 20 @ 2.15 | Away Market B | 10:03:15 |
| Order G | Sell 10 @ 2.20, Discretion to 2.05 | Customer | 10:00:20 |

The offer side of the market maker quote book 33*a* now looks like this, as the lead marker maker has not replenished its offer yet:

| Offer | Details | Source | Time received |
|---|---|---|---|
| Quote B | Offer 30 @ 2.10 | MM2 | 10:00:15 |

The offer side of the public order book now looks like this:

| Published Offers |
|---|
| 30 @ 2.05 ← |
| 30 @ 2.10 |
| 10 @ 2.20 |

Step 2e: Incoming Discretionary Order Matches Broker/Dealer Order

The process continues to step 642, where it checks if incoming Discretionary Buy Order U2 still has any contracts available. As incoming Discretionary Buy Order U2 still has 70 contracts remaining, the process proceeds to step 646, where it returns to the step where it was originally initiated, back to step 418 (FIG. 4A).

The process continues to step 436, where it checks if incoming Discretionary Buy Order U2's display price (2.00) is greater than or equal to the NBO (2.05). As the display price is lower, the process continues to step 438, where it checks if incoming Discretionary Buy Order U2's discretionary price (2.10) is greater than or equal to the NBO (2.05). As it is greater, the process continues to step 440, where it checks if the market center 20 is at the NBO. As it is at the NBO, the process continues to step 442, where it retrieves the displayed sell order or market maker offer with the highest ranking in the Display Order Process, which is Sell Order D.

In step 444, the process matches 30 contracts of incoming Discretionary Buy Order U2 with posted Sell. Order D, at the NBO price of 2.05, completely depleting posted Sell Order D and removing it from the books.

The offer side of the virtual consolidated order and quote list now looks like this:

| Order or Quote | Details | Source | Time received |
|---|---|---|---|
| Quote B | Offer 30 @ 2.10 | MM2 | 10:00:15 |
| AwayMktA | Offer 10 @ 2.10 | Away Market A | 10:02:32 |
| AwayMktB | Offer 20 @ 2.15 | Away Market B | 10:03:15 |
| Order G | Sell 10 @ 2.20, Discretion to 2.05 | Customer | 10:00:20 |

The offer side of the internal order book 29*a* now looks like this:

| Order | Details | On behalf of | Time received |
|---|---|---|---|
| Order G | Sell 10 @ 2.20, Discretion to 2.05 | Customer | 10:00:20 |

The offer side of the public order book now looks like this:

| Published Offers |
|---|
| 30 @ 2.10 ← |
| 10 @ 2.20 |

In step 446, the process checks if incoming Discretionary Buy Order U2 has any contracts remaining, and determining that it still has 40 contracts, returns to step 436, where it checks if incoming Discretionary Buy Order U2's display price (2.00) is greater than or equal to the NBO (2.10). As the display price is lower, the process continues to step 438, where it checks if incoming Discretionary Buy Order U2's discretionary price (2.10) is greater than or equal to the NBO (now 2.10). As the prices are equal, the process continues to step 440, where it checks if the market center 20 is at the NBO. As it is at the NBO, the process continues to step 442, where it retrieves the displayed sell order or market maker offer with the highest ranking in the Display Order Process, which is Quote B, the MM2 Offer.

By way of explanation, although resting Discretionary Sell Order G can step up to the price of 2.05, which is superior to Quote B (2.10), by definition a posted discretionary order cannot use discretion to step ahead of another executable displayed order or market maker quote. A resting discretionary order can use discretion to execute only if an incoming order is about to be posted, canceled, hidden, repriced less aggressively, or routed to an away market.

Step 2f: Incoming Discretionary Order Matches Non-Lead Market Maker Quote

As Quote B is a market maker offer, the process continues to step 443, where it generates an IOC pseudo-order to sell 30 contracts at 2.10 on behalf of Quote B. The process continues to step 444, where it matches 30 contracts of incoming Discretionary Buy Order U2 against the sell pseudo-order. Quote B is completely depleted, and is removed from the virtual consolidated order and quote list. The process notifies the market maker quote engine 32*b* to decrement the MM2 Offer by the 30 contracts executed.

The offer side of the virtual consolidated order and quote list now looks like this:

| Order or Quote | Details | Source | Time received |
|---|---|---|---|
| AwayMktA | Offer 10 @ 2.10 | Away Market A | 10:02:32 |
| AwayMktB | Offer 20 @ 2.15 | Away Market B | 10:03:15 |
| Order G | Sell 10 @ 2.20, Discretion to 2.05 | Customer | 10:00:20 |

The offer side of the market maker quote book 33*a* is completely depleted, as the lead market maker and market maker MM2 have not replenished their quotes yet.

The offer side of the public order book now looks like this:

| Published Offers |
|---|
| 10 @ 2.20 ← |

The process continues to step 446, where it checks if incoming Discretionary Buy Order U2 has any remaining contracts, and determining that it still has 10 contracts, returns to step 436, where it checks if incoming Discretionary Buy Order U2's display price (2.00) is greater than or equal to the NBO (2.10). As the display price is lower, the process continues to step 438, where it checks if incoming Discretionary Buy Order U2's discretionary price (2.10) is greater than or equal to the NBO (2.10). As the prices are equal, the process continues to step 440, where it checks if the market center 20 is at the NBO. As Away Market A is now alone at the NBO, the process continues to step 448.

Step 2g: Incoming Discretionary Order is about to Route to an Away Market

In step 448, the process checks if there are any resting discretionary sell orders that can step up to the NBO, as incoming Discretionary Buy Order U2 is about to route to Away Market A. As posted Discretionary Sell Order G can step up to the NBO price of 2.10, the process proceeds to step 450, where it initiates the Discretionary Sell Orders Step Up to NBO Process, and proceeds to step 900 (FIG. 9).

Step 2h: Posted Discretionary Order Steps Up to NBO; Both Incoming Discretionary Order and Posted Discretionary Order Require Discretion to Trade (Discretionary-to-Discretionary Interaction)

In step 902, the process retrieves resting Discretionary Sell Order G. In step 904, it checks if incoming Discretionary Buy Order U2's Leaves quantity (10 contracts) is greater than or equal to resting Discretionary Sell Order G's minimum discretion size. As resting Discretionary Sell Order G does not have a minimum discretion size and it therefore defaults to zero, incoming Buy Order U2's size is greater.

The process continues to step 910, where it matches the remaining 10 contracts of incoming Discretionary Buy Order U2 against resting Discretionary Sell Order G, at the NBO price of 2.10. By way of explanation, although Discretionary Sell Order G could step up as high as 2.05, when two Discretionary Orders match and both require discretion for the match, the execution occurs at the price of the incoming order, capped at the side of the NBBO opposite to the incoming order.

In step 912, the process checks if incoming Discretionary Buy Order U2 has any quantity remaining, and determining that it does not, the process terminates in step 914. Posted Discretionary Sell Order G is also completely depleted, and is removed from the books.

The offer side of the virtual consolidated order and quote list now looks like this:

| Order or Quote | Details | Source | Time received |
|---|---|---|---|
| AwayMktA | Offer 10 @ 2.10 | Away Market A | 10:02:32 |
| AwayMktB | Offer 20 @ 2.15 | Away Market B | 10:03:15 |

As incoming Discretionary Buy Order U2 has been completely depleted, the virtual consolidated order and quote list is deleted from local memory.

The offer side of the market maker quote book 33a is completely depleted until the market makers refresh their offers. The offer side of the internal order book 29a has been completely depleted. The offer side of the public order book has been completely depleted in this example.

Example 3

Posted Discretionary Order with Minimum Discretion Size Steps Up to "Trade and Ship" Exception Price (One Tick Inferior to the NBBO)

This example illustrates how a discretionary order can step up and trade at one minimum price increment (tick) worse than the NBBO, for example using the "trade and ship" exception, which allows certain incoming orders to execute off the NBBO contemporaneously with satisfying all away markets at the NBBO. The example also illustrates how a resting discretionary order trades when it has a minimum discretion size. For ease of illustration, the virtual consolidated order and quote list is not reconstructed from its component books each time a new order is received, but is shown as if it remained in local memory as the orders are processed.

→The NBBO is 2.00 to 2.15 (60×20).

The away market BBO quote book 25a looks like this:

| Bids | | Offers | |
|---|---|---|---|
| Source | Disseminated Quotes | Source | Disseminated Quotes |
| Away Market A | Bid 20 @ 2.00 | Away Market B | Offer 20 @ 2.15 |
| Away Market B | Bid 30 @ 1.90 | Away Market A | Offer 40 @ 2.20 |

The market maker quote book 33a looks like this:

| Bids | | Offers | |
|---|---|---|---|
| Source | Disseminated Quotes | Source | Disseminated Quotes |
| LMM | Bid 40 @ 2.00 | LMM | Offer 20 @ 2.25 |

The internal order book 29a looks like this:

| Bids | | Offers | |
|---|---|---|---|
| On behalf of | Buy Order details | On behalf of | Sell Order details |
| Customer | Order A: Buy 20 @ 1.95 | Customer | Order F: Sell 10 @ 2.25 |
| Broker/Dealer | Order B: Buy 10 @ 1.90 | | |

→The market center BBO is 2.00 to 2.25 (40×30)

The public order book looks like this:

| Published Bids | Published Offers |
|---|---|
| 40 @ 2.00 | 30 @ 2.25 |
| 20 @ 1.95 | |
| 10 @ 1.90 | |

Step 3a: Post a Nonmarketable Discretionary Order with a Minimum Discretion Size The order matching engine 21 receives the following order in step 1400 (FIG. 12A):

Order R1: Sell 30@2.25, Discretionary Price=2.20, Minimum Discretion Size=20

In step 1402, the process retrieves the NBB (2.00). In step 1404, it checks if incoming Discretionary Sell Order R1's display price (2.25) is less than or equal to the NBB (2.00). As incoming Discretionary Sell Order R1's display price is higher, the process continues to step 1406, where it checks if incoming Discretionary Sell Order R1's discretionary price (2.20) is less than or equal to the NBB (2.00). As incoming Discretionary Sell Order R1's discretionary price is higher, the process continues to step 1407, where it checks if incoming Discretionary Sell Order's discretionary price (2.20) is less than or equal to the NBO (2.15). As it is not, this means the incoming sell order cannot execute even if there are posted discretionary buy orders in the internal order book 29*a*.

The process continues to step 1460, where it inserts incoming Discretionary Sell Order R1 in the Display Order Process of the internal order book 29*a* and ranks it in price/time priority according to its display price of 2.25. The process continues to step 1462, where it inserts Discretionary Sell Order R1's discretionary price of 2.20 in the Working Order Process of the internal order book 29*a*. The process continues to step 1464, where it disseminates Discretionary Sell Order R1's display price to the public order book. The process terminates in step 1466 as indicated. Posted Discretionary Sell Order R1 has a lower priority than the lead market maker's offer and posted Sell Order F, both of which have time priority at the price of 2.25. Posted Discretionary Sell Order R1 has a Minimum Discretion Size=20, which means it will use discretion to trade only if at least 20 contracts can execute.
→The NBBO is still 2.00 to 2.15 (60×20).

The internal order book 29*a* now looks like this:

| Bids | | Offers | |
|---|---|---|---|
| On behalf of | Buy Order details | On behalf of | Sell Order details |
| Customer | Order A: Buy 20 @ 1.95 | Customer | Order F: Sell 10 @ 2.25 |
| Broker/Dealer | Order B: Buy 10 @ 1.90 | Customer | Order R1: ← Sell 30 @ 2.25, Discretion to 2.20, Minimum Discretion Size = 20 |

The market maker quote book 33*a* remains unchanged and still looks like this:

| Bids | | Offers | |
|---|---|---|---|
| Source | Disseminated Quotes | Source | Disseminated Quotes |
| LMM | Bid 40 @ 2.00 | LMM | Offer 20 @ 2.25 |

→The market center BBO is now 2.00 to 2.25 (40×60)

Sell Order R1's quantity (30) is aggregated with Sell Order F's quantity (10) and the lead market maker's offer quantity (20). The public order book now looks like this:

| Published Bids | Published Offers |
|---|---|
| 40 @ 2.00 | 60 @ 2.25 ← |
| 20 @ 1.95 | |
| 10 @ 1.90 | |

Step 3b: Post a Second Nonmarketable Discretionary Order at a Worse Displayed Price The order matching engine 21 receives the following order in step 1400:
Order R2: Sell 20 @ 2.30, Discretionary Price=2.25

In step 1402, the process retrieves the NBB (2.00). In step 1404, it checks if incoming Discretionary Sell Order R2's display price (2.30) is less than or equal to the NBB (2.00). As incoming Discretionary Sell Order R2's display price is higher, the process continues to step 1406, where it checks if incoming Discretionary Sell Order R2's discretionary price (2.25) is less than or equal to the NBB (2.00). As incoming Discretionary Sell Order R2's discretionary price is higher, the process continues to step 1407, where it checks if incoming Discretionary Sell Order R2's discretionary price (2.25) is less than or equal to the NBO (2.15). As it is not, this means incoming Discretionary Sell Order R2 is not executable even if there are posted discretionary buy orders in the internal order book 29*a*.

The process continues to step 1460, where it inserts incoming Discretionary Sell Order R2 in the Display Order Process of the internal order book 29*a* and ranks it in price/time priority according to its display price of 2.30. The process continues to step 1462, where it inserts Discretionary Sell Order R2's discretionary price of 2.25 in the Working Order Process of the internal order book 29*a*. The process continues to step 1464, where it disseminates Discretionary Sell Order R2's display price to the public order book. The process terminates in step 1466 as indicated. Posted Discretionary Sell Order R2 has the lowest offer in the virtual consolidated order and quote list.
→The NBBO is still 2.00 to 2.15 (60×20).

The internal order book 29*a* now looks like this:

| Bids | | Offers | |
|---|---|---|---|
| On behalf of | Buy Order details | On behalf of | Sell Order details |
| Customer | Order A: Buy 20 @ 1.95 | Customer | Order F: Sell 10 @ 2.25 |
| Broker/Dealer | Order B: Buy 10 @ 1.90 | Customer | Order R1: Sell 30 @ 2.25, Discretion to 2.20, Minimum Discretion Size = 20 |
| | | Broker/Dealer | Order R2: ← Sell 20 @ 2.30, Discretion to 2.25 |

→The market center BBO is still 2.00 to 2.25 (40×60)
The public order book now looks like this:

| Published Bids | Published Offers |
|---|---|
| 40 @ 2.00 | 60 @ 2.25 |
| 20 @ 1.95 | 20 @ 2.30 ← |
| 10 @ 1.90 | |

Step 3c: Incoming Limit Buy Order is about to Route

In step 1000 (FIG. 10A), the process receives the following sweep limit order:
Order U1: Buy 40@2.20, Sweep Limit In step 1001, the process retrieves the NBBO (2.00 to 2.15). In step 1002, it checks if incoming Buy Order U1's price (2.20) is lower than the NBB (2.00). As it is higher than the NBB, the process continues to step 1006, where it checks if incoming Buy Order U1's price (2.20) is higher than the NBO (2.15). As incoming Buy Order U1's price is higher, the process continues to step 1008, where it initiates the Too-Executable Buy Order Check Process, and proceeds to step 500 (FIG. 5).

In step 502, the process evaluates whether the check for excessive discretion is enabled for this order type. As incoming Buy Order U1 is not a discretionary order, it is not enabled. The process continues to step 520, where it evaluates whether the check for excessive marketability is enabled for this order type. As incoming Buy Order U1 is a sweep limit order, the check is enabled. The process continues to step 524, where it checks if incoming Buy Order U1's display price (2.20) is greater than the NBO (2.15). As it is, the process continues to step 528, where it retrieves the stored parameter that specifies the maximum percentage allowed through the NBBO ("MaxPercentOffNBBO"). In this example, the MaxPercentOffNBBO is configured to be 15%, i.e., an incoming limit order's price is allowed to be up to 15% more aggressive than the opposite side of the NBBO.

In step 530, the process derives the maximum allowable price increment through the NBBO ("MaxPriceThruNBO") by multiplying the MaxPercentOffNBBO (15%) and the NBO price (2.15). The MaxPriceThruNBO is computed as 0.3225 (15% of 2.15=0.3225), which is rounded down to 0.30, the nearest tick (this issue uses a legacy tick of 0.05 at this price level). In step 532, the process computes the highest valid price for incoming Buy Order U1 ("MaxBuyPrice") by adding the derived MaxPriceThruNBO (0.30) to the NBO (2.15), yielding a MaxBuyPrice=2.45. In step 534, the process checks if incoming Buy Order U1's price (2.20) is greater than the derived MaxBuyPrice (2.45). As it not greater, incoming Buy Order U1 is not "too executable," and accordingly the process continues to step 536, where it returns to the step where it was originally initiated, back to step 1008 (FIG. 10A).

Now that the order matching engine 21 has determined that the incoming order is not too executable, it continues to step 1011, where it generates a virtual consolidated order and quote list for the option series. The virtual consolidated order and quote list looks like this:

| Bids | | Offers | |
|---|---|---|---|
| Source | Bid details | Source | Offer details |
| LMM | Bid 40 @ 2.00 | Away Market B | Offer 20 @ 2.15 |
| Away Market A | Bid 20 @ 2.00 | Away Market A | Offer 40 @ 2.20 |
| Customer | Order A: Buy 20 @ 1.95 | Customer | Order F: Sell 10 @ 2.25 |
| Broker/Dealer | Order B: Buy 10 @ 1.90 | LMM | Offer 20 @ 2.25 |
| Away Market B | Bid 30 @ 1.90 | Customer | Order R1: Sell 30 @ 2.25, Discretion to 2.20, Minimum Discretion Size = 20 |
| | | Broker/Dealer | Order R2: Sell 20 @ 2.30, Discretion to 2.25 |

The process continues to step 1030, where it checks if this issue has any assigned market makers. As it does, the process continues to step 1032, where it checks if the incoming buy order is a directed order or not. As it is not a directed order, the process continues to step 1036, where it initiates the LMM Guaranteed Offer Process, and proceeds to step 600 (FIG. 6).

In step 602, the process retrieves the NBO (2.15). In step 604, it checks if the lead market maker's offer (2.25) is at the NBO (2.15). As the lead market maker's offer is inferior to the NBO, the process continues to step 606, where it returns to the step where it was originally initiated, back to step 1036 (FIG. 10B). The process continues to step 1038, where it checks if incoming Buy Order U1 (2.20) is still greater than or equal to the NBO (2.15). As the NBO is unchanged, the process continues to step 1042, where it checks if the market center 20 is at the NBO.

Step 3d: No Posted Discretionary Orders can Step Up to the NBBO; Incoming Limit Order Routes to an Away Market As Away Market B is alone at the NBO, the process continues to step 1050, where it checks if there are any resting discretionary sell orders that can step up to the NBO. Although there are two resting discretionary sell orders on the order book 29a (Sell Order R1 and Sell Order R2), neither can step up to the NBO price of 2.15. Accordingly, the process continues to step 1054, where it checks if incoming Buy Order U1 should be routed or not.

As incoming Buy Order U1 is a sweep limit order, it is eligible for routing. As the obligation to Away Market B's Offer has not already been satisfied by prior routed buy orders, Away Market B is eligible to receive a routed order. Accordingly, the process continues to step 1056, where it releases incoming Buy Order U1 to the Routing Process, which routes 20 contracts, the lesser of incoming Buy Order U1's size (40 contracts) and the unsatisfied size of Away Market B's Offer (20 contracts), at the NBO price of 2.15.

In step 1058, the process checks if incoming Buy Order U1 has any contracts remaining, and as it still has 20 contracts available, the process continues to step 1060, where it checks if incoming Buy Order U1 is allowed to execute beyond the NBO according to the rules of the order type. As sweep limit orders are allowed to execute beyond the NBO, the process continues to step 1062, where it initiates the Posted Sell Order Trade-and-Ship Price Check Process and proceeds to step 1100 (FIG. 11).

Step 3e: Posted Discretionary Order Steps Up to "Trade and Ship" Exception Price to Contemporaneously Match Incoming Limit Order According to present marketplace rules (e.g., the "trade and ship" exception), an incoming order is allowed to contemporaneously execute with orders priced at one tick inferior to the NBO after all the away markets at the NBO have been satisfied. In step 1102, the process determines the "TradeAndShipPrice" parameter, i.e., the price that is one tick inferior to the current NBO, by adding one tick (0.05 at this price level) to the NBO (2.15) to derive the TradeAndShipPrice=2.20. In step 1104, the process retrieves the displayed sell order with the highest ranking in the Display Order Process. The highest-ranked displayed order is resting Sell Order F.

In step 1106, the process checks if resting Sell Order F's price (2.25) is equal to the derived TradeAndShipPrice (2.20). As it is not, Sell Order F is not eligible to execute using the "trade and ship" exception. The process continues to step 1116, where it checks if there are any resting discretionary sell orders that can step up to the TradeAndShipPrice of 2.20. As resting Discretionary Sell Order R1 can step up to the price of 2.20, the process retrieves it in step 1118.

In step 1120, the process checks if incoming Buy Order U1's Leaves quantity (20 contracts) is greater than or equal to resting Sell Order R1's minimum discretion size (20 contracts). As the quantities are equal, this means resting Discretionary Sell Order R1 is eligible to use its discretion to participate in the execution. In step 1122, the process matches the remaining 20 contracts of incoming Buy Order U1 against resting Discretionary Sell Order 121 at the TradeAndShipPrice of 2.20. In step 1124, the process checks if incoming Buy Order U1 has any contracts remaining, and as it does not, the process terminates in step 1126 as indicated. Discretionary Sell Order R1 still has 10 contracts remaining. As the Leaves quantity of posted Sell Order R1 (10) is now lower than its minimum discretion size (20), the process zeroes out the minimum discretion size so that the remainder of the order can complete trading with discretion if discretion is required.

→The NBBO is, still 2.00 to 2.15 (60×20).

The virtual consolidated order and quote list now looks like this:

| Bids | | Offers | |
|---|---|---|---|
| Source | Bid details | Source | Offer details |
| LMM | Bid 40 @ 2.00 | Away Market B | Offer 20 @ 2.15 |
| Away Market A | Bid 20 @ 2.00 | Away Market A | Offer 40 @ 2.20 |
| Customer | Order A: Buy 20 @ 1.95 | Customer | Order F: Sell 10 @ 2.25 |
| Broker/Dealer | Order B: Buy 10 @ 1.90 | LMM | Offer 20 @ 2.25 |
| Away Market B | Bid 30 @ 1.90 | Customer | Order R1: Sell 10 @ 2.25, ← Discretion to 2.20, Minimum Discretion Size = 0 |
| | | Broker/Dealer | Order R2: Sell 20 @ 2.30, Discretion to 2.25 |

The internal order book 29a now looks like this:

| Bids | | Offers | |
|---|---|---|---|
| On behalf of | Buy Order details | On behalf of | Sell Order details |
| Customer | Order A: Buy 20 @ 1.95 | Customer | Order F: Sell 10 @ 2.25 |
| Broker/Dealer | Order B: Buy 10 @ 1.90 | Customer | Order R1: Sell 10 @ 2.25, ← Discretion to 2.20, Minimum Discretion Size = 0 |
| | | Broker/Dealer | Order R2: Sell 20 @ 2.30, Discretion to 2.25 |

→The market center BBO is now 2.00 to 2.25 (40×40)

The public order book now looks like this:

| Published Bids | Published Offers |
|---|---|
| 40 @ 2.00 | 40 @ 2.25 ← |
| 20 @ 1.95 | 20 @ 2.30 |
| 10 @ 1.90 | |

The virtual consolidated order and quote list is deleted from local memory. Away Market B fills the linkage order routed on behalf of underlying Buy Order U1. Buy Order U1 is completely filled.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A method for trading discretionary orders in an electronic options trading environment with market maker participation, comprising:
   providing a market center which lists a plurality of options series, wherein the market center has at least one order book for each option series and at least one quote book for each option series, wherein the order book has a displayed interest component which is processed in a display order process and a nondisplayed interest component which is processed in a working order process, and wherein at least a portion of plurality of the option series have a lead market maker;
   posting a discretionary order having a total size, a display price for display, and a discretionary price that is not for display;
   receiving an incoming contra side order having a second total size, a second display price for display, and a second discretionary price that is not for display, wherein the incoming contra side order is on the side of the order book opposite to the discretionary order;
   determining whether the incoming contra side order is for an option series that has a second lead market maker;
   responsive to determining that the incoming contra side order is for the option series that has the second lead market maker:
      determining whether the second lead market maker has a quote at the NBBO;
      responsive to determining that the second lead market maker has the quote at the NBBO:
         computing an allocation percentage for the second lead market maker;
         matching the incoming contra side order up to the lesser of the second total size of the incoming contra side order or the computed allocation percentage amount for the second lead market maker; and
         after matching the incoming contra side order with the second lead market maker quote, matching at least a portion of the remainder of the incoming contra side order with the discretionary order using the second display price.

2. The discretionary order trading method of claim 1, further comprising:
   matching at least another portion of the remainder of the incoming contra side order with other displayed orders in the display order process;
   matching at least a portion of the remainder of the incoming contra side order with other posted discretionary orders, which cannot execute at the display price of the other posted discretionary orders in the display order process, but which are able to execute at the discretionary price of the other posted discretionary order in the working order process.

3. The discretionary order trading method of claim 1, wherein the lead market maker has a quote at the NBO.

4. The discretionary order trading method of claim 1, wherein the lead market maker has a quote at the NBB.

5. The discretionary order trading method of claim 1, further comprising:
   providing at least one appointed market maker in the option series in addition to the lead market maker;
   wherein the incoming contra side order is from a specified order sending firm and is directed to and designates the at least one appointed market maker;
   determining whether the order sending firm has permission to direct orders to the appointed market maker;

responsive to determining that the order sending firm does have permission to direct orders to the appointed market maker:
  determining whether the appointed market maker has a quote at the NBBO;
  responsive to determining that the appointed market maker has the quote at the NBBO:
    computing an allocation percentage for the appointed market maker; and
    matching the incoming contra side order up to the lesser of the total size of the incoming contra side order or the computed allocation percentage amount for the appointed market maker.

6. The discretionary order trading method of claim 5, further comprising, prior to computing the appointed market maker allocation percentage:
  determining whether the order book has at least one customer order at the NBBO;
  responsive to determining that the order book does have at least one customer order at the NBBO:
    determining whether the at least one customer order is displayed and was posted to the order book prior to the appointed market maker quote at the NBBO; and
    responsive to determining that the at least one customer order is displayed and was posted to the order book prior to the appointed market maker quote at the NBBO:
      matching the incoming order with the at least one customer order.

7. The discretionary order trading method of claim 6, wherein the at least one customer order was posted to the order book after the appointed market maker quote at the NBBO, and computing the allocation percentage.

8. The discretionary order trading method of claim 6, wherein the at least one customer order at the NBBO is not displayed, and computing the allocation percentage.

9. The discretionary order trading method of claim 5, wherein the appointed market maker has a quote at the NBO.

10. The discretionary order trading method of claim 5, wherein the appointed market maker has a quote at the NBB.

11. The discretionary order trading method of claim 1, wherein the market center includes a routing process and wherein the incoming contra side order is processed by the routing process.

12. A market center which lists a plurality of options series and handles discretionary order trading, comprising:
  at least one order book for each option series and at least one quote book for each option series, wherein the order book has a displayed interest component and a nondisplayed interest component, and wherein a plurality of the option series have lead market maker;
  at least one interface for receiving orders and an interface for receiving quotes;
  at least one market center memory for storing code for analyzing and processing orders and quotes;
  at least one processor for interacting with the interfaces and executing the code for analyzing and processing quotes and orders, wherein the code, when executed:
    posts a discretionary order having a total size, a display price for display, and a discretionary price that is not for display on the market center;
    receives an incoming contra side order, wherein the incoming contra side order resides on the side of the order book opposite to the discretionary order;
    determines whether the incoming contra side order is for at least one option series that has a second lead market maker;
    responsive to determining that the incoming contra side order is for the at least one option series that has the second lead market maker:
      determines whether the second lead market maker has a quote at the NBBO;
      responsive to determining that the second lead market maker has the quote at the NBBO:
        computes an allocation percentage for the second lead market maker;
        matches the incoming contra side order up to the lesser of the total size of the incoming contra side order or the computed allocation percentage amount for the second lead market maker;
    determines whether the discretionary order has a second display price that is inferior to the NBBO and has a second discretionary price that is superior or equal to the NBBO; and
    responsive to determining that the posted discretionary order has the second display price that is inferior to the NBBO and has a second discretionary price that is superior or equal to the NBBO:
      matches at least a portion of the remainder of the incoming contra side order with the discretionary order using the second display price to execute at the NBBO.

13. The method of claim 1, wherein the market center is a computing system.

14. The method of claim 13, wherein the computing system is one or more programmed computers.

15. The method of claim 13, wherein the computing system is distributed over several physical locations.

16. The market center of claim 12, wherein the market center is a computing system.

17. The market center of claim 16, wherein the computing system is one or more programmed computers.

18. The market center of claim 16, wherein the computing system is distributed over several physical locations.

19. The market center of claim 12, wherein the computing system is one or more programmed computers.

20. The market center of claim 12, wherein the display price and second display price are the same and the discretionary price and secondary discretionary price are the same.

* * * * *

UNITED STATES PATENT AND TRADEMARK OFFICE
CERTIFICATE OF CORRECTION

| | | |
|---|---|---|
| PATENT NO. | : 8,600,862 B2 | Page 1 of 1 |
| APPLICATION NO. | : 12/807338 | |
| DATED | : December 3, 2013 | |
| INVENTOR(S) | : Paul Adcock et al. | |

It is certified that error appears in the above-identified patent and that said Letters Patent is hereby corrected as shown below:

On the title page, item (75) Inventors:

"Amy Famstrom" should read --Amy Farnstrom--

Signed and Sealed this
Eighteenth Day of February, 2014

Michelle K. Lee
*Deputy Director of the United States Patent and Trademark Office*